United States Patent
Cocola et al.

(10) Patent No.: US 7,158,311 B1
(45) Date of Patent: Jan. 2, 2007

(54) INTERCHANGEABLE LENS SYSTEM

(75) Inventors: Anthony J. Cocola, Geneva, NY (US);
Joel S. Lawther, Pittsford, NY (US);
Alan E. Lewis, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/192,733

(22) Filed: Jul. 29, 2005

(51) Int. Cl.
*G02B 15/02* (2006.01)

(52) U.S. Cl. ...................... 359/672; 359/740

(58) Field of Classification Search ........ 359/672–675, 359/740
See application file for complete search history.

(56) References Cited

U.S. PATENT DOCUMENTS

| | | | |
|---|---|---|---|
| 4,094,587 A * | 6/1978 | Besenmatter et al. ....... | 359/673 |
| 5,013,142 A * | 5/1991 | Rollin et al. ................. | 359/674 |
| 5,097,360 A * | 3/1992 | Fukami et al. .............. | 359/674 |
| 5,408,361 A * | 4/1995 | Iwata .......................... | 359/674 |
| 6,449,430 B1 | 9/2002 | Tasaka et al. | |
| 6,873,473 B1* | 3/2005 | Lewis et al. ................. | 359/740 |
| 6,995,920 B1* | 2/2006 | Nurishi ....................... | 359/675 |

* cited by examiner

*Primary Examiner*—Evelyn A. Lester
(74) *Attorney, Agent, or Firm*—William R. Zimmerli

(57) ABSTRACT

A lens system is provided. The lens system includes a first lens system moveable between a first position removed from an optical axis and a second position on the optical axis. The first lens system includes a first lens element, an aperture stop, and a second lens element positioned in order from an object side to an image side of the lens system. The first lens system has a first focal length. A second lens system is moveable between a first position on the optical axis and a second position removed from the optical axis. The second lens system has a second focal length with the second focal length being greater than the first focal length such that a magnification ratio change results from interchanging the first lens system and the second system on the optical axis.

16 Claims, 55 Drawing Sheets

INTERCHANGEABLE LENS SYSTEM

FIELD OF THE INVENTION

This invention relates generally to lens systems, and in particular to variable focal length lens systems.

BACKGROUND OF THE INVENTION

Variable focal length lens systems are known. For example, U.S. Pat. No. 6,873,473 B2, issued Mar. 29, 2005, to Lewis et al., discloses a two position variable focal length lens. The variable focal length lens includes a common lens element moveably positioned on an optical axis; a wide angle lens element moveable between a first location removed from the optical axis and a first position on the optical axis on an image side of the common lens element; and a telephoto lens element moveable between a second location removed from the optical axis and a second position on the optical axis on the image side of the common lens element. A magnification ratio change occurs by moving the common lens element along the optical axis and switching between the wide angle lens element located at the first position on the optical axis and the telephoto lens element located at the second position on the optical axis.

U.S. Pat. No. 6,449,430 B1, issued Sep. 10, 2002, to Tasaka et al., discloses a lens-fitted photo film unit having a rotatable lens holder that supports first and second taking lenses arranged perpendicularly to a photographic optical axis. The first and second taking lenses have different focal lengths. An externally operable button rotates the lens holder to selectively position the first and second taking lenses on the photographic optical axis.

The first lens, a wide-angle taking lens, is located on an object side of a first aperture, and consists of two lens elements. The second lens, a telephoto taking lens, is located on an object side of a second aperture, and consists of a single lens element. When compared to the wide-angle taking lens, the telephoto taking lens is positioned offset toward the object side along the photographic optical axis. The second aperture is also positioned offset toward the object side along the photographic optical axis when compared to the first aperture.

SUMMARY OF THE INVENTION

According to a feature of the present invention, a lens system includes a first lens system moveable between a first position removed from an optical axis and a second position on the optical axis. The first lens system includes a first lens element, an aperture stop, and a second lens element positioned in order from an object side to an image side of the lens system. The first lens system has a first focal length. A second lens system is moveable between a first position on the optical axis and a second position removed from the optical axis. The second lens system has a second focal length with the second focal length being greater than the first focal length such that a magnification ratio change results from interchanging the first lens system and the second system on the optical axis.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 10A:
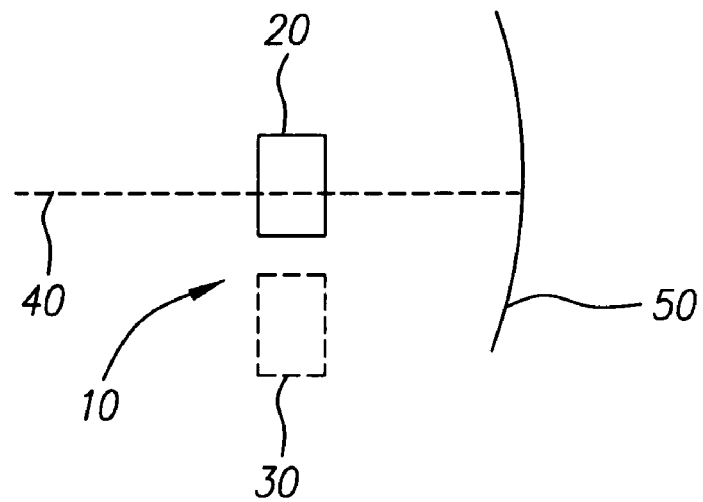
FIGS. 10A and 10B are schematic cross sectional views of an embodiment made in accordance with the present invention.
Figure 10B:
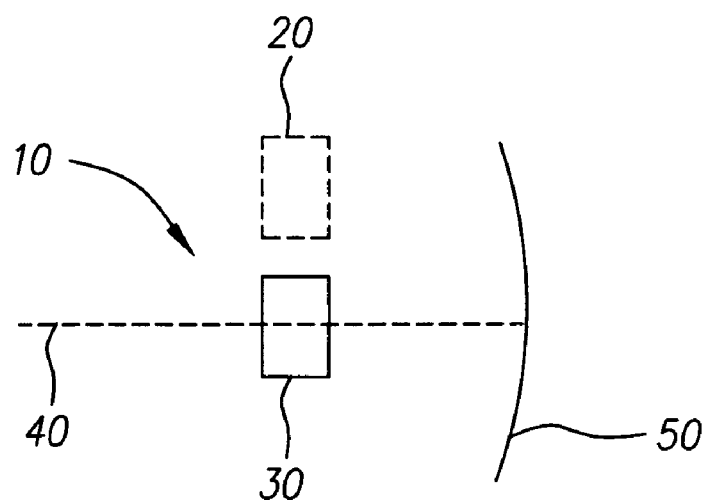

Referring to FIGS. 10A and 10B, a lens system 10 having a plurality of interchangeable component lens systems 20, 30 is shown. Component lens systems 20, 30 are designed to be moved on and off of an optical axis 40 using a switching mechanism (not shown). The switching mechanism can be any known mechanism suitable for this purpose, see, for example, commonly assigned U.S. patent application Ser. No. 10/949,616, entitled "CAMERA ASSEMBLIES HAVING OVERLAPPING ROCKER AND LINK PROJECTIONS" filed, Sep. 24, 2004, in the name of DiRisio; commonly assigned U.S. patent application Ser. No. 10/949,596, entitled "CAMERA ASSEMBLY HAVING LENS TURRET AND INDEPENDENTLY MOVABLE ROCKER" field Sep. 24, 2004, in the name of DiRisio, et al.; etc.

Each of component lens systems 20, 30 (which can be referred to as a first lens system 20 and a second lens system 30) has design characteristics that affect an image produced on a cylindrically curved image plane 50. For example, component lens systems 20, 30 can have different focal lengths which magnify (zoom in, zoom out) the image produce at image plane 50 differently depending on which component lens system is positioned in optical axis 40. Component lens systems 20 and 30 each produce an acceptable image on image plane 50 independently of the other. As such, preferred implementations of component lens systems 20, 30 do not have to have a lens element(s) that is common to both lens systems 20, 30 in order to produce an acceptable image at image plane 50.

Specific embodiments of component lens systems 20, 30 include at least one lens element and can include additional components such as aperture stops, baffles, spacers, etc., depending on the application contemplated. Additionally, lens system 10 can include more than two component lens systems 20, 30 depending on the application contemplated.

Example embodiments of lens system 10 will now be discussed with like elements having like reference signs with reference to FIGS. 1A–9F. In FIGS. 1A–9F, the object side of lens system 10 is viewed from the left hand side of the figure while the image side of lens system 10 is viewed from the right hand side of the figure and lens element surfaces are spherical unless otherwise noted. In Tables 1A–9B, back focus (BF) and front focus (FF) values are shown for an object at infinity while best focus values are shown for the finite object distance design criteria associated with each lens system of each example embodiment. The image format is cylindrically curved with a radius of −90 mm in each example embodiment.

Figure 1A:
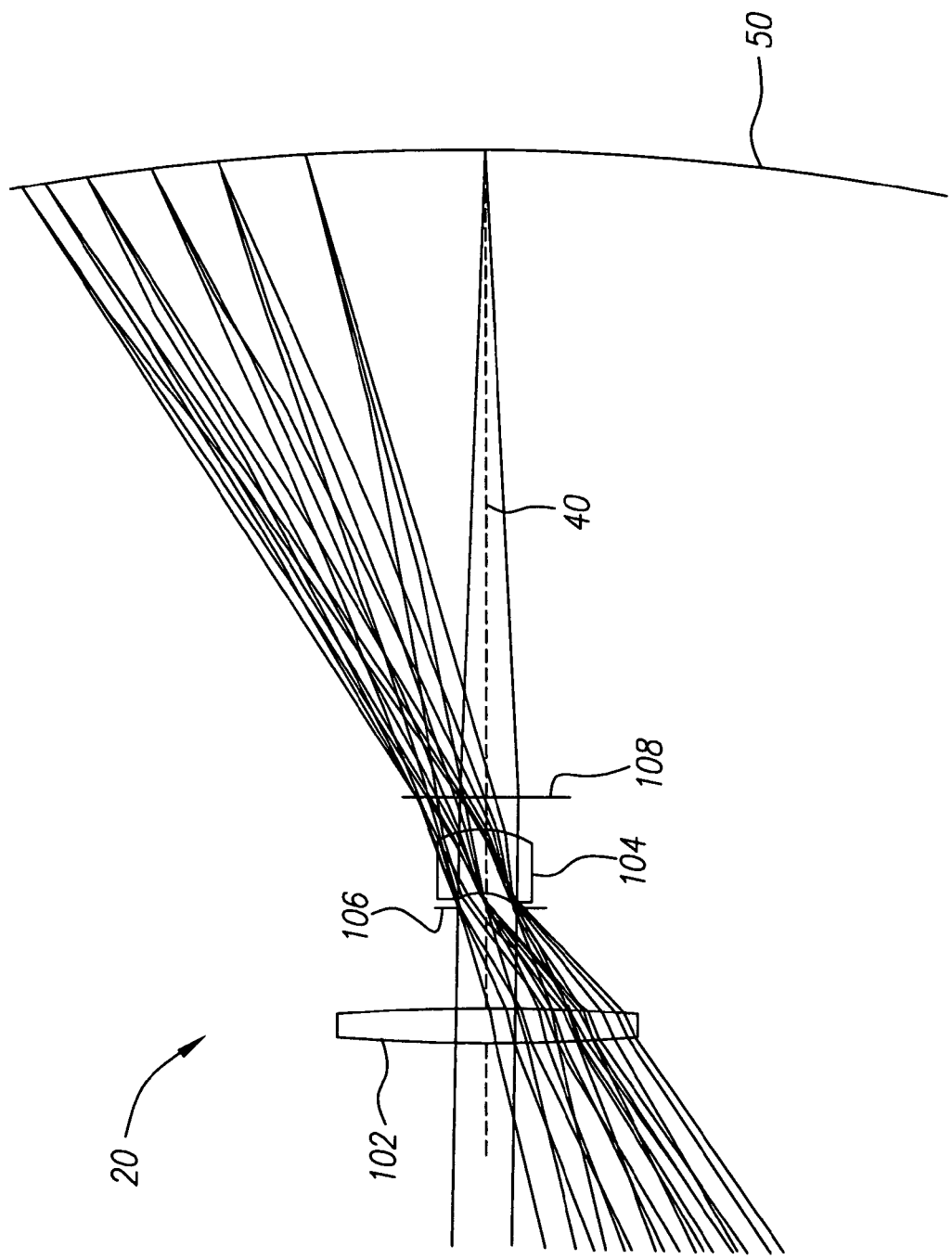
FIGS. 1A and 1B are cross sectional views of a first example embodiment made in accordance with the invention in wide angle and telephoto zoom positions, respectively.
Figure 1B:
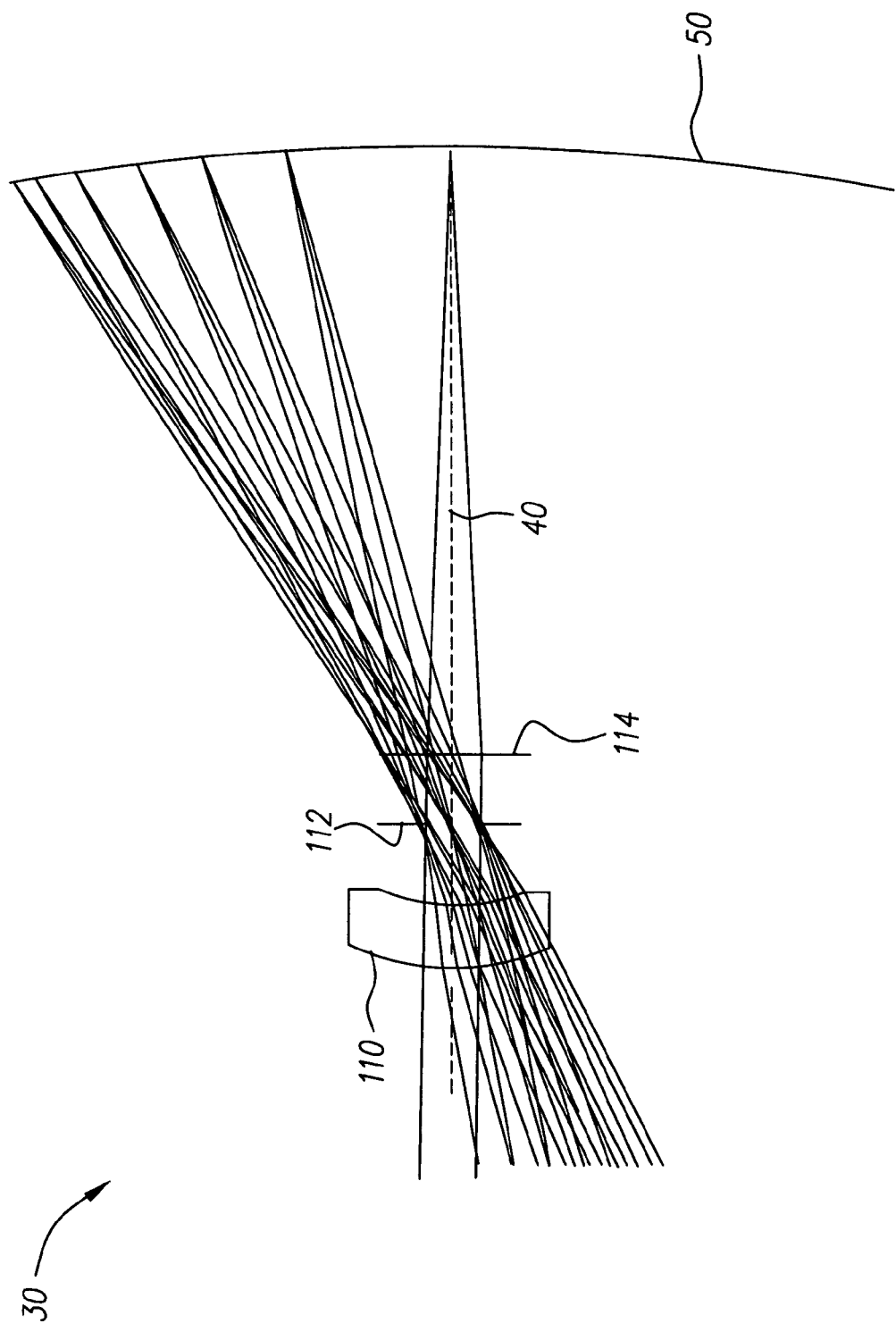

Referring to FIGS. 1A and 1B, cross sectional views of a first example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 102 and a rear lens element 104 as viewed from an object side. Front lens element 102 is biconvex. Rear lens element 104 is meniscus and convex toward image plane 50. Both lens elements 102 and 104 are made from acrylic plastic. An aperture stop 106 is located between lens elements 102 and 104 and a shutter 108 is located on an image side of lens element 104. Rear lens element 104 includes an aspheric surface located on its object side surface.

Second lens system 30 includes a positive power meniscus lens element 110 convex toward an object side. Lens element 110 has spherical surfaces and is made of acrylic plastic. An aperture stop 112 is located on an image side of lens element 110. A shutter 114 is located on an image side of aperture stop 112.

Tables 1A and 1B provide additional design characteristics for the example embodiment shown in FIGS. 1A and 1B. In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 1A

| | first lens system 20 | | | | |
|---|---|---|---|---|---|
| SURF. | CLEAR APER. | RADIUS | THICKNESS | INDEX | V |
| 1 | 13.95 | 83.3240 | 1.700 | 1.492 | 57.4 |
| 2 | 12.94 | −69.1030 | 5.230 | | |
| | 2.61 | DIAPHRAGM | 0.250 | | |
| 3 | 2.74 | ASPHERE | 2.857 | 1.492 | 57.4 |
| 4 | 4.78 | −6.52570 | 1.820 | | |
| | 6.79 | SHUTTER | | | |

LENS LENGTH: 10.037

BF: 31.21

FF: 21.66

BEST FOCUS: 0.800

ASPHERIC EQUATION:

$$X = \frac{CY^2}{1+\sqrt{1-(k+1)C^2Y^2}} + DY^4 + EY^6 + FY^8 + GY^{10}$$

SURF. 3:  C = −0.1250000   D = −0.5354778E−02   F = −0.3703106E−02
          k = 0             E = 0.6458337E−02    G = 0.7872486E−03
VERTEX RADIUS = (1/C) = −8.000

TABLE 1B second lens system 30

| SURF. | CLEAR APER. | RADIUS | THICKNESS | INDEX | V |
|---|---|---|---|---|---|
| 1 | 9.96 | 9.26560 | 3.200 | 1.492 | 57.4 |
| 2 | 7.53 | 14.5545 | 3.771 | | |
|   | 2.88 | DIAPHRAGM | 3.750 | | |
|   | 6.79 | SHUTTER | | | |

LENS LENGTH: 3.200

BF: 38.12

FF: 46.16

BEST FOCUS: −0.708

Figure 1C:
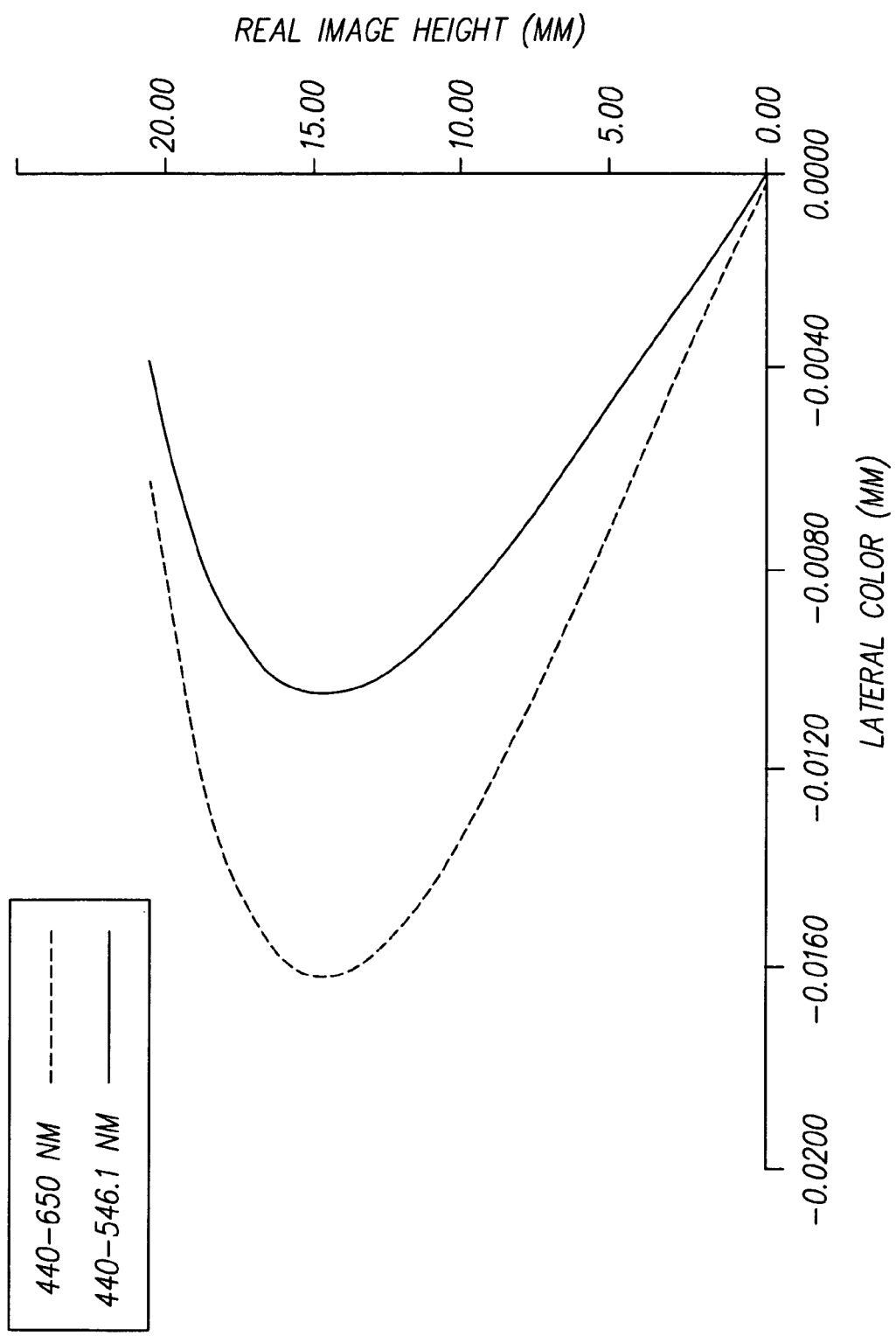
FIGS. 1C and 1D are aberration diagrams of the example embodiment shown in FIGS. 1A and 1B, respectively.
Figure 1D:
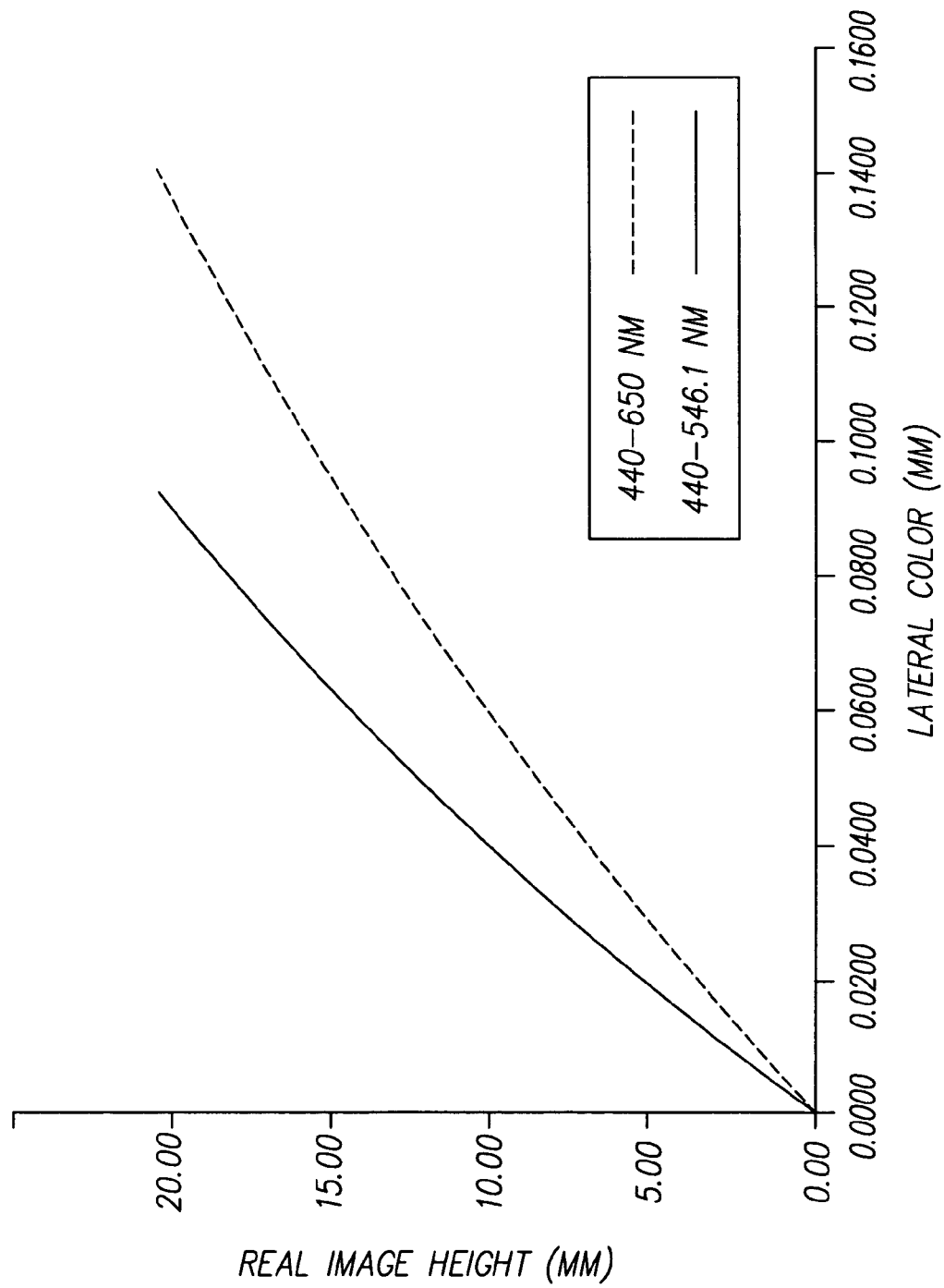

Referring to FIGS. 1C and 1D, lateral color diagrams of the example embodiment shown in FIGS. 1A and 1B, respectively, are shown. Lateral color was measured along the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus the height of the green (546.1 nm) image. Positive secondary lateral color in this situation means that the blue image is larger than the green image.

Figure 1E:
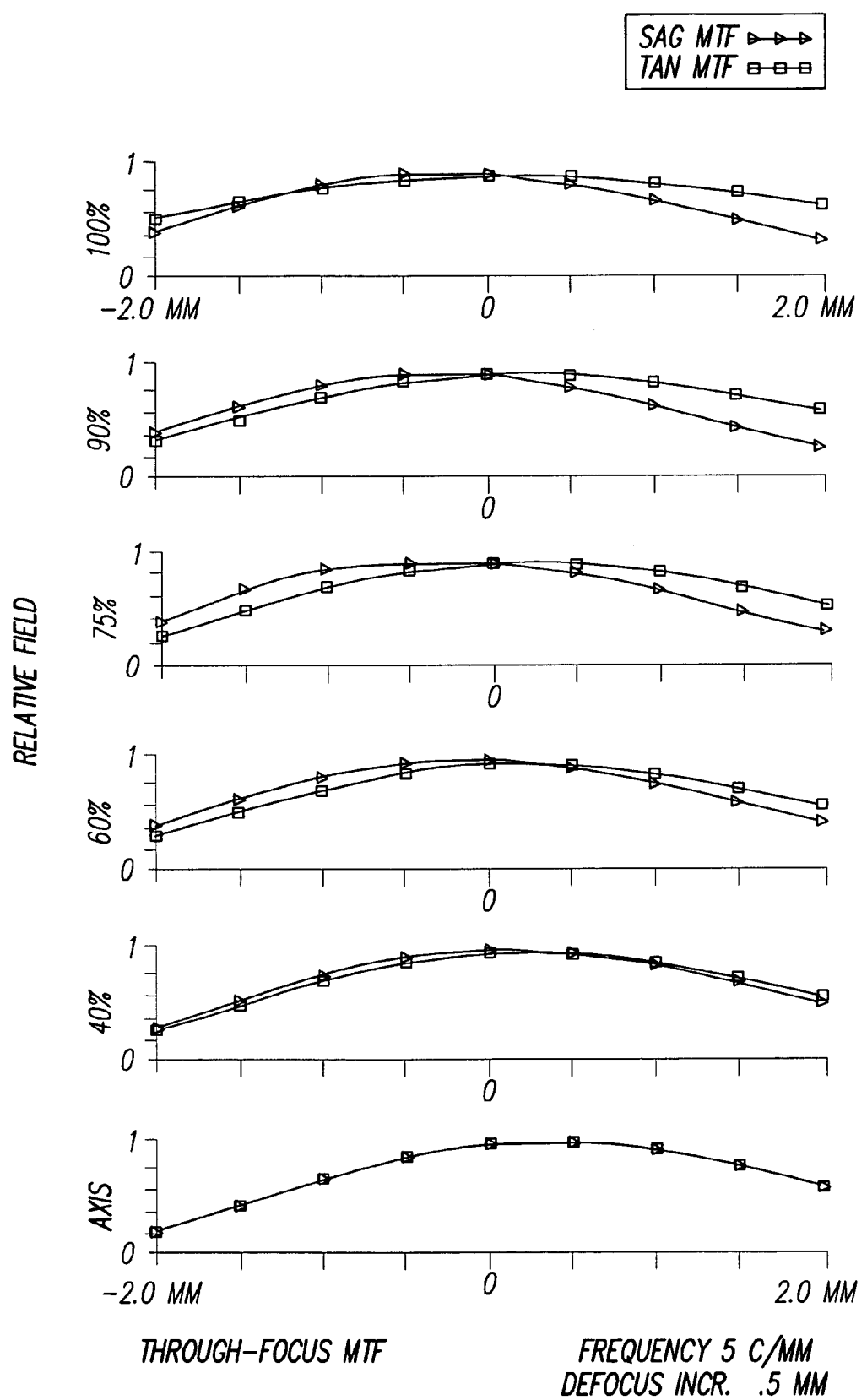
FIGS. 1E and 1F are through focus MTF plots for the example embodiment shown in FIGS. 1A and 1B, respectively.
Figure 1F:
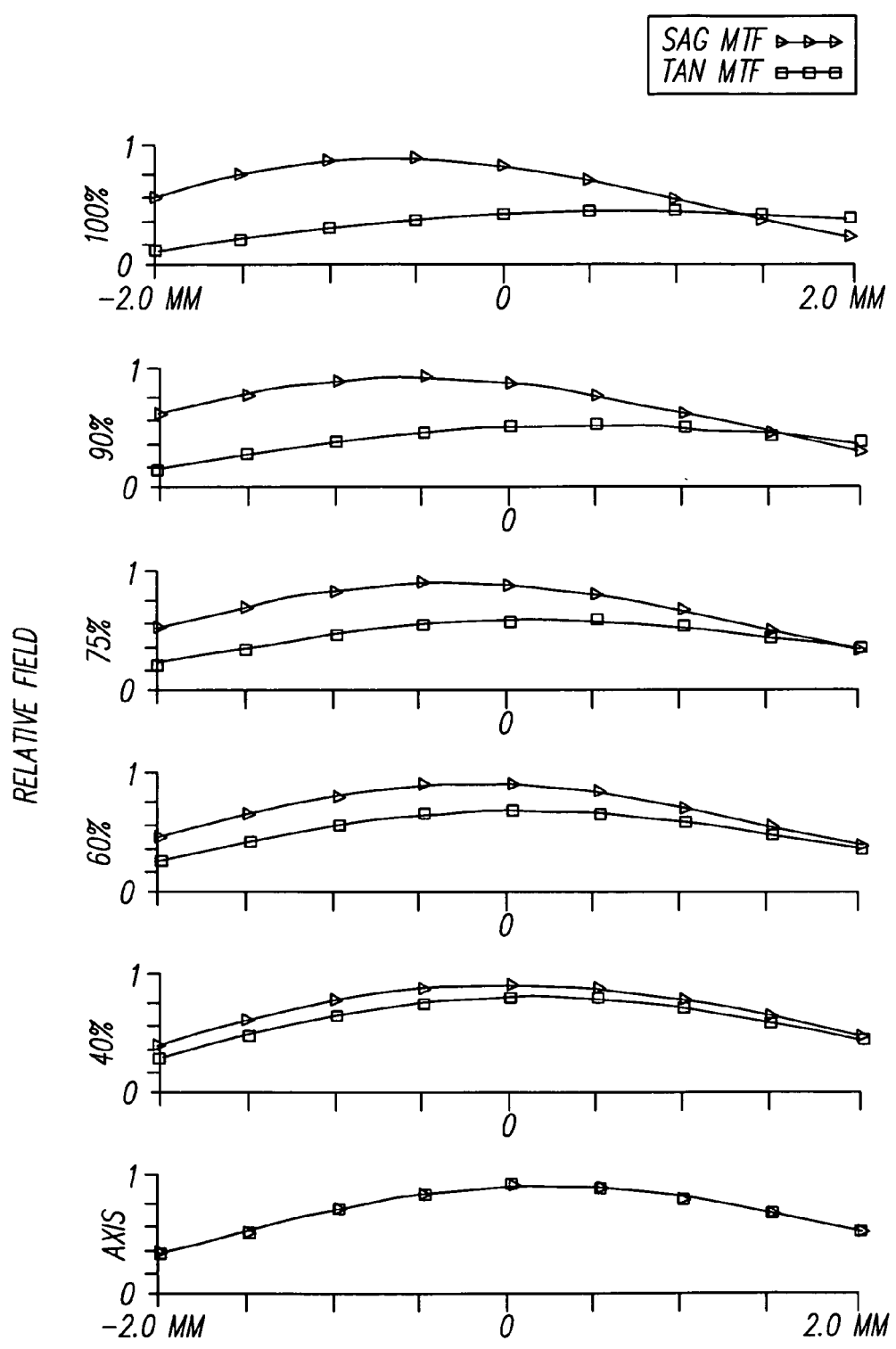

Referring to FIGS. 1E and 1F, through focus MTF performance plots for the example embodiment shown in FIGS. 1A and 1B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/15, 40%/26, 60%/33, 75%/18, 90%/8 and the wavelengths and weights described above.

Figure 2A:
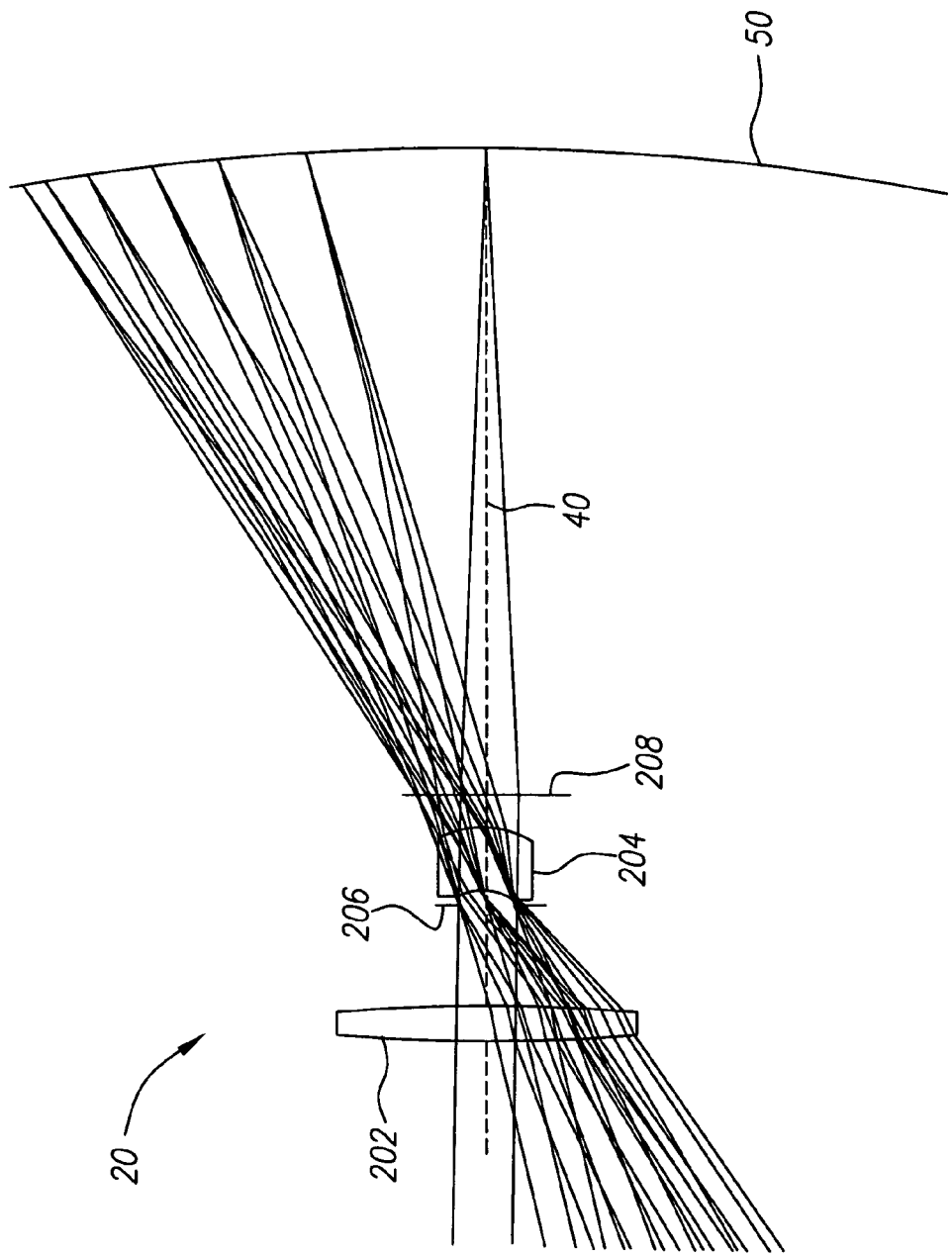
FIGS. 2A and 2B are cross sectional views of a second example embodiment made in accordance with the invention in wide angle and telephoto zoom positions, respectively.
Figure 2B:
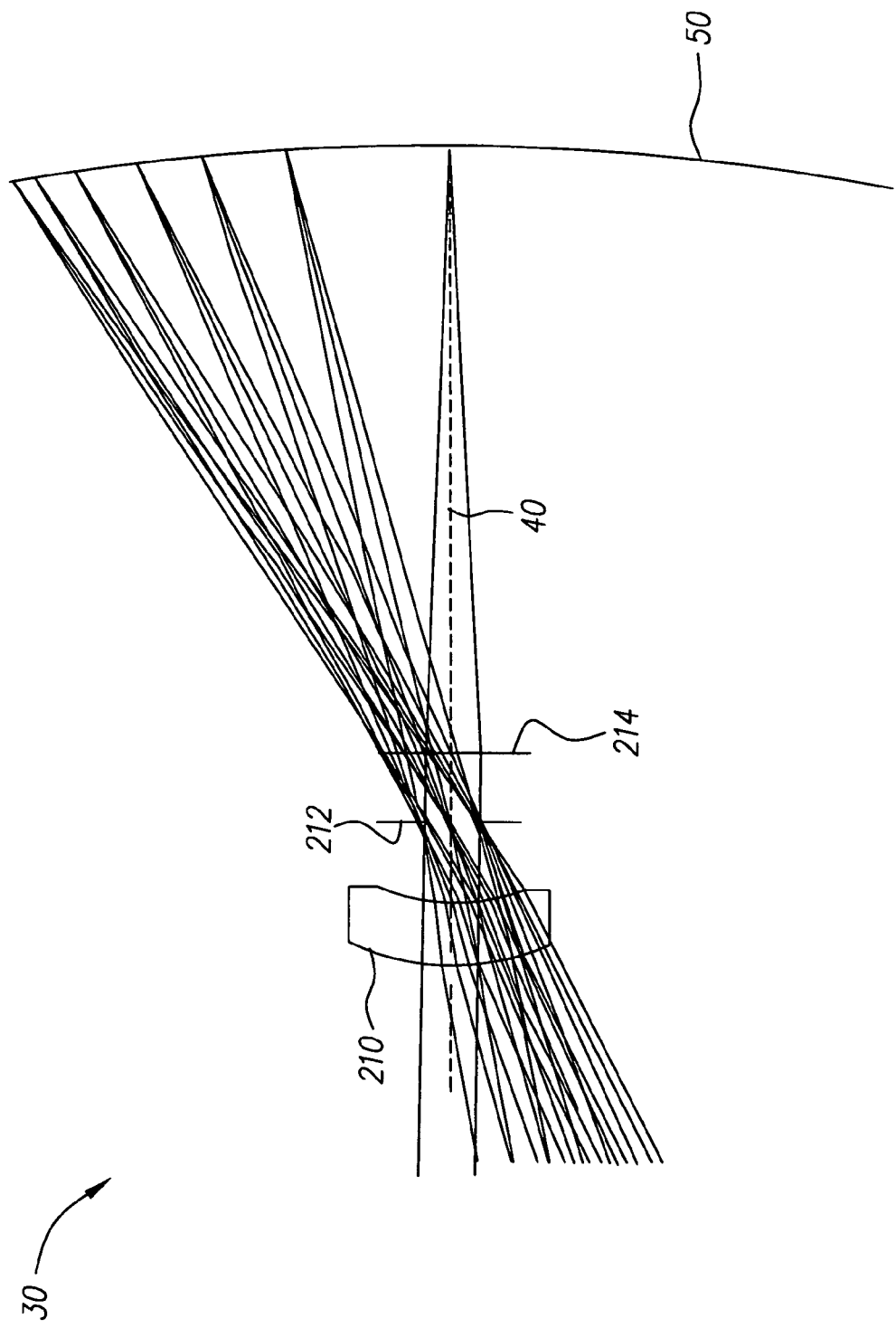

Referring to FIGS. 2A and 2B, cross sectional views of a second example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 202 and a rear lens element 204 as viewed from an object side. Front lens element 202 is biconvex. Rear lens element 204 is meniscus and convex toward image plane 50. Both lens elements 202 and 204 are made from acrylic plastic. An aperture stop 206 is located between lens elements 202 and 204 and a shutter 208 is located on an image side of lens element 204. Front lens element 202 includes an aspheric surface on its object side surface. Rear lens element 204 includes an aspheric surface located on its image side surface.

Second lens system 30 includes a positive power meniscus lens element 210 convex toward an object side. Lens element 210 has spherical surfaces and is made of acrylic plastic. An aperture stop 212 is located on an image side of lens element 210. A shutter 214 is located on an image side of aperture stop 212.

Tables 2A and 2B provide additional design characteristics for the example embodiment shown in FIGS. 2A and 2B. In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 2A first lens system 20

| SURF. | CLEAR APER. | RADIUS | THICKNESS | INDEX | V |
|---|---|---|---|---|---|
| 1 | 8.24 | ASPHERE | 2.110 | 1.492 | 57.4 |
| 2 | 6.49 | −64.9367 | 1.980 | | |
|   | 2.57 | DIAPHRAGM | 0.592 | | |
| 3 | 3.02 | −7.11880 | 2.245 | 1.492 | 57.4 |
| 4 | 4.67 | ASPHERE | 1.820 | | |
|   | 6.79 | SHUTTER | | | |

LENS LENGTH: 6.927

BF: 29.38

FF: 24.64

BEST FOCUS: 0.836

ASPHERIC EQUATION:

$$X = \frac{CY^2}{1+\sqrt{1-(k+1)C^2Y^2}} + DY^4 + EY^6 + FY^8 + GY^{10}$$

SURF. 1:  C = 0.031680454   D = −0.19438227E−03   F = −0.10943439E−05
          k = 0              E = 0.19146213E−04    G = 0.24513379E−07
VERTEX RADIUS = (1/C) = 31.5652045

SURF. 4:  C = −0.152938639    D = −0.10034969E−01    F = −0.18974151E−03
         k = −27.1224987      E = 0.16763751E−02     G = 0.93583407E−05
VERTEX RADIUS = (1/C) = −6.53857003

TABLE 2B second lens system 30

| SURF. | CLEAR APER. | RADIUS | THICKNESS | INDEX | V |
|---|---|---|---|---|---|
| 1 | 9.56 | 8.35126 | 3.000 | 1.492 | 57.4 |
| 2 | 7.22 | 12.4770 | 3.513 | | |
|   | 2.78 | DIAPHRAGM | 4.002 | | |
|   | 6.79 | SHUTTER | | | |

LENS LENGTH: 3.000

BF: 36.34

FF: 44.51

BEST FOCUS: −0.700

Figure 2C:
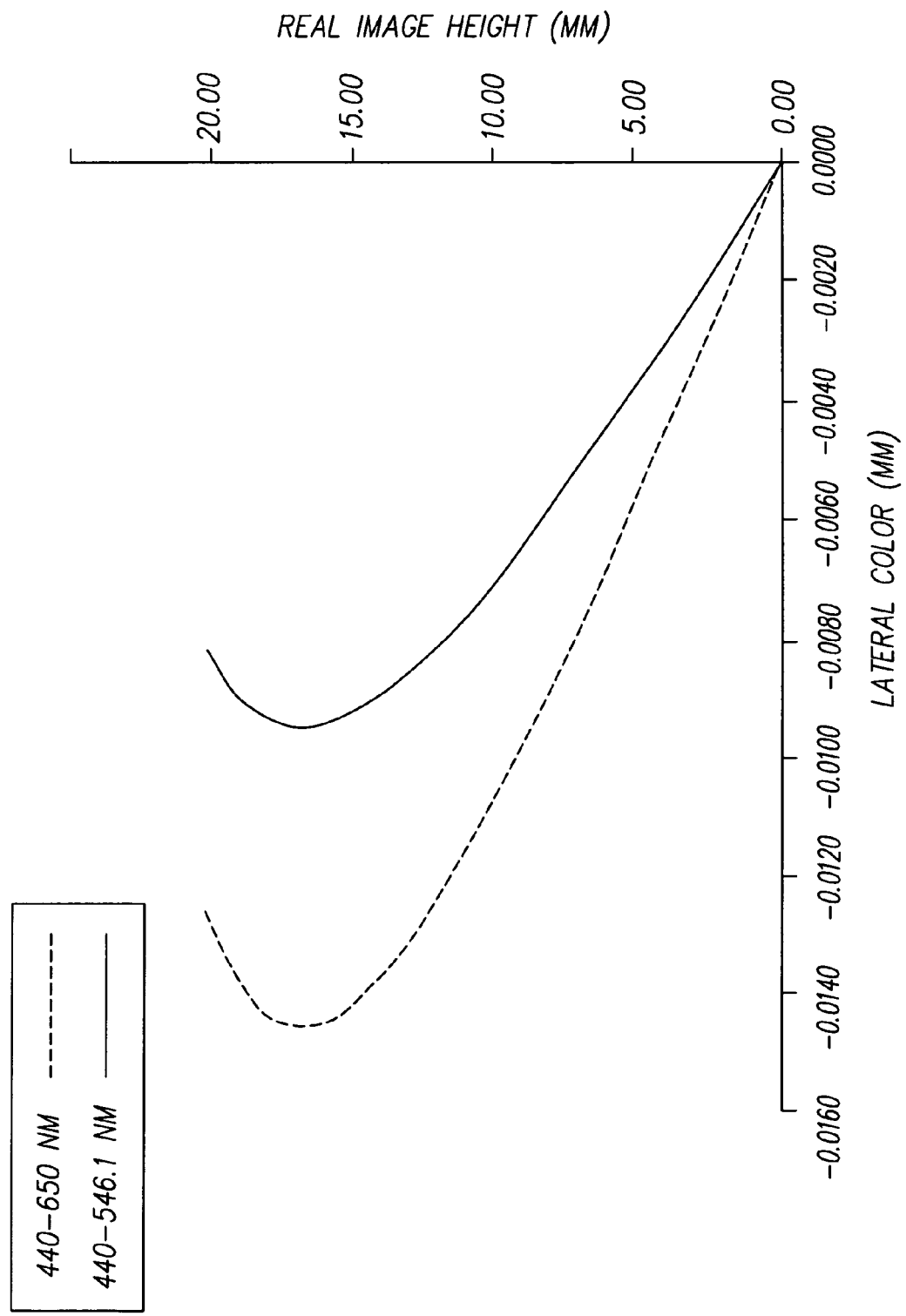
FIGS. 2C and 2D are aberration diagrams of the example embodiment shown in FIGS. 2A and 2B, respectively.
Figure 2D:
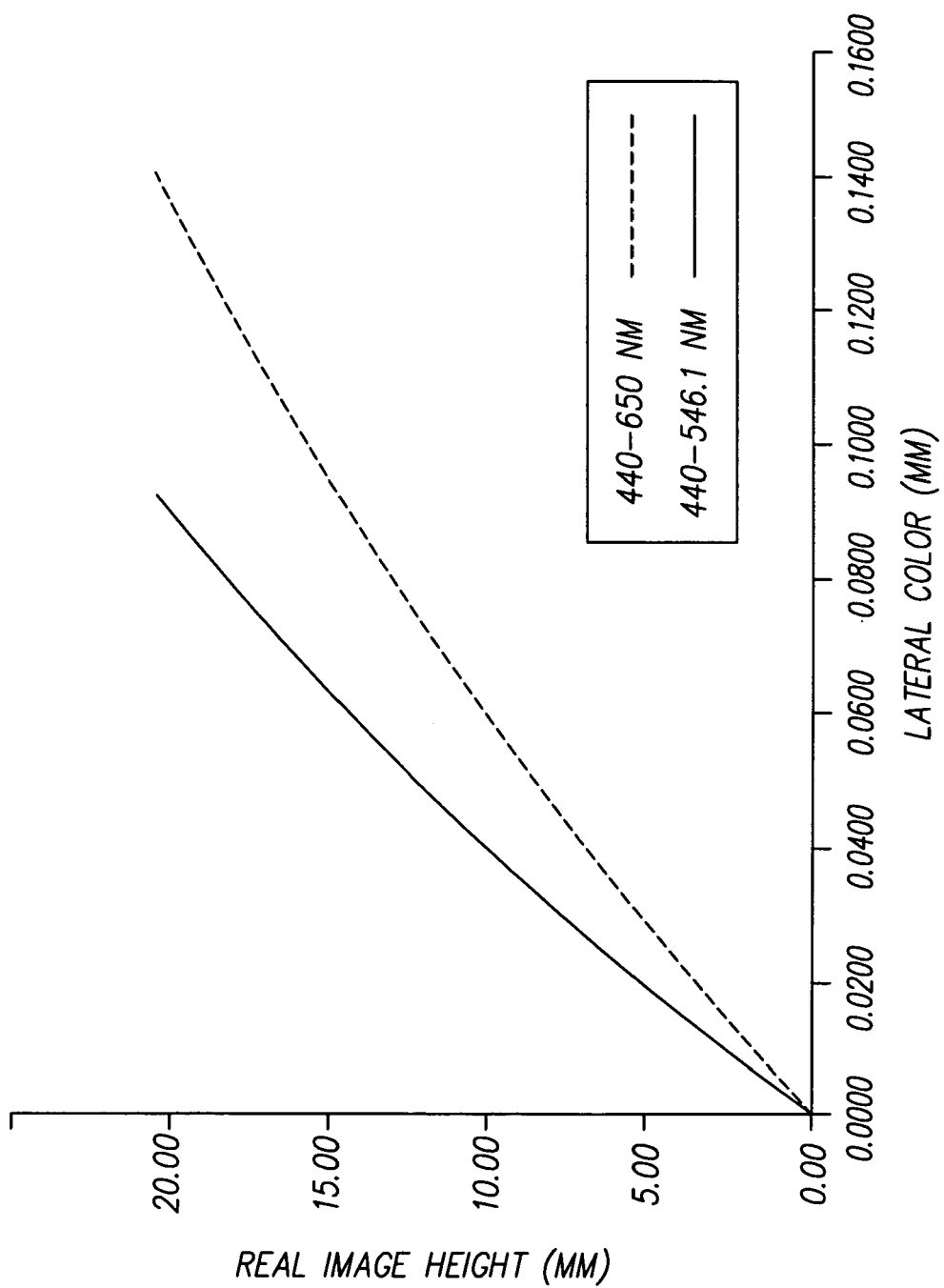

Referring to FIGS. 2C and 2D, lateral color diagrams of the example embodiment shown in FIGS. 2A and 2B, respectively, are shown. Lateral color was measured along the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus the height of the green (546.1 nm) image. Positive secondary lateral color in this situation means that the blue image is larger than the green image.

Figure 2E:
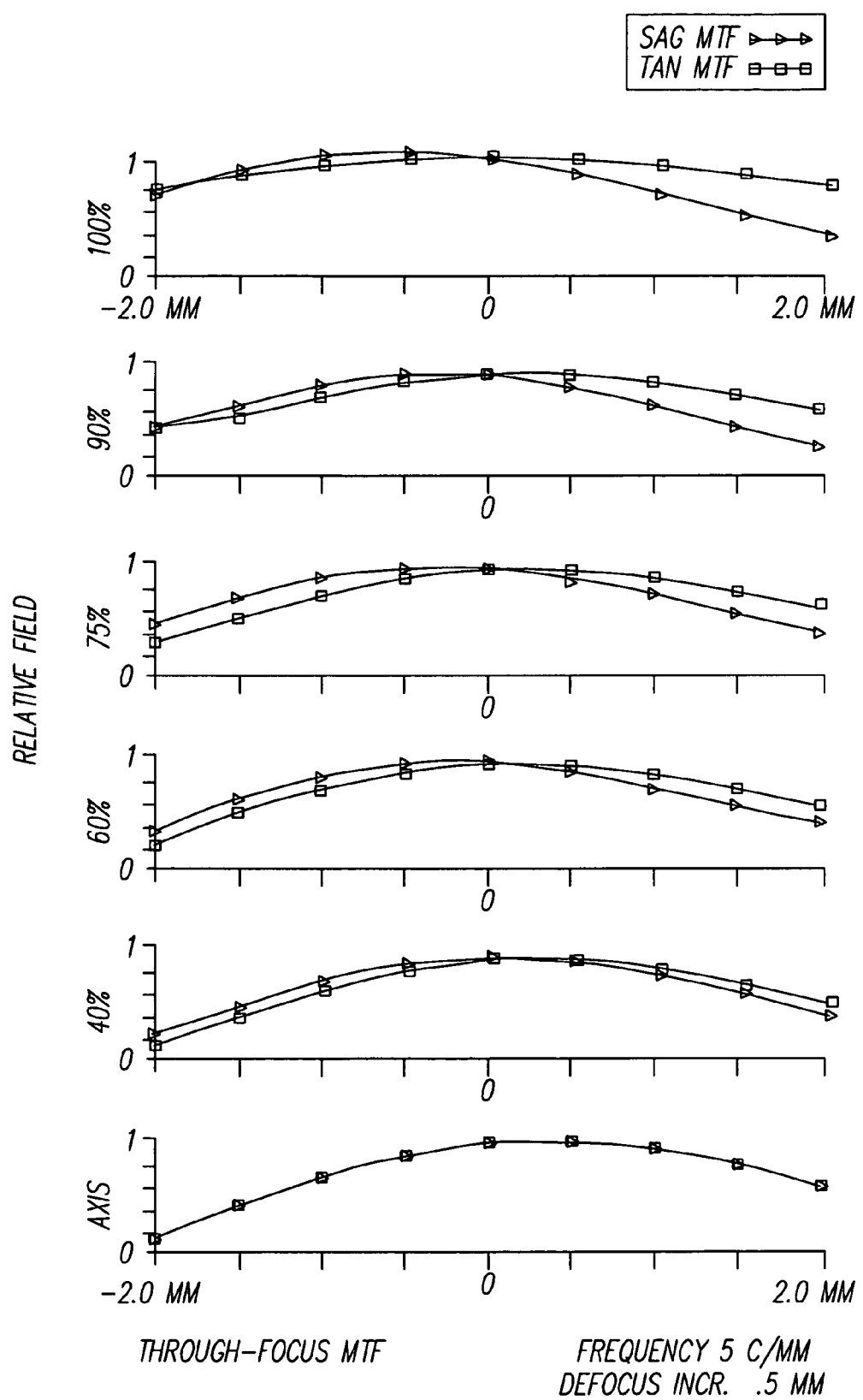
FIGS. 2E and 2F are through focus MTF plots for the example embodiment shown in FIGS. 2A and 2B, respectively.
Figure 2F:
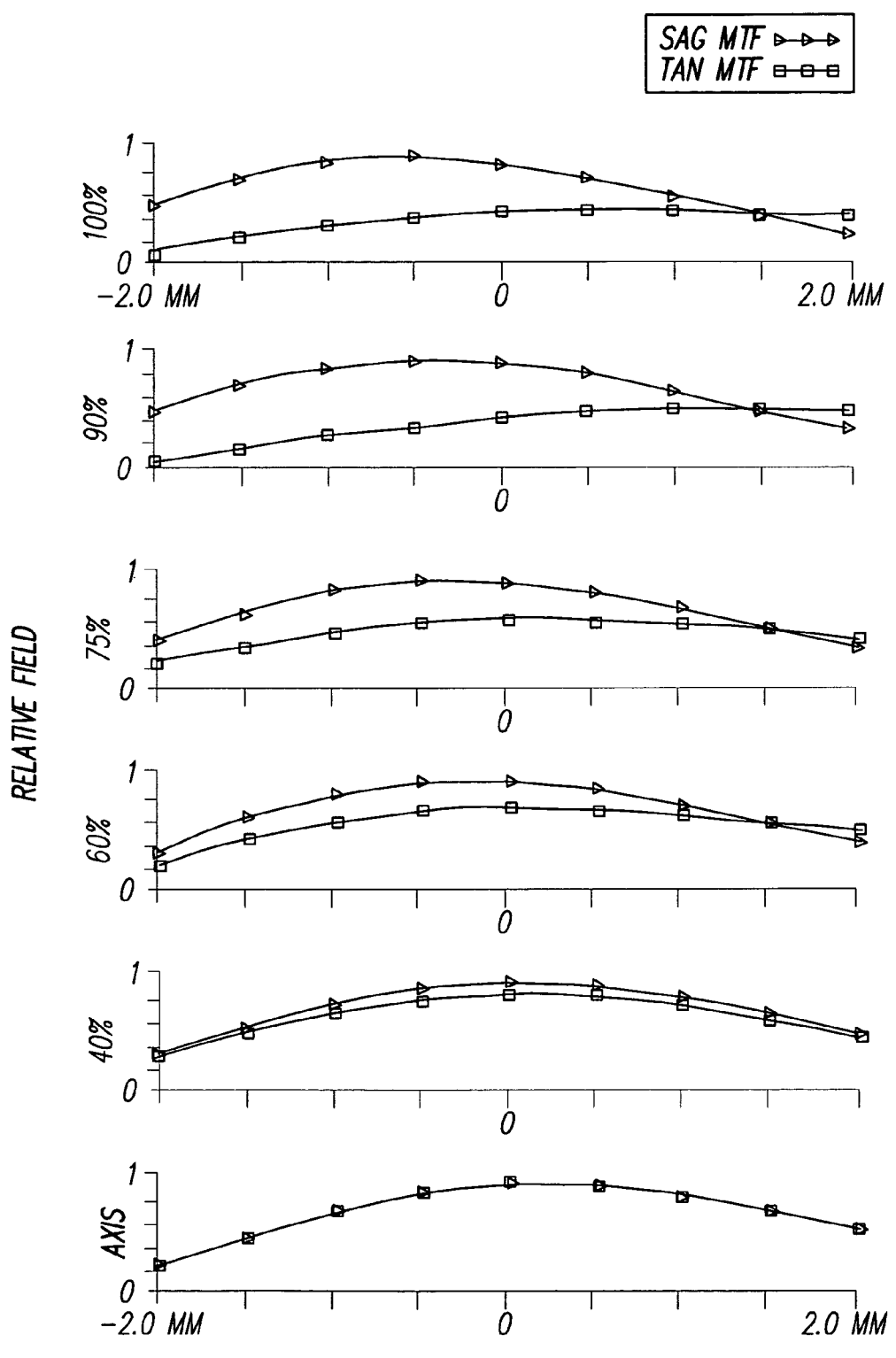

Referring to FIGS. 2E and 2F, through focus MTF performance plots for the example embodiment shown in FIGS. 2A and 2B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/15, 40%/26, 60%/33, 75%/18, 90%/8 and the wavelengths and weights described above.

Figure 3A:
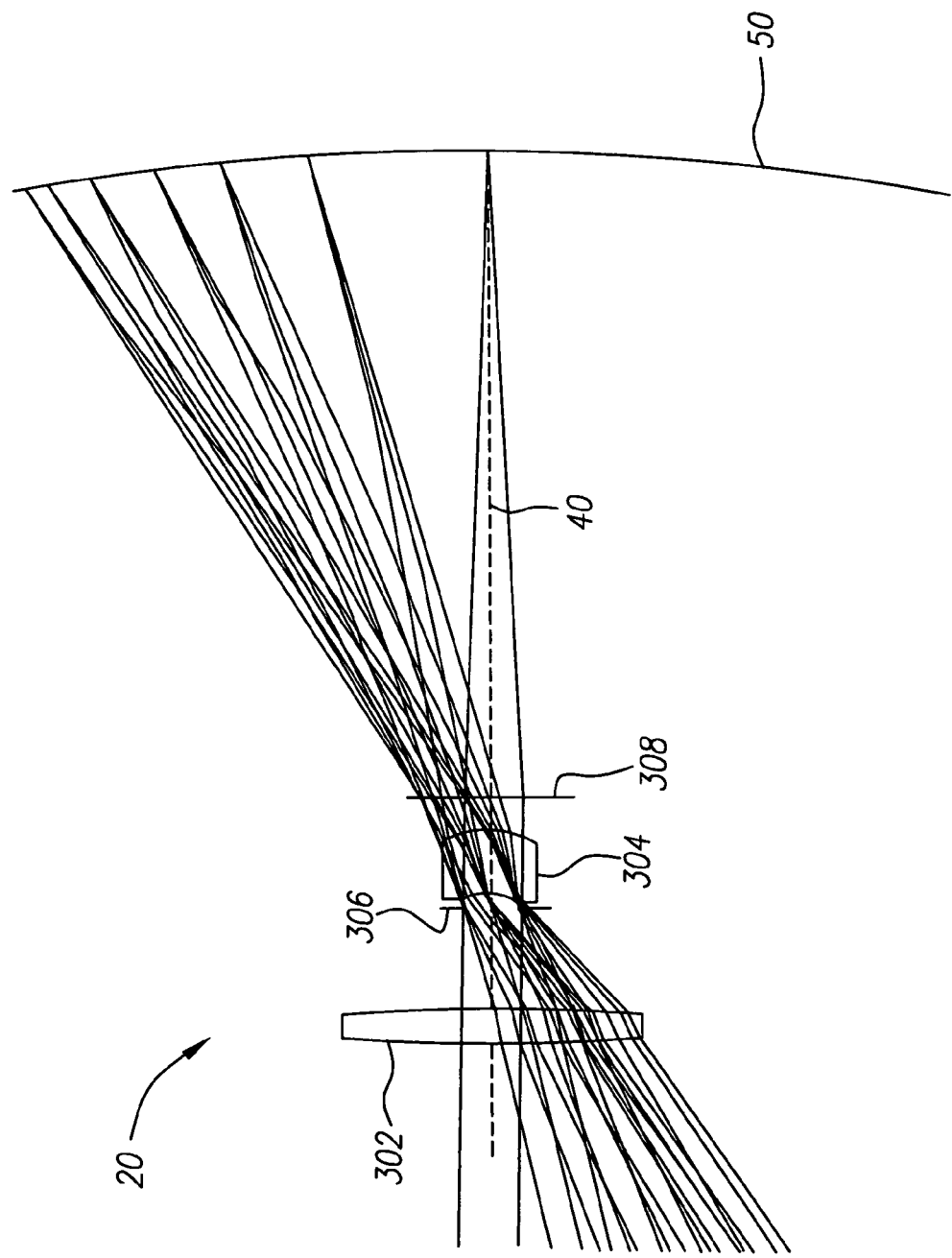
FIGS. 3A and 3B are cross sectional views of a third example embodiment made in accordance with the invention in wide angle and telephoto zoom positions, respectively.
Figure 3B:
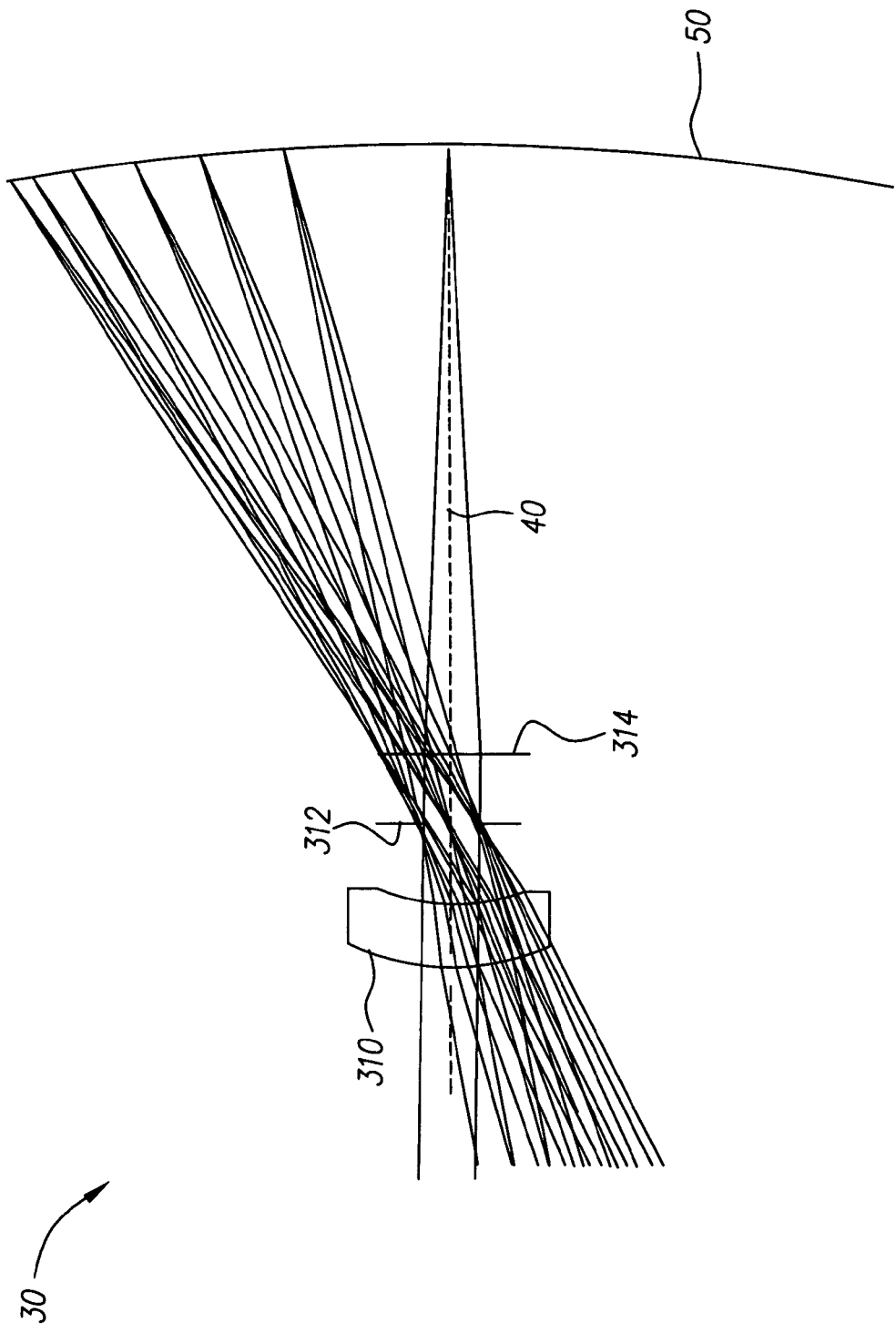

Referring to FIGS. 3A and 3B, cross sectional views of a third example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 302 and a rear lens element 304 as viewed from an object side. Front lens element 302 is biconvex. Rear lens element 304 is meniscus and convex toward image plane 50. Both lens elements 302 and 304 are made from acrylic plastic. An aperture stop 306 is located between lens elements 302 and 304 and a shutter 308 is located on an image side of lens element 304.

Second lens system 30 includes a positive power meniscus lens element 310 convex toward an object side. Lens element 310 has spherical surfaces and is made of acrylic plastic. An aperture stop 312 is located on an image side of lens element 310. A shutter 314 is located on an image side of aperture stop 312.

Tables 3A and 3B provide additional design characteristics for the example embodiment shown in FIGS. 3A and 3B. In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 3A first lens system 20

| SURF. | CLEAR APER. | RADIUS | THICKNESS | INDEX | V |
|---|---|---|---|---|---|
| 1 | 12.19 | 105.824 | 1.639 | 1.492 | 57.4 |
| 2 | 11.14 | −46.1229 | 3.877 | | |
|   | 2.62 | DIAPHRAGM | 0.521 | | |
| 3 | 2.81 | −8.00000 | 3.751 | 1.492 | 57.4 |
| 4 | 5.31 | −6.86460 | 1.350 | | |
|   | 6.79 | SHUTTER | | | |

LENS LENGTH: 9.788

BF: 31.92

FF: 21.43

BEST FOCUS: −0.519

TABLE 3B second lens system 30

| SURF. | CLEAR APER. | RADIUS | THICKNESS | INDEX | V |
|---|---|---|---|---|---|
| 1 | 10.56 | 9.28710 | 3.000 | 1.492 | 57.4 |
| 2 | 8.37 | 14.5761 | 4.480 | | |
|   | 2.89 | DIAPHRAGM | 4.000 | | |
|   | 6.79 | SHUTTER | | | |

LENS LENGTH: 3.000

BF: 38.99

FF: 46.62

BEST FOCUS: −0.781

Figure 3C:
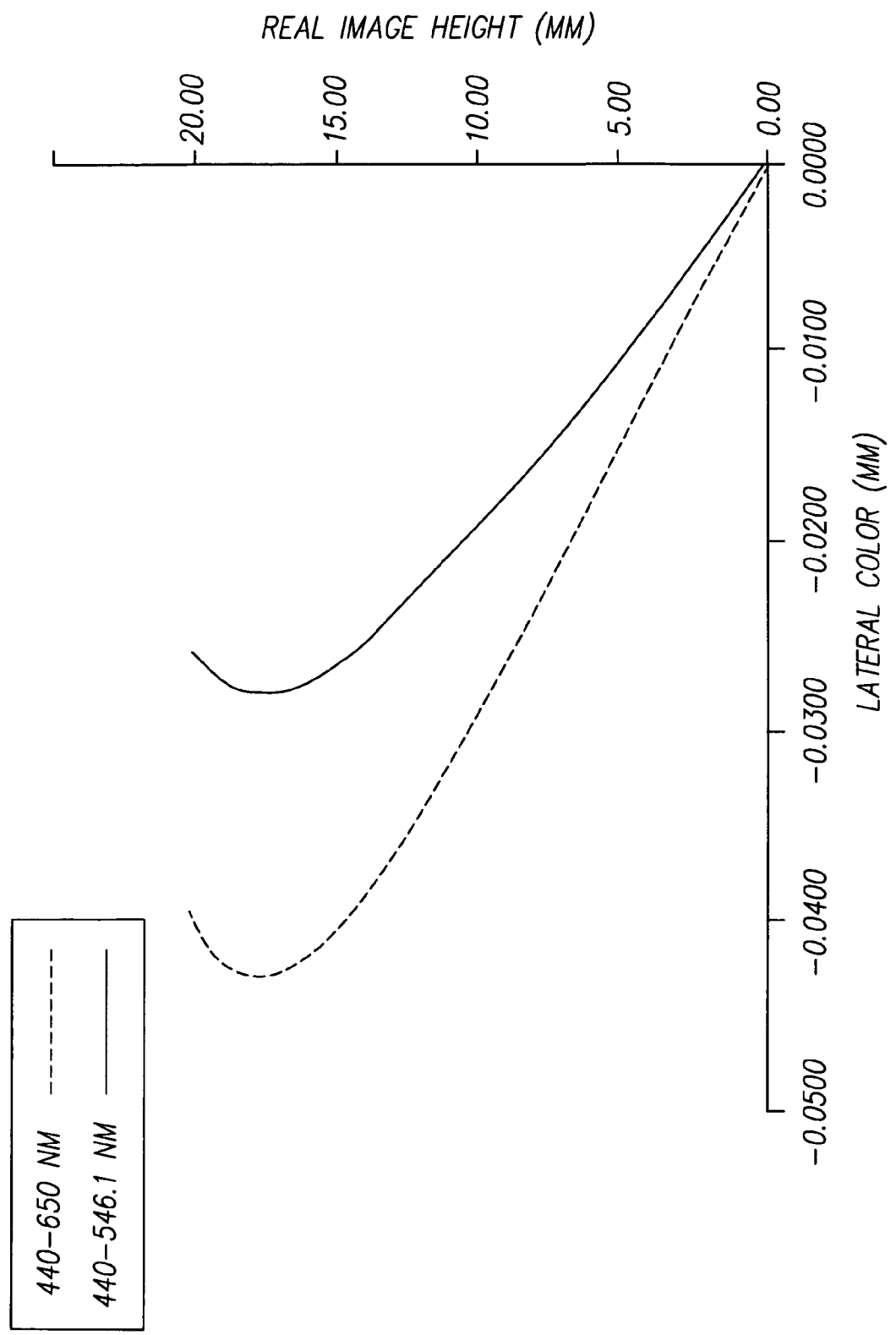
FIGS. 3C and 3D are aberration diagrams of the example embodiment shown in FIGS. 3A and 3B, respectively.
Figure 3D:
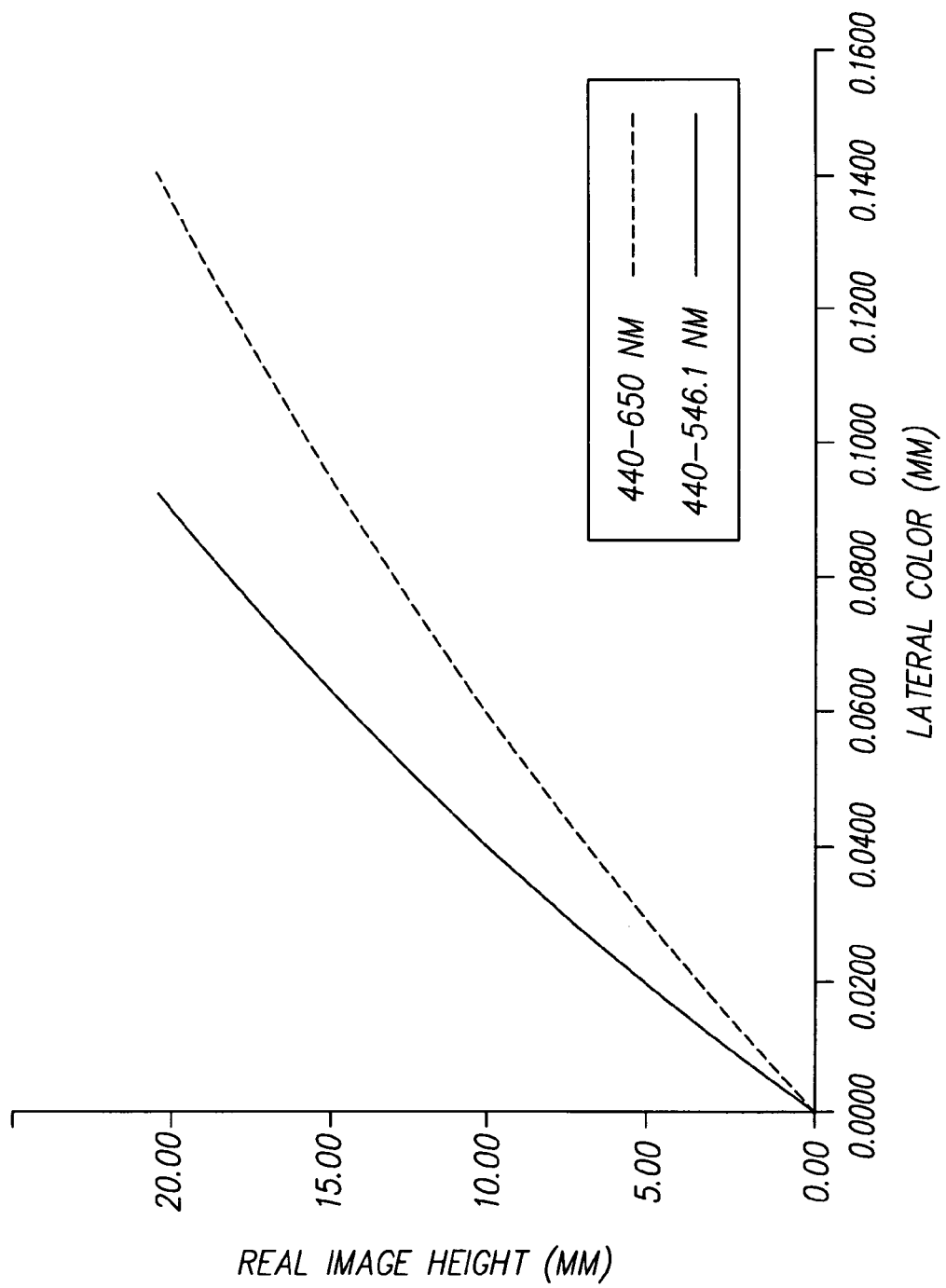

Referring to FIGS. 3C and 3D, lateral color diagrams of the example embodiment shown in FIGS. 3A and 3B, respectively, are shown. Lateral color was measured along the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus the height of the green (546.1 nm) image. Positive secondary lateral color in this situation means that the blue image is larger than the green image.

Figure 3E:
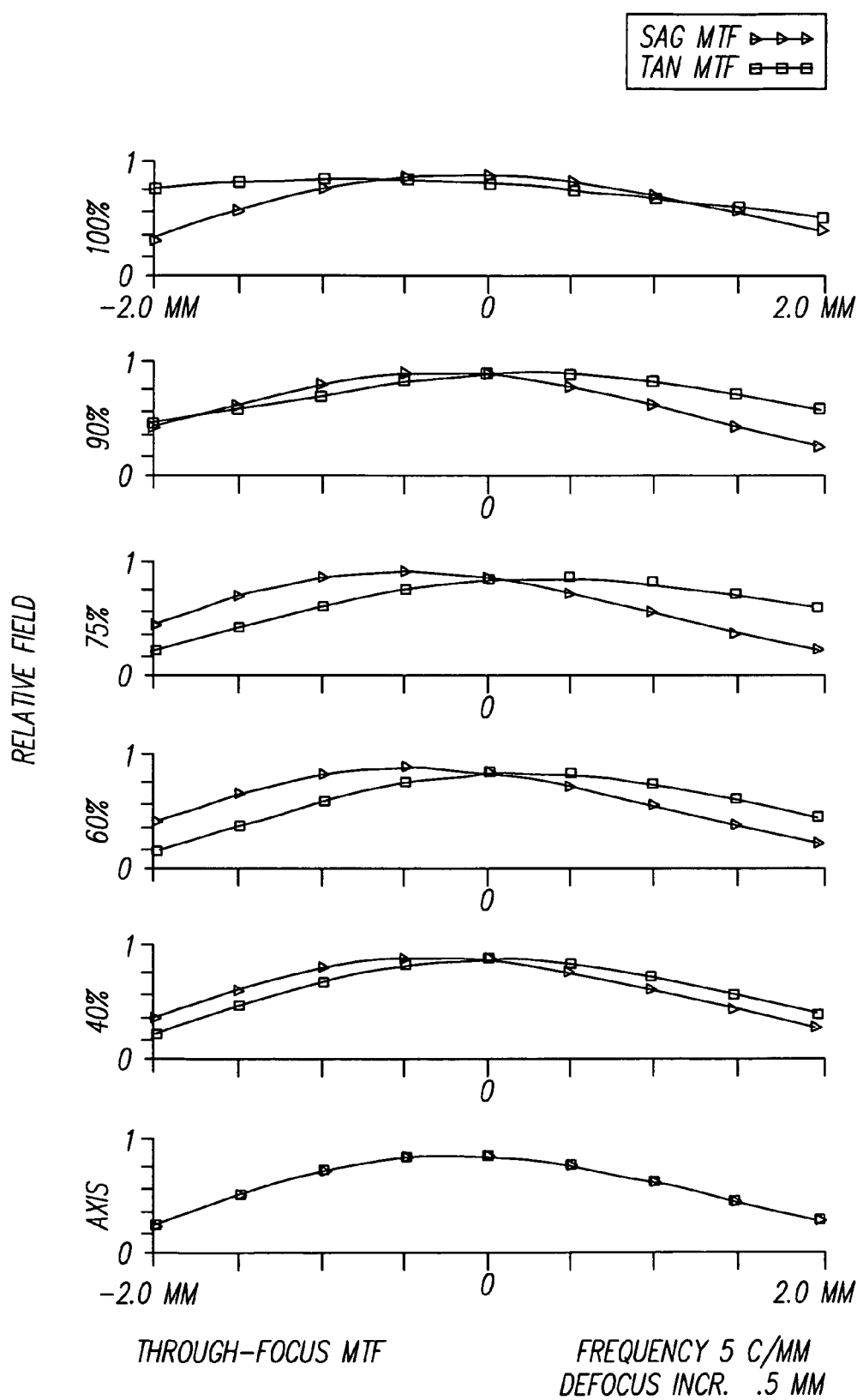
FIGS. 3E and 3F are through focus MTF plots for the example embodiment shown in FIGS. 3A and 3B, respectively.
Figure 3F:
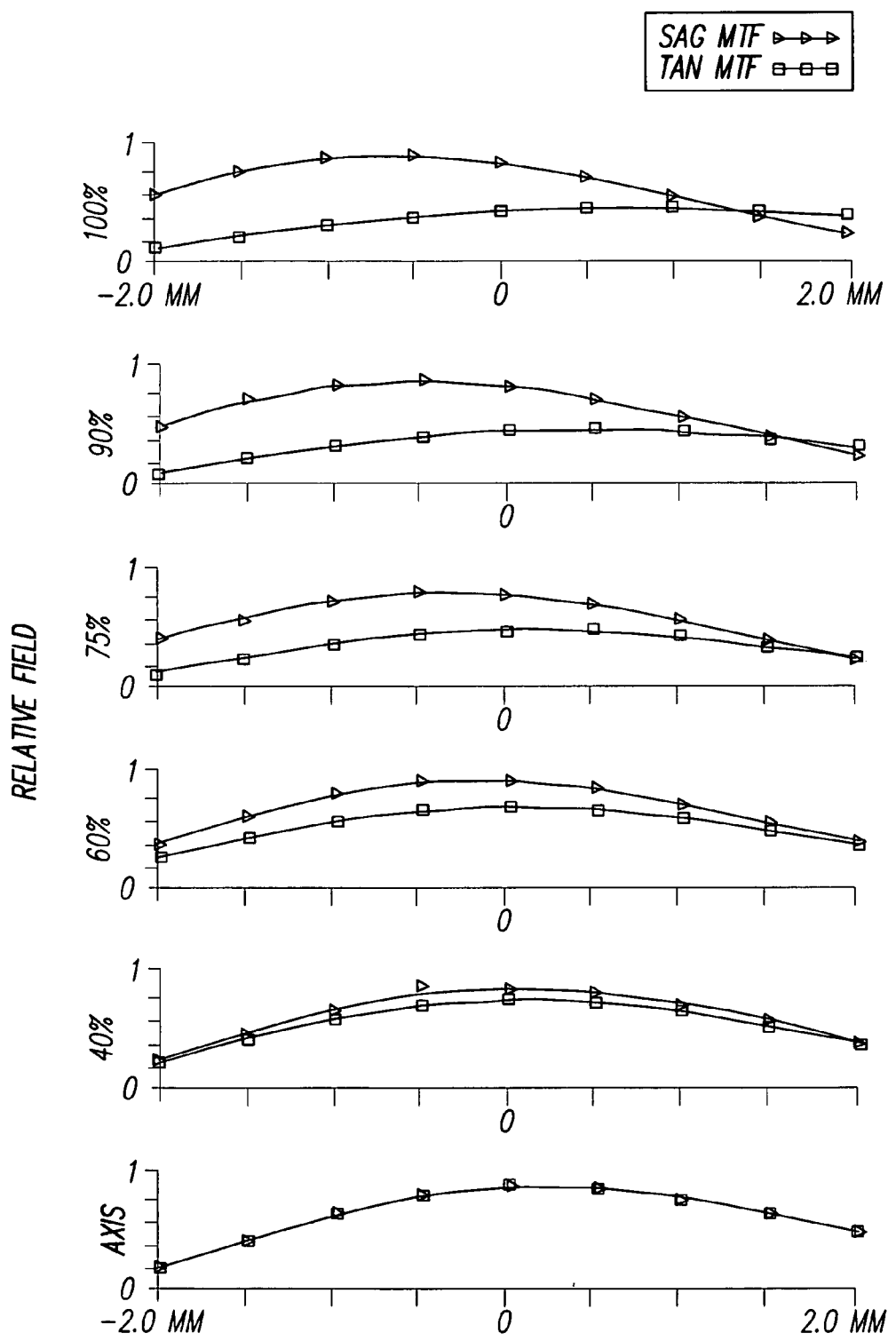

Referring to FIGS. 3E and 3F, through focus MTF performance plots for the example embodiment shown in FIGS. 3A and 3B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/15, 40%/26, 60%/33, 75%/18, 90%/8 and the wavelengths and weights described above.

Figure 4A:
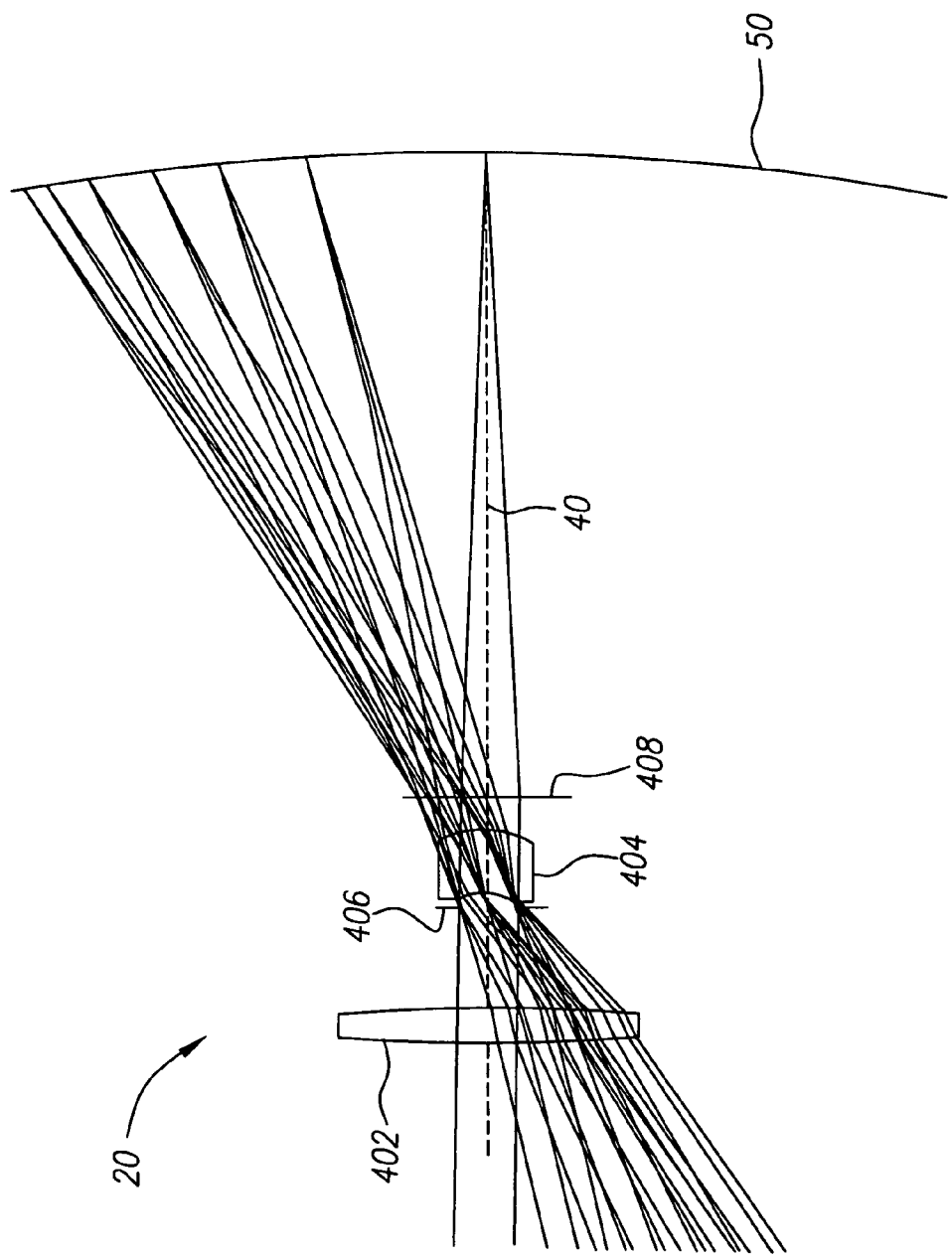
FIGS. 4A and 4B are cross sectional views of a fourth example embodiment made in accordance with the invention in wide angle and telephoto zoom positions, respectively.
Figure 4B:
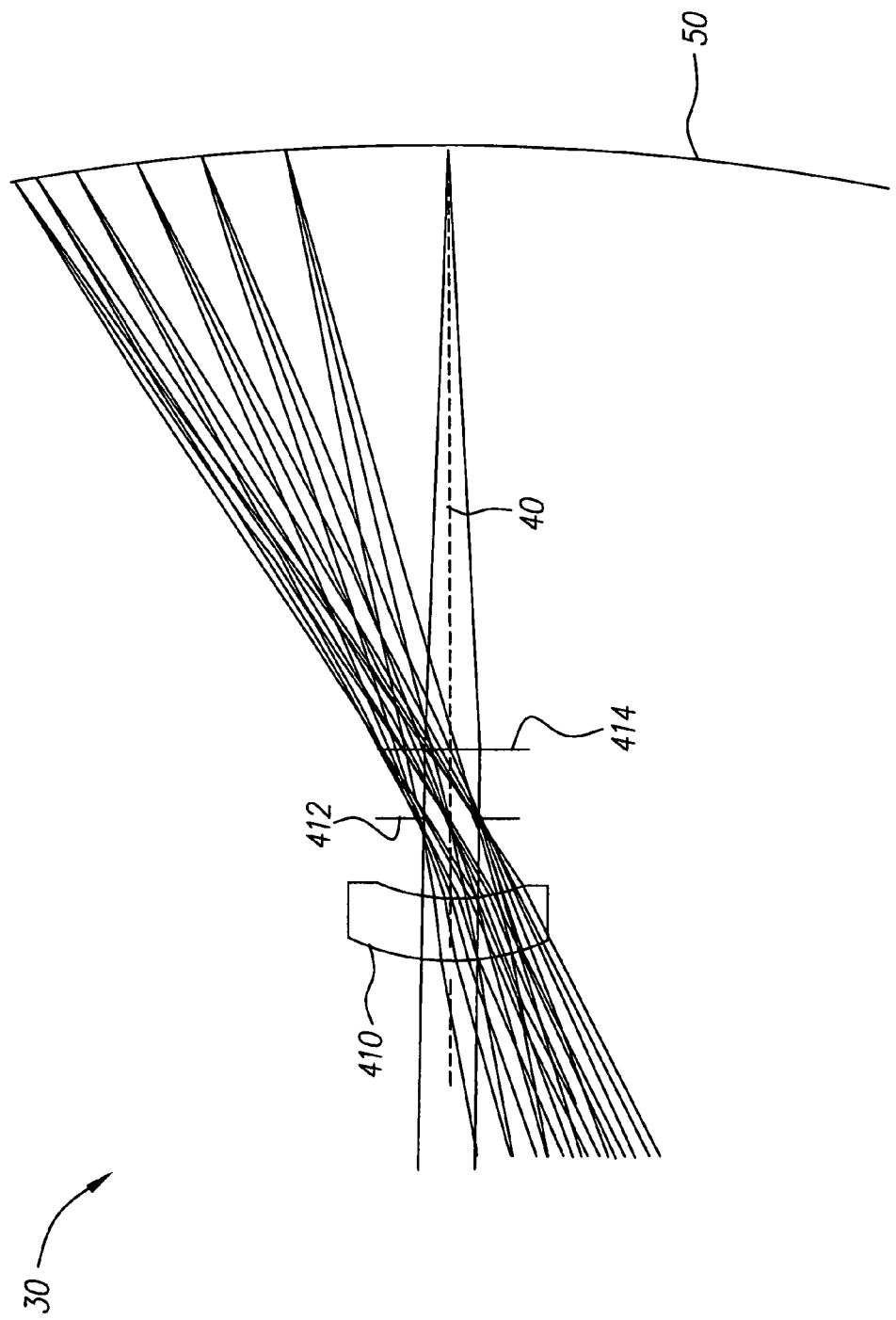

Referring to FIGS. 4A and 4B, cross sectional views of a fourth example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 402 and a rear lens element 404 as viewed from an object side. Front lens element 402 is meniscus and convex toward image plane 50. Rear lens element 404 is meniscus and convex toward image plane 50. Both lens elements 402 and 404 are made from acrylic plastic. An aperture stop 406 is located between lens elements 402 and 404 and a shutter 408 is located on an image side of lens element 404. Front lens element 402 includes an aspheric surface on its image side surface.

Second lens system 30 includes a positive power meniscus lens element 410 convex toward an object side. Lens element 410 has spherical surfaces and is made of acrylic plastic. An aperture stop 412 is located on an image side of lens element 410. A shutter 414 is located on an image side of aperture stop 412.

Tables 4A and 4B provide additional design characteristics for the example embodiment shown in FIGS. 4A and 4B. In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 4A first lens system 20

| SURF. | CLEAR APER. | RADIUS | THICKNESS | INDEX | V |
|---|---|---|---|---|---|
| 1 | 12.76 | −232.718 | 1.629 | 1.492 | 57.4 |
| 2 | 11.79 | ASPHERE | 3.989 | | |
| | 2.62 | DIAPHRAGM | 0.521 | | |
| 3 | 2.81 | −8.00000 | 3.751 | 1.492 | 57.4 |
| 4 | 5.26 | −6.86460 | 1.350 | | |
| | 6.79 | SHUTTER | | | |

LENS LENGTH: 9.890

BF: 32.15

FF: 21.20

BEST FOCUS: −0.756

ASPHERIC EQUATION:

$$X = \frac{CY^2}{1 + \sqrt{1 - (k+1)C^2 Y^2}} + DY^4 + EY^6 + FY^8$$

SURF. 2:    C = −0.0349157288    D = −0.22651633E−03    F = −0.39501434E−07
           k = −52.53574309    E = 0.45422977E−05
VERTEX RADIUS = (1/C) = −28.6403874

TABLE 4B second lens system 30

| SURF. | CLEAR APER. | RADIUS | THICKNESS | INDEX | V |
|---|---|---|---|---|---|
| 1 | 10.37 | 9.28710 | 3.000 | 1.492 | 57.4 |
| 2 | 8.16 | 14.5761 | 4.480 | | |
| | 2.67 | DIAPHRAGM | 4.340 | | |
| | 6.79 | SHUTTER | | | |

LENS LENGTH: 3.00

BF: 38.99

FF: 46.62

BEST FOCUS: −0.441

Figure 4C:
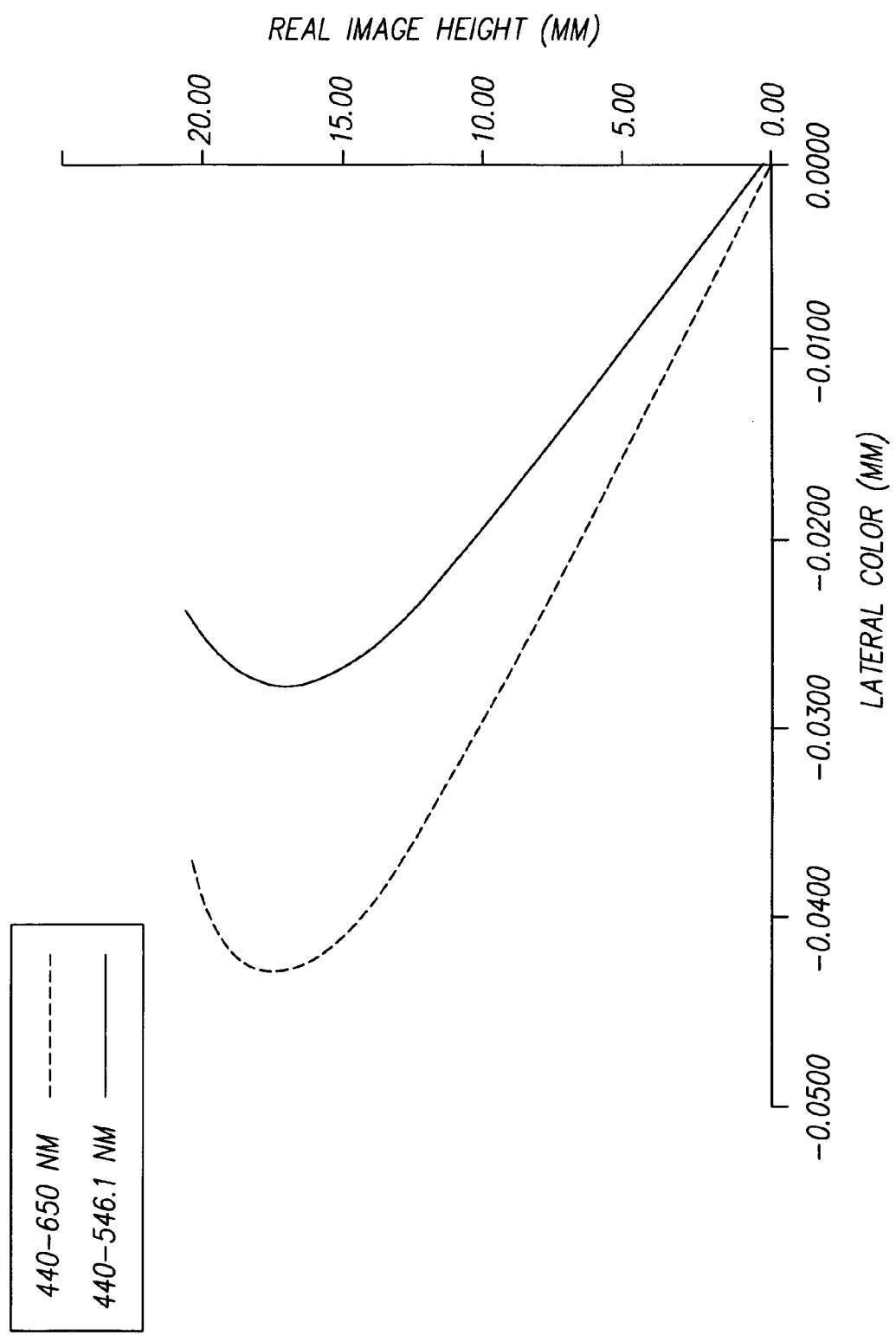
FIGS. 4C and 4D are aberration diagrams of the example embodiment shown in FIGS. 4A and 4B, respectively.
Figure 4D:
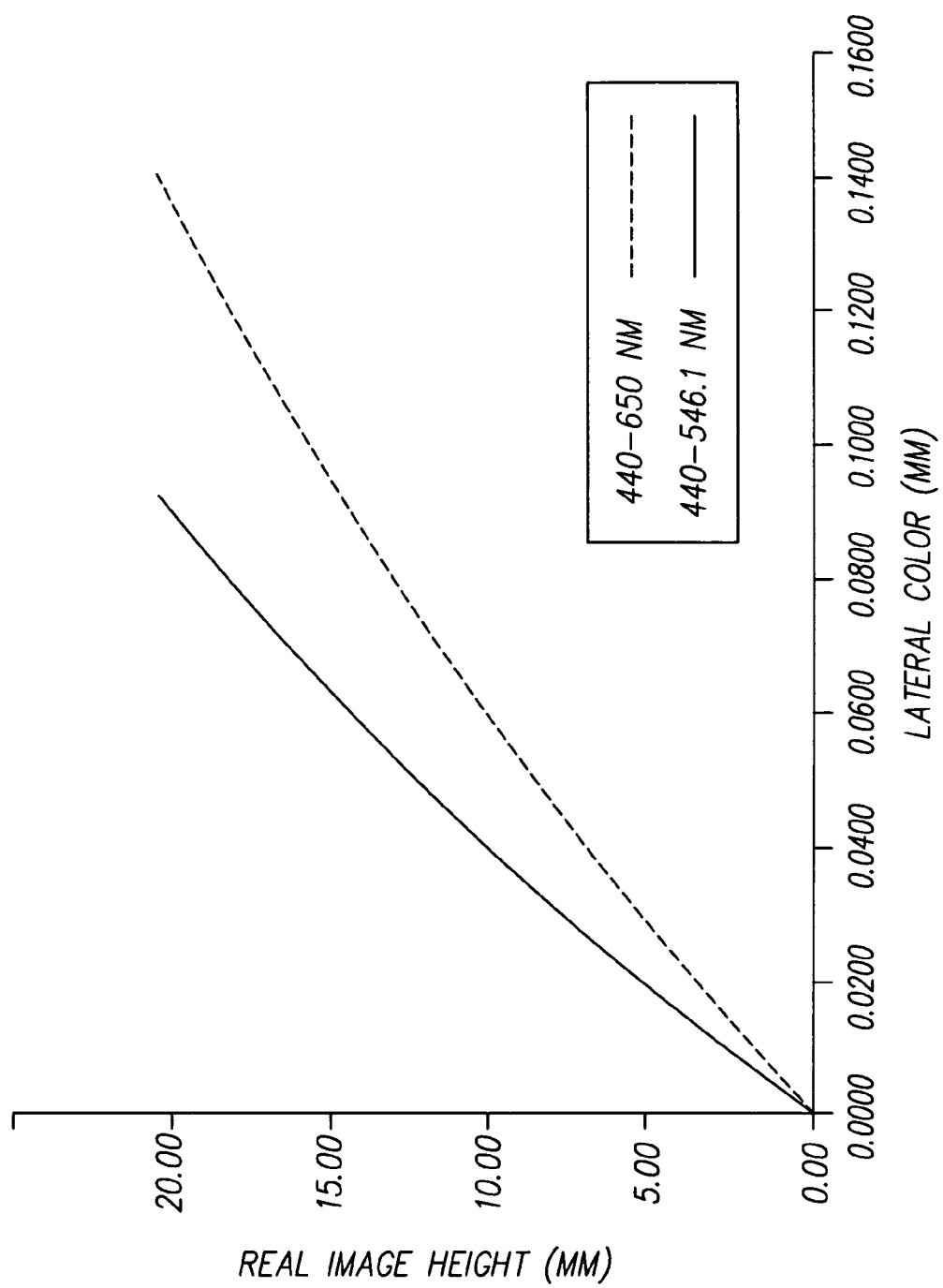

Referring to FIGS. 4C and 4D, lateral color diagrams of the example embodiment shown in FIGS. 4A and 4B, respectively, are shown. Lateral color was measured along the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus the height of the green (546.1 nm) image. Positive secondary lateral color in this situation means that the blue image is larger than the green image.

Figure 4E:
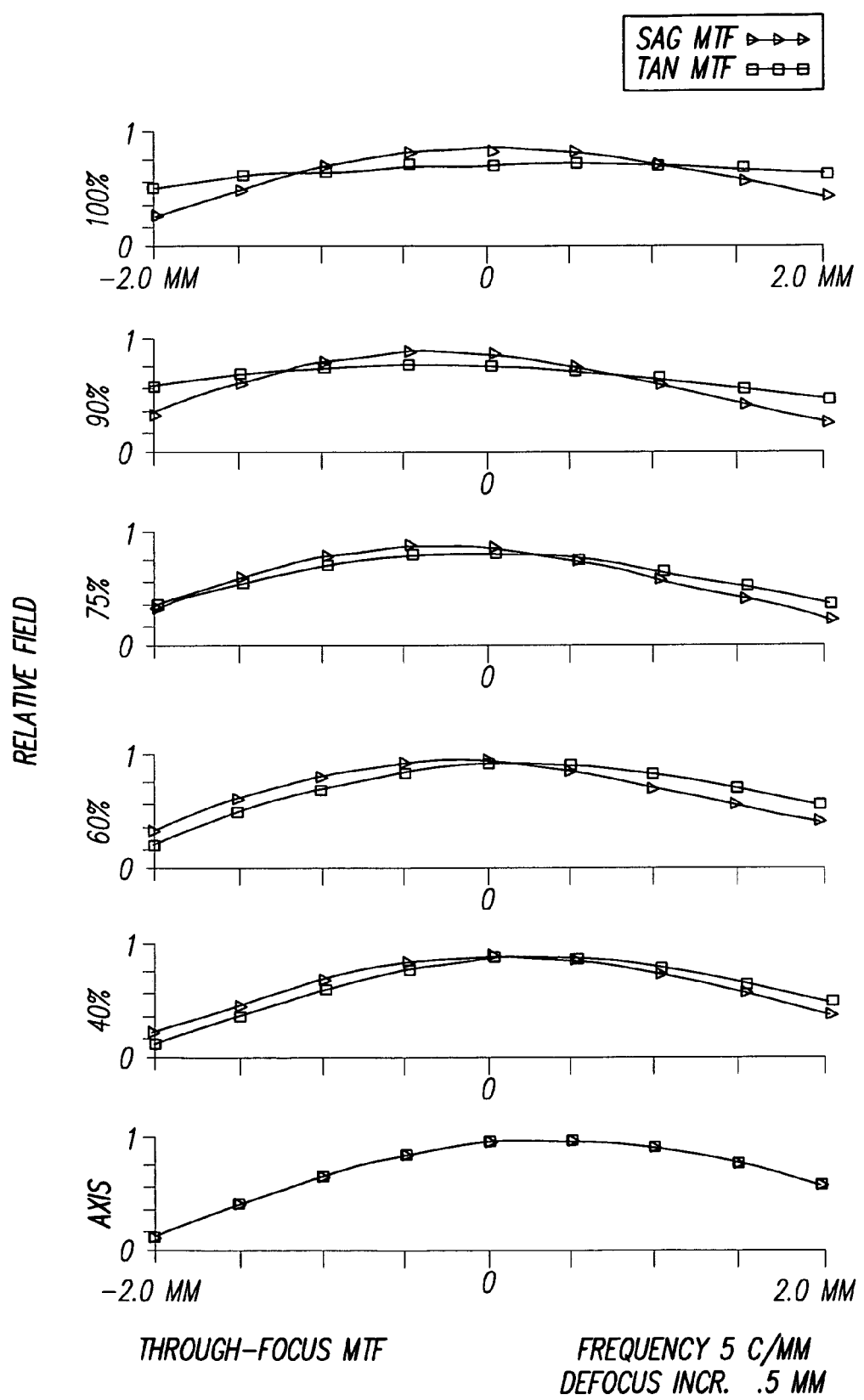
FIGS. 4E and 4F are through focus MTF plots for the example embodiment shown in FIGS. 4A and 4B, respectively.
Figure 4F:
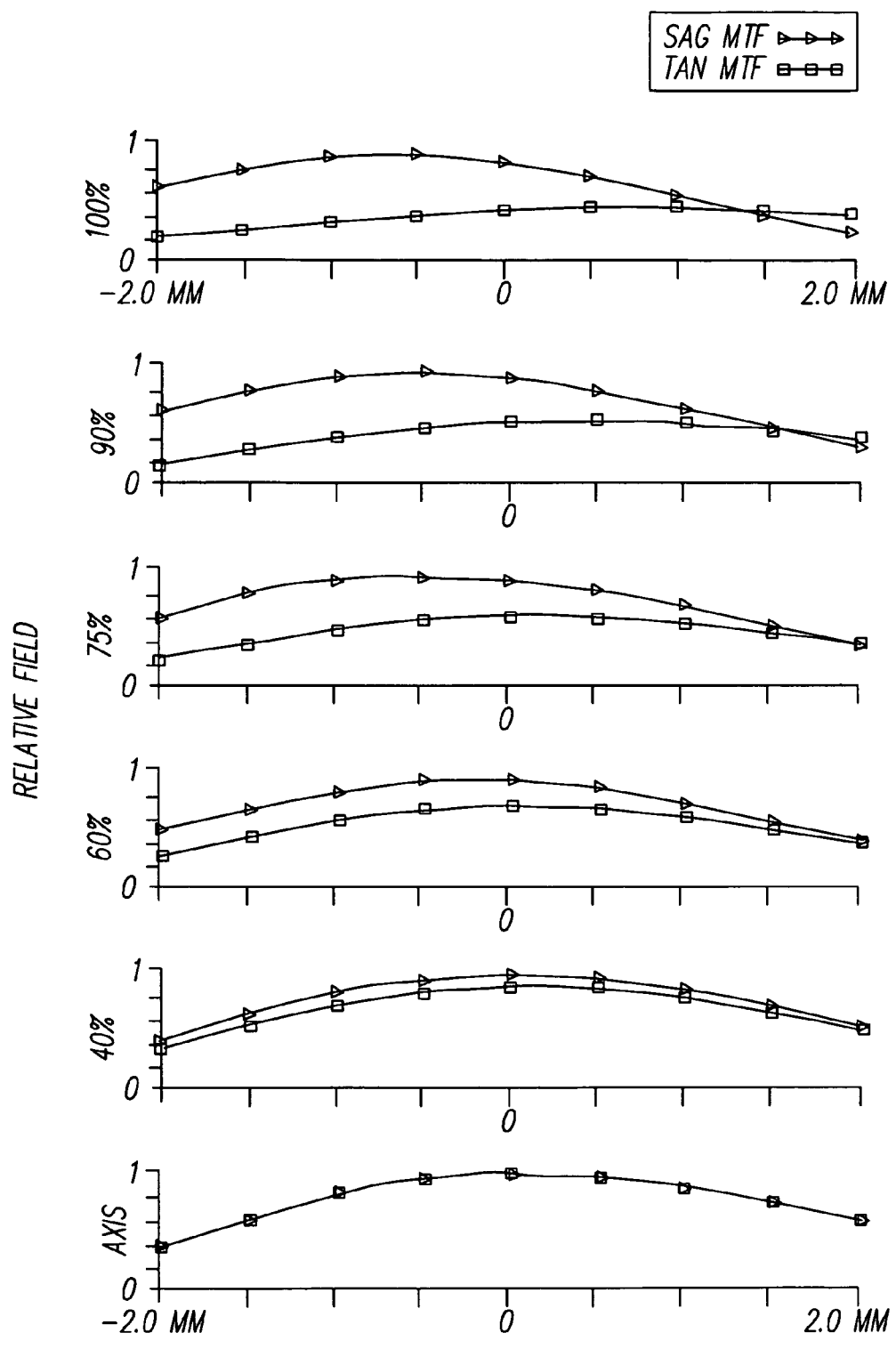

Referring to FIGS. 4E and 4F, through focus MTF performance plots for the example embodiment shown in FIGS. 4A and 4B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/15, 40%/26, 60%/33, 75%/18, 90%/8 and the wavelengths and weights described above.

Figure 5A:
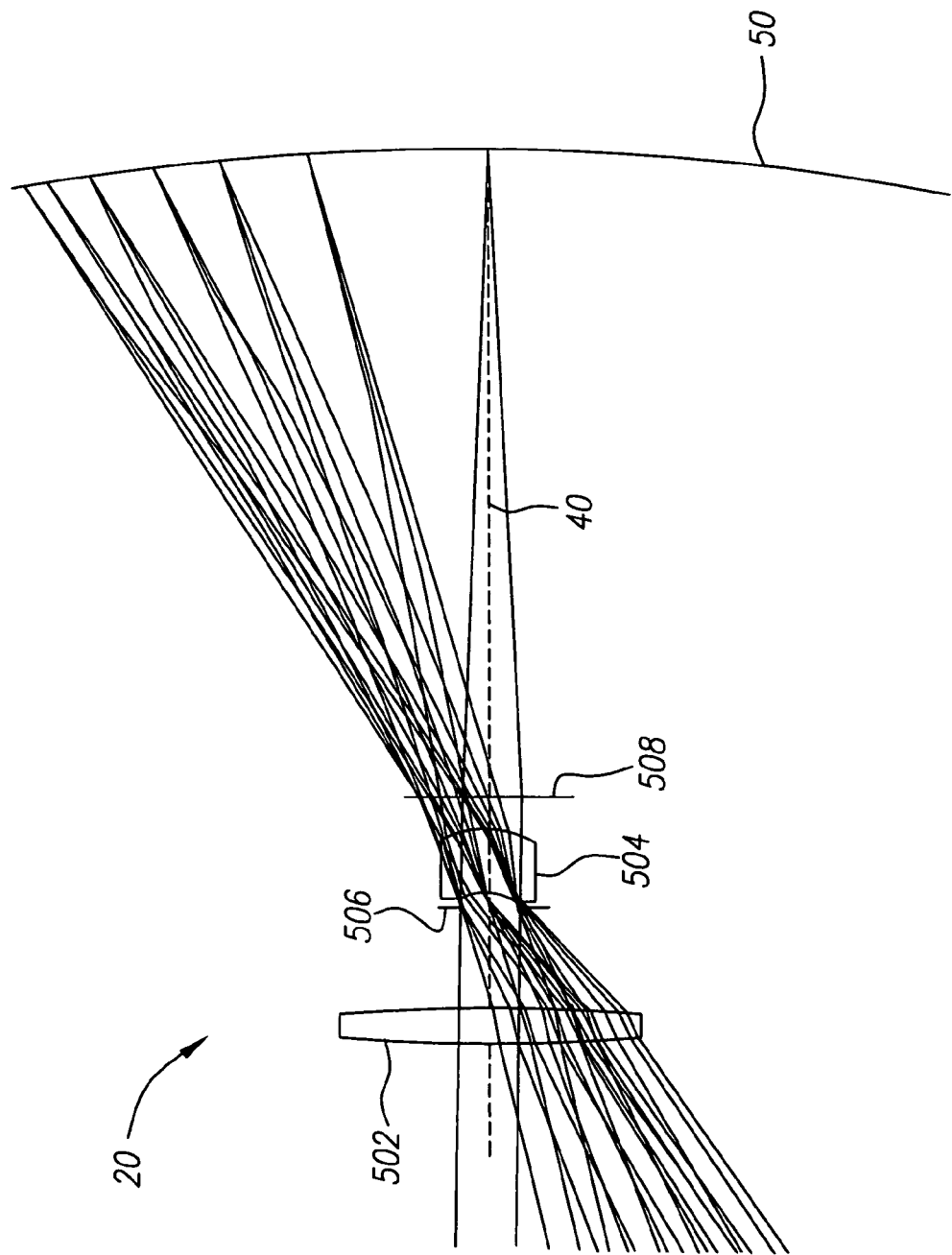
FIGS. 5A and 5B are cross sectional views of a fifth example embodiment made in accordance with the invention in wide angle and telephoto zoom positions, respectively.
Figure 5B:
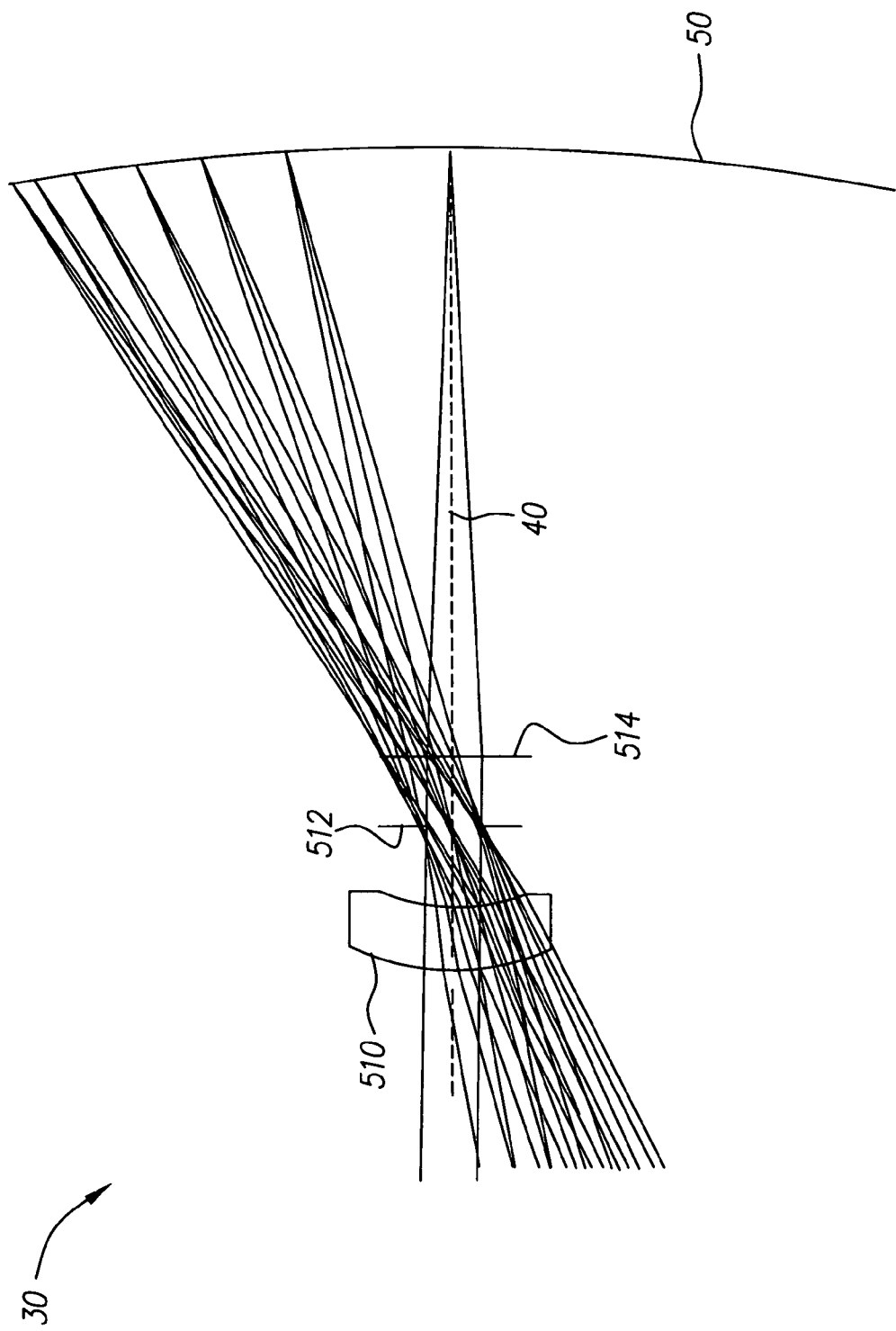

Referring to FIGS. 5A and 5B, cross sectional views of a fifth example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 502 and a rear lens element 504 as viewed from an object side. Front lens element 502 is biconvex. Rear lens element 504 is meniscus and convex toward image plane 50. Both lens elements 502 and 504 are made from acrylic plastic. An aperture stop 506 is located between lens elements 502 and 504 and a shutter 508 is located on an image side of lens element 504. Front lens element 502 includes an aspheric surface on its object side surface.

Second lens system 30 includes a positive power meniscus lens element 510 convex toward an object side. Lens element 510 has spherical surfaces and is made of acrylic plastic. An aperture stop 512 is located on an image side of lens element 510. A shutter 514 is located on an image side of aperture stop 512.

Tables 5A and 5B provide additional design characteristics for the example embodiment shown in FIGS. 5A and 5B. In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 5A first lens system 20

| SURF. | CLEAR APER. | RADIUS | THICKNESS | INDEX | V |
|---|---|---|---|---|---|
| 1 | 12.09 | ASPHERE | 1.610 | 1.492 | 57.4 |
| 2 | 11.05 | −52.2346 | 3.908 | | |
| | 2.62 | DIAPHRAGM | 0.521 | | |
| 3 | 2.81 | −8.00000 | 3.751 | 1.492 | 57.4 |

TABLE 5A-continued first lens system 20

| SURF. | CLEAR APER. | RADIUS | THICKNESS | INDEX | V |
|---|---|---|---|---|---|
| 4 | 5.26 | −6.86460 | 1.350 | | |
| | 6.79 | SHUTTER | | | |

LENS LENGTH: 9.790

BF: 31.84

FF: 21.46

BEST FOCUS: −0.442

ASPHERIC EQUATION:

$$X = \frac{CY^2}{1 + \sqrt{1 - (k+1)C^2 Y^2}} + DY^4 + EY^6 + FY^8$$

| SURF. 1: | C = .012114119475 | D = .15704399E−03 | F = .27346388E−07 |
|---|---|---|---|
| | k = −1146.1888082 | E = −.32087938E−05 | |
| VERTEX RADIUS = (1/C) = 82.54830259 | | | |

TABLE 5B second lens system 30

| SURF. | CLEAR APER. | RADIUS | THICKNESS | INDEX | V |
|---|---|---|---|---|---|
| 1 | 10.37 | 9.28710 | 3.000 | 1.492 | 57.4 |
| 2 | 8.16 | 14.5761 | 4.480 | | |
| | 2.67 | DIAPHRAGM | 4.340 | | |
| | 6.79 | SHUTTER | | | |

LENS LENGTH: 3.00

BF: 38.99

FF: 46.62

BEST FOCUS: −0.441

Figure 5C:
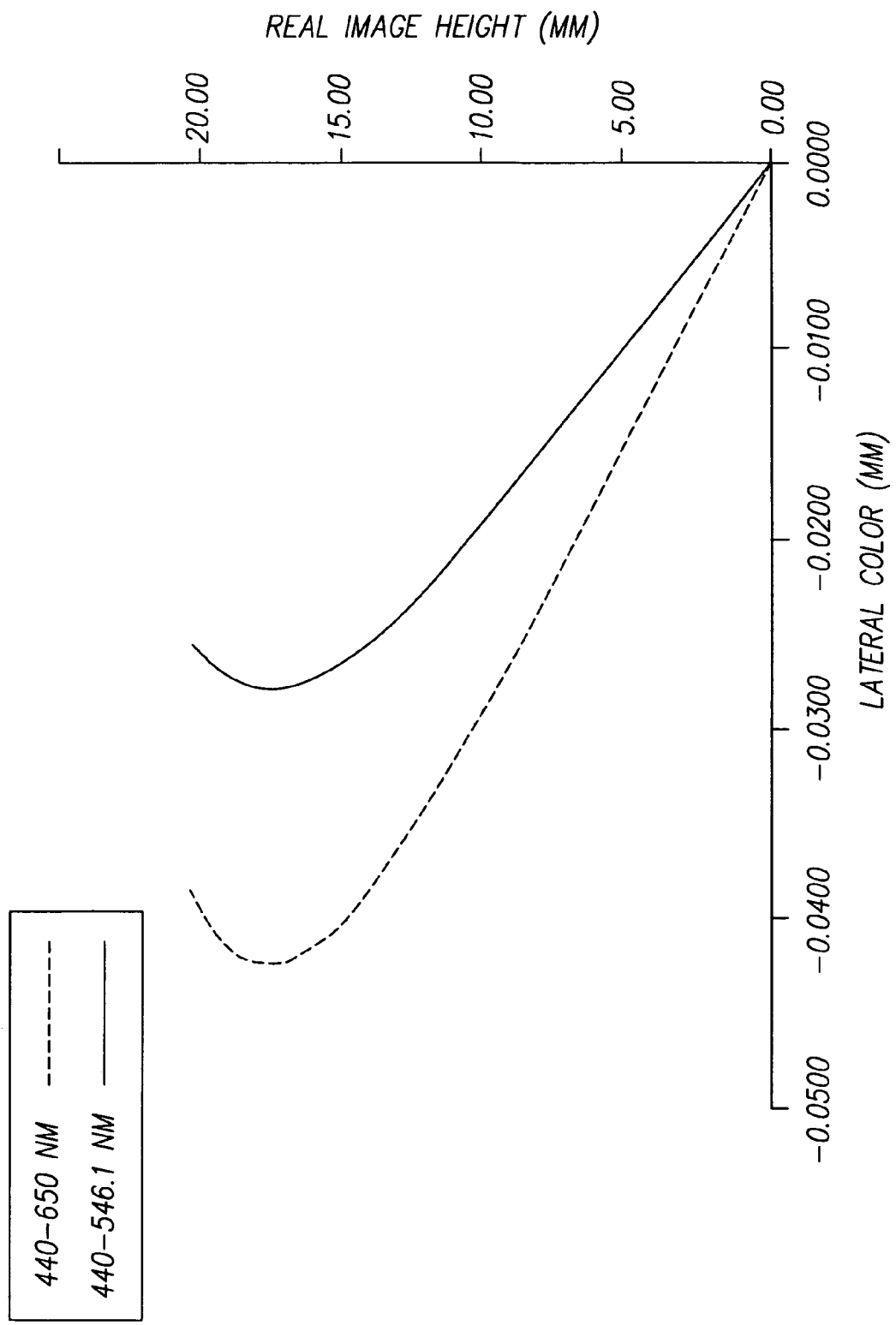
FIGS. 5C and 5D are aberration diagrams of the example embodiment shown in FIGS. 5A and 5B, respectively.
Figure 5D:
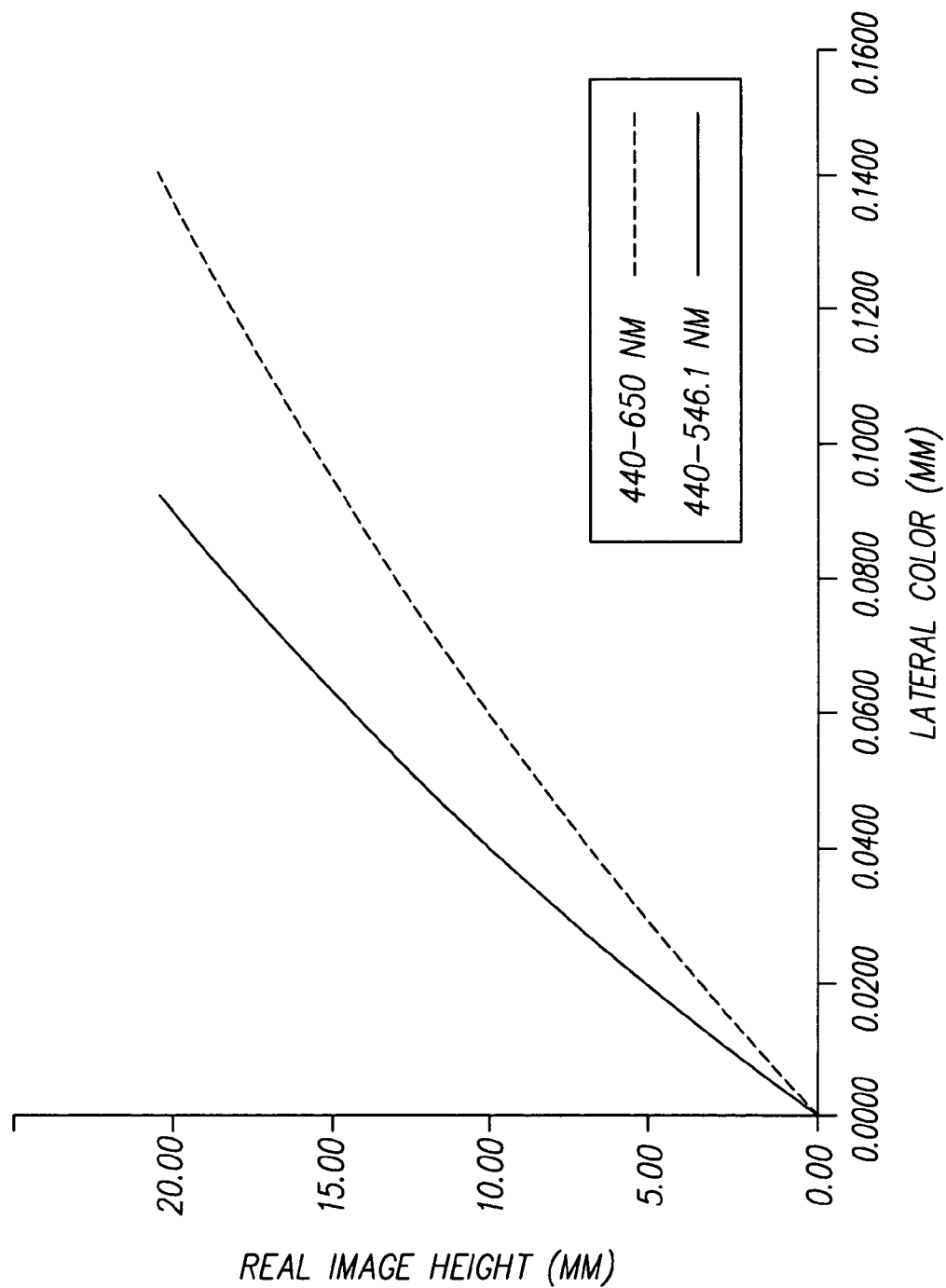

Referring to FIGS. 5C and 5D, lateral color diagrams of the example embodiment shown in FIGS. 5A and 5B, respectively, are shown. Lateral color was measured along the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus the height of the green (546.1 nm) image. Positive secondary lateral color in this situation means that the blue image is larger than the green image.

Figure 5E:
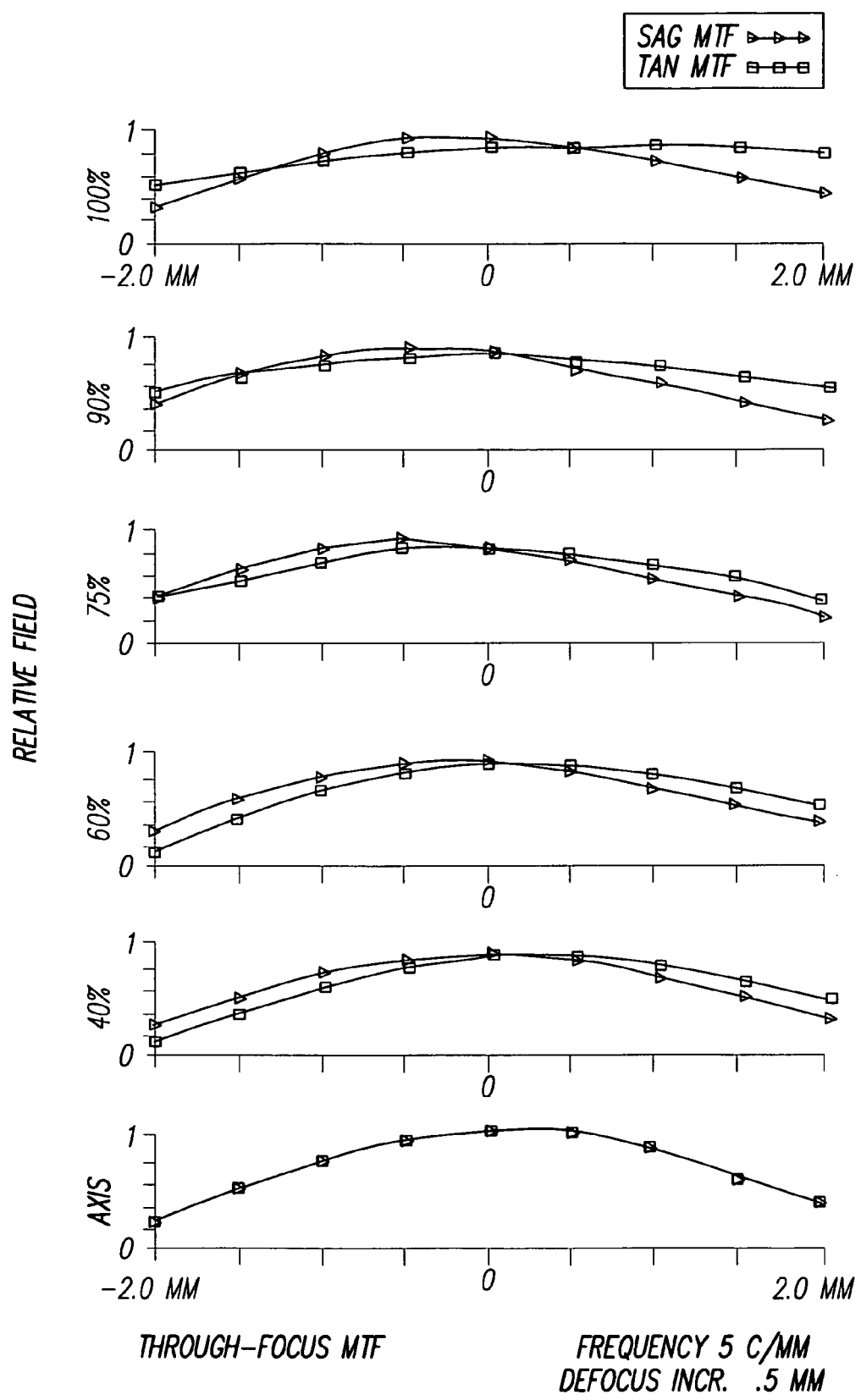
FIGS. 5E and 5F are through focus MTF plots for the example embodiment shown in FIGS. 5A and 5B, respectively.
Figure 5F:
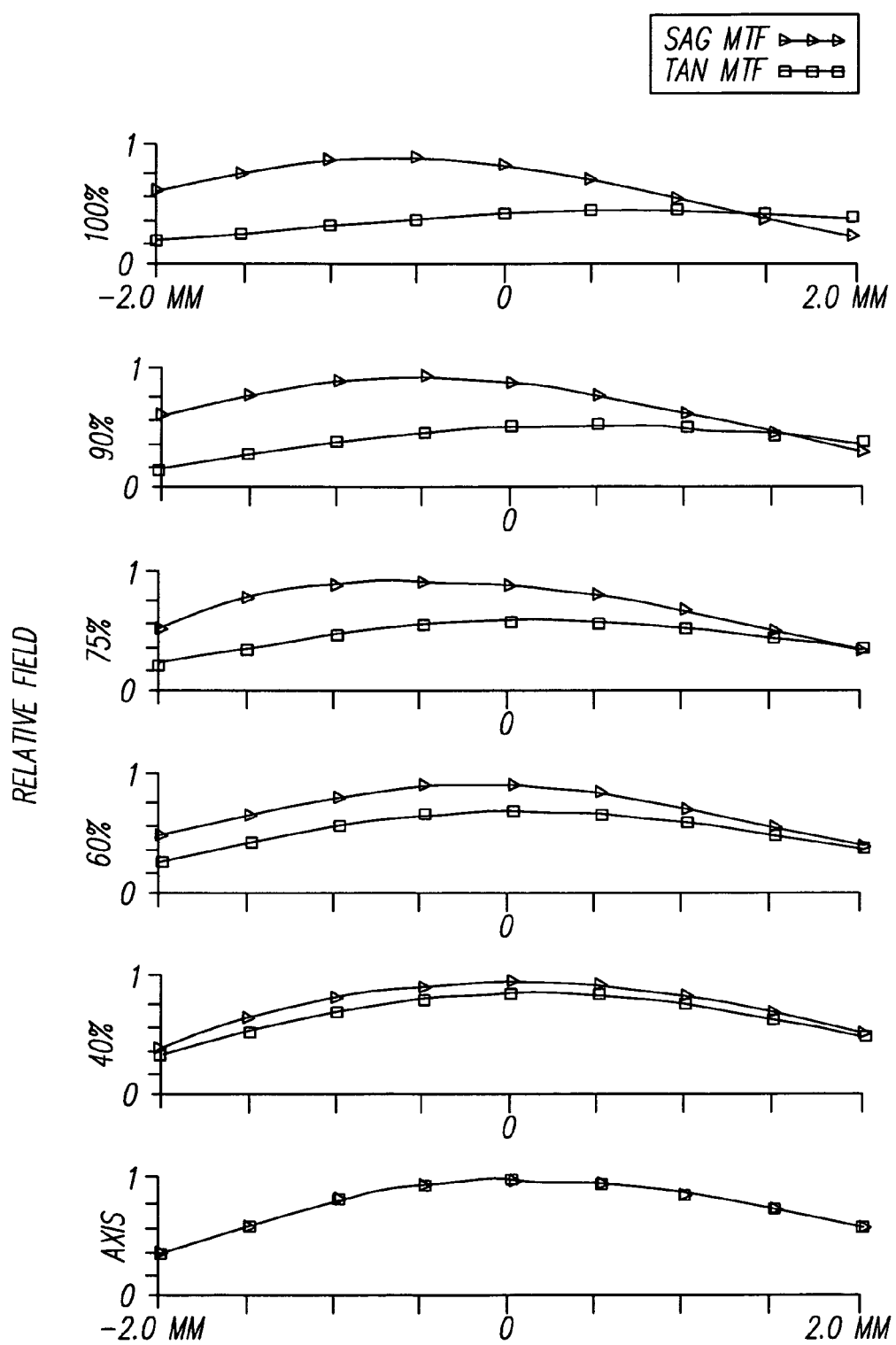

Referring to FIGS. 5E and 5F, through focus MTF performance plots for the example embodiment shown in FIGS. 5A and 5B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/i 5, 40%/26, 60%/33, 75%/18, 90%/8 and the wavelengths and weights described above.

Figure 6A:
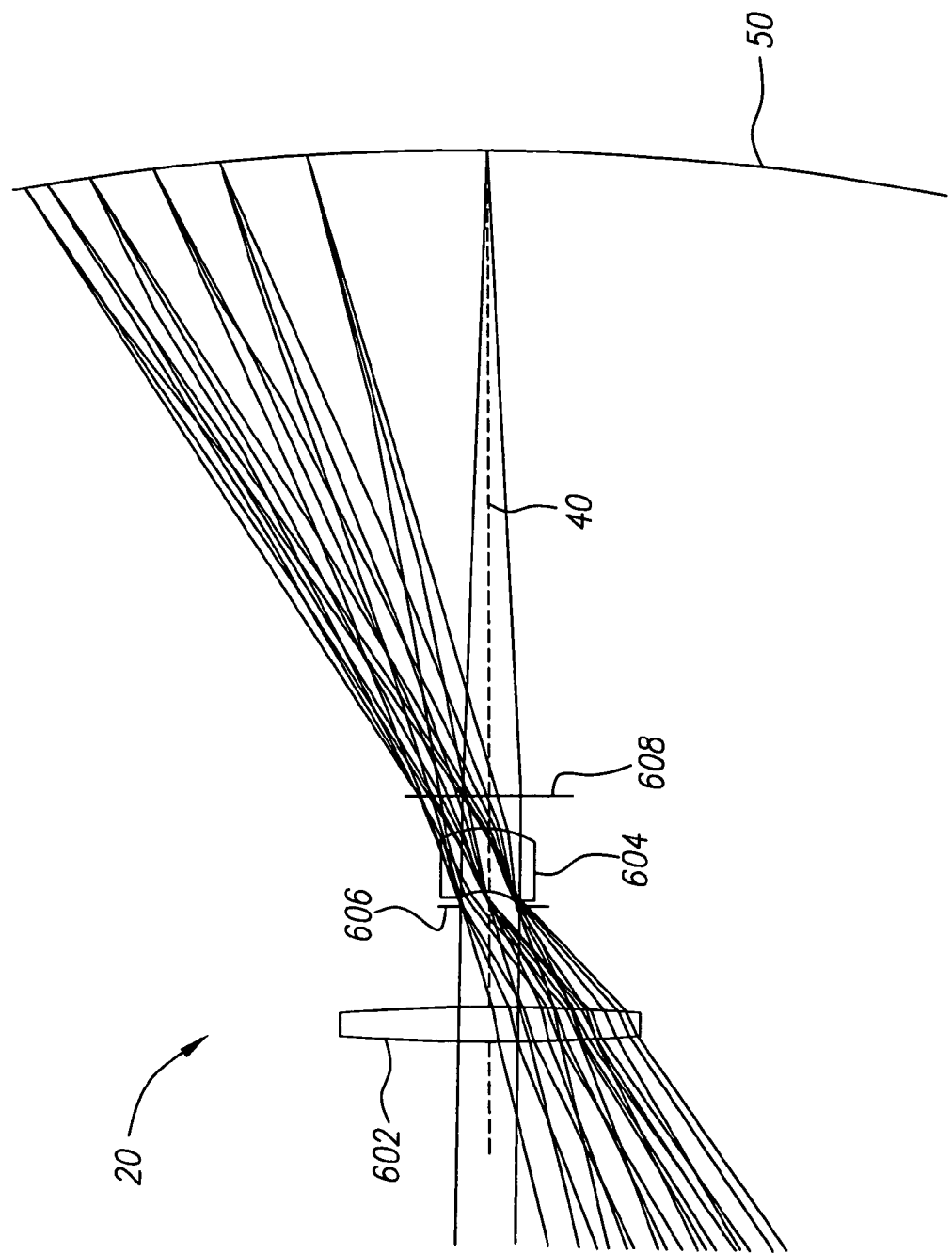
FIGS. 6A and 6B are cross sectional views of a sixth example embodiment made in accordance with the invention in wide angle and telephoto zoom positions, respectively.
Figure 6B:
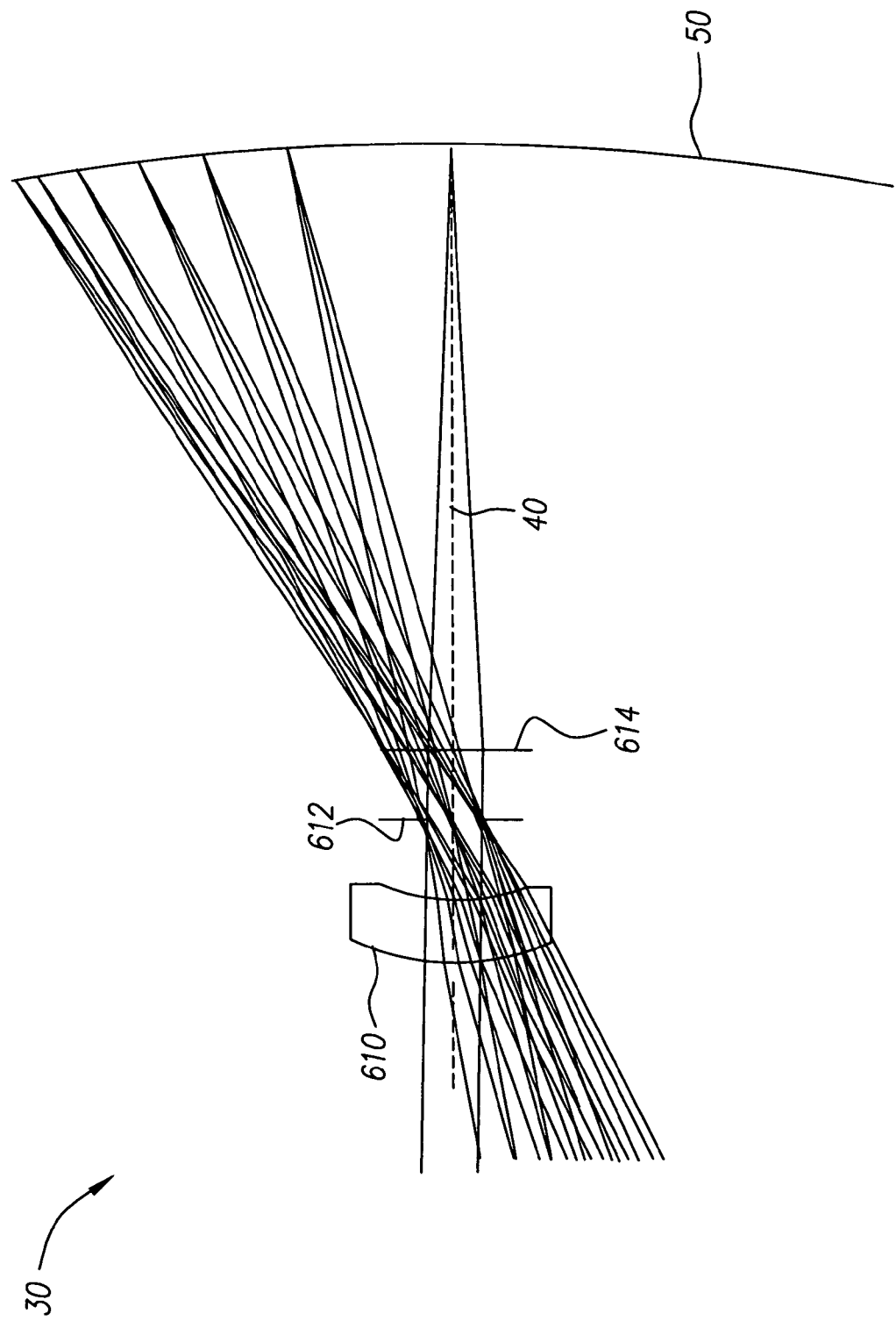

Referring to FIGS. 6A and 6B, cross sectional views of a sixth example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 602 and a rear lens element 604 as viewed from an object side. Front lens element 602 is biconvex. Rear lens element 604 is meniscus and convex toward image plane 50. Both lens elements 602 and 604 are made from acrylic plastic. An aperture stop 606 is located between lens elements 602 and 604 and a shutter 608 is located on an image side of lens element 204. Front lens element 602 includes an aspheric surface on its image side surface. Rear lens element 604 includes an aspheric surface located on its image side surface.

Second lens system 30 includes a positive power meniscus lens element 610 convex toward an object side. Lens element 610 has spherical surfaces and is made of acrylic plastic. An aperture stop 612 is located on an image side of lens element 610. A shutter 614 is located on an image side of aperture stop 612.

Tables 6A and 6B provide additional design characteristics for the example embodiment shown in FIGS. 6A and 6B. In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 6A first lens system 20

| SURF. | CLEAR APER. | RADIUS | THICKNESS | INDEX | V |
|---|---|---|---|---|---|
| 1 | 12.68 | 63.2004 | 1.893 | 1.492 | 57.4 |
| 2 | 11.63 | ASPHERE | 4.746 | | |
| | 2.66 | DIAPHRAGM | 0.995 | | |
| 3 | 3.42 | −7.08950 | 2.156 | 1.492 | 57.4 |
| 4 | 4.93 | ASPHERE | 1.350 | | |
| | 6.79 | SHUTTER | | | |

LENS LENGTH: 9.790

BF: 30.74

FF: 25.54

BEST FOCUS: 0.610

ASPHERIC EQUATION:

$$X = \frac{CY^2}{1 + \sqrt{1-(k+1)C^2 Y^2}} + DY^4 + EY^6 + FY^8 + GY^{10}$$

SURFACE 2:

C = −0.0249247767   D = 0.23710700E−04   F = 0.28706026E−07
k = −31.59187578    E = −0.11472204E−05   G = −0.30987401E−09
VERTEX RADIUS = (1/C) = −40.12072045

SURFACE 4:

C = −0.1546638525   D = −0.77426813E−02   F = −0.92957799E−04
k = −19.29138454    E = 0.10141176E−02    G = 0.37603631E−05
VERTEX RADIUS = (1/C) = −6.46563489

TABLE 6B second lens system 30

| SURF. | CLEAR APER. | RADIUS | THICKNESS | INDEX | V |
|---|---|---|---|---|---|
| 1 | 10.37 | 9.28710 | 3.000 | 1.492 | 57.4 |
| 2 | 8.16 | 14.5761 | 4.480 | | |
| | 2.67 | DIAPHRAGM | 4.340 | | |
| | 6.79 | SHUTTER | | | |

LENS LENGTH: 3.00

BF: 38.99

FF: 46.62

BEST FOCUS: −0.441

Figure 6C:
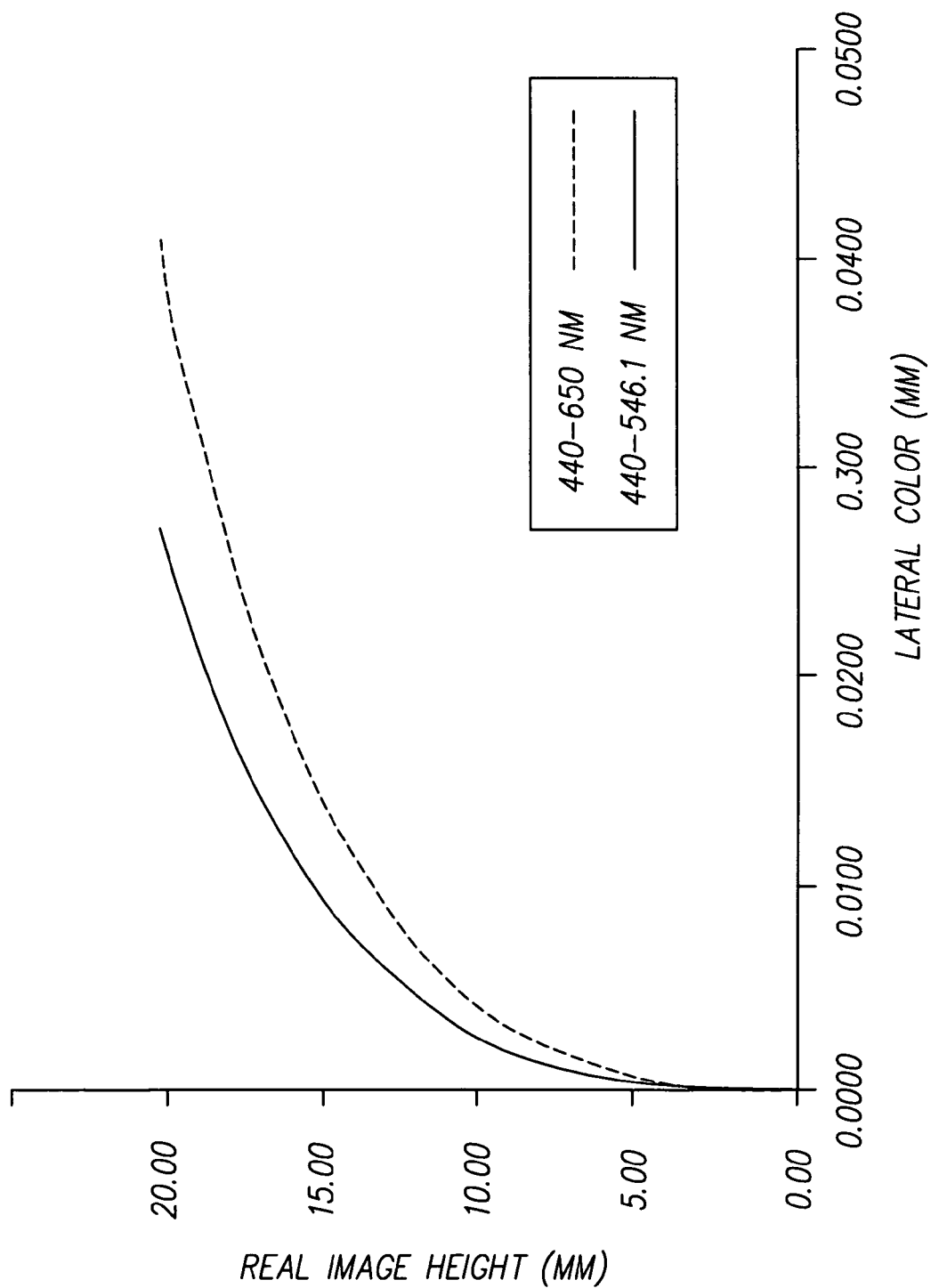
FIGS. 6C and 6D are aberration diagrams of the example embodiment shown in FIGS. 6A and 6B, respectively.
Figure 6D:
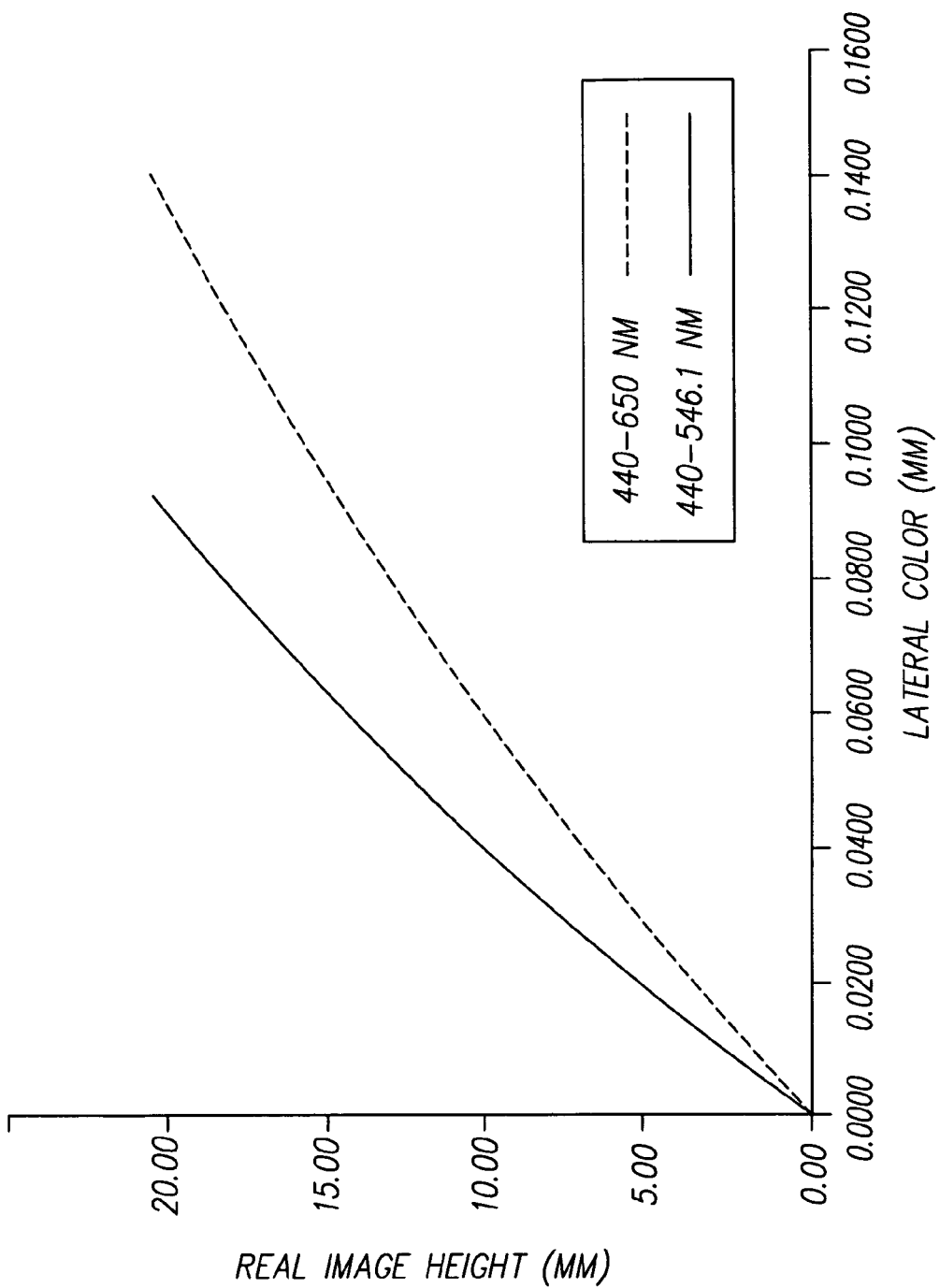

Referring to FIGS. 6C and 6D, lateral color diagrams of the example embodiment shown in FIGS. 6A and 6B, respectively, are shown. Lateral color was measured along the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus the height of the green (546.1 nm) image. Positive secondary lateral color in this situation means that the blue image is larger than the green image.

Figure 6E:
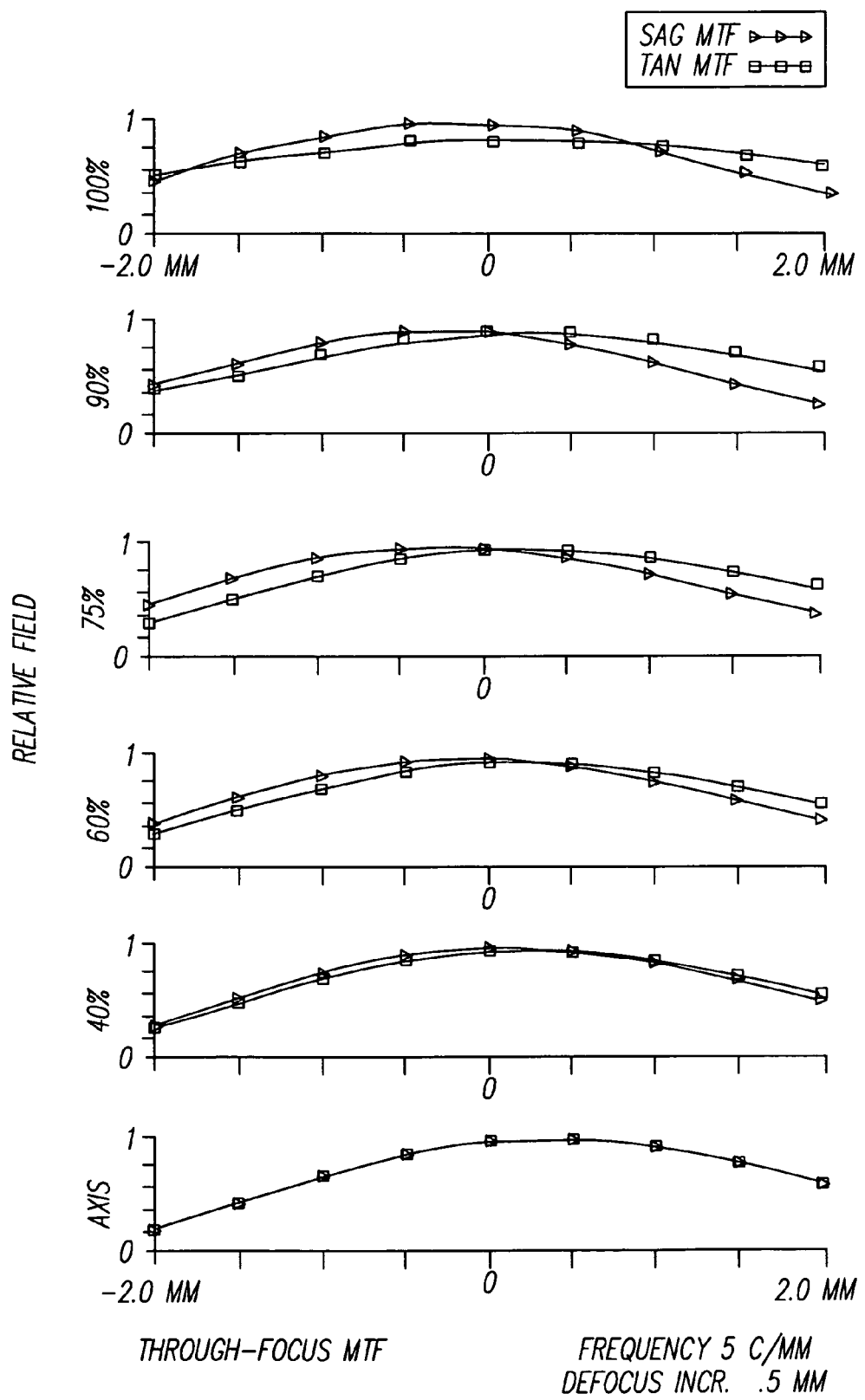
FIGS. 6E and 6F are through focus MTF plots for the example embodiment shown in FIGS. 6A and 6B, respectively.
Figure 6F:
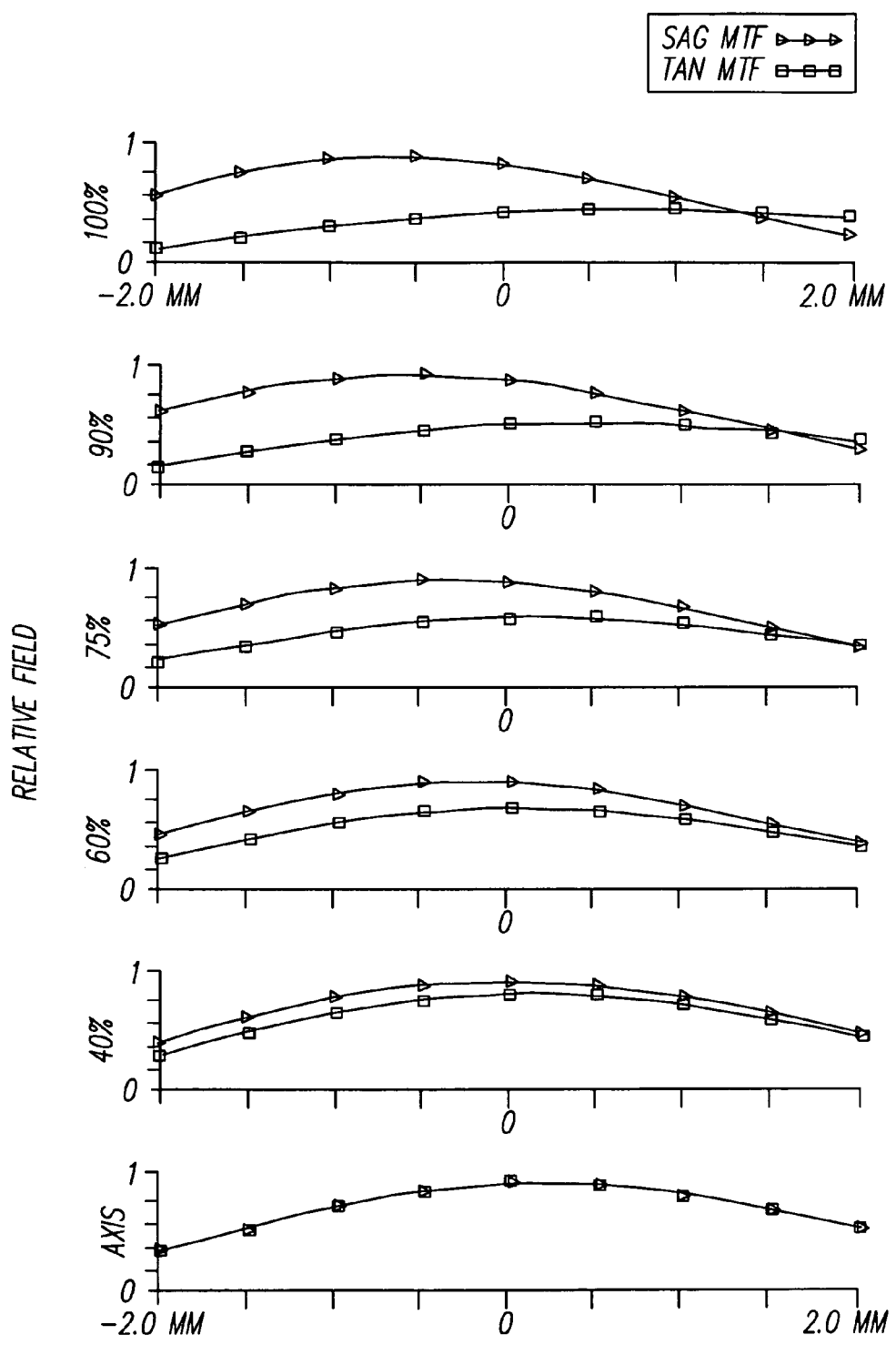

Referring to FIGS. 6E and 6F, through focus MTF performance plots for the example embodiment shown in FIGS. 6A and 6B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/15, 40%/26, 60%/33, 75%/18, 90%/8 and the wavelengths and weights described above.

Figure 7A:
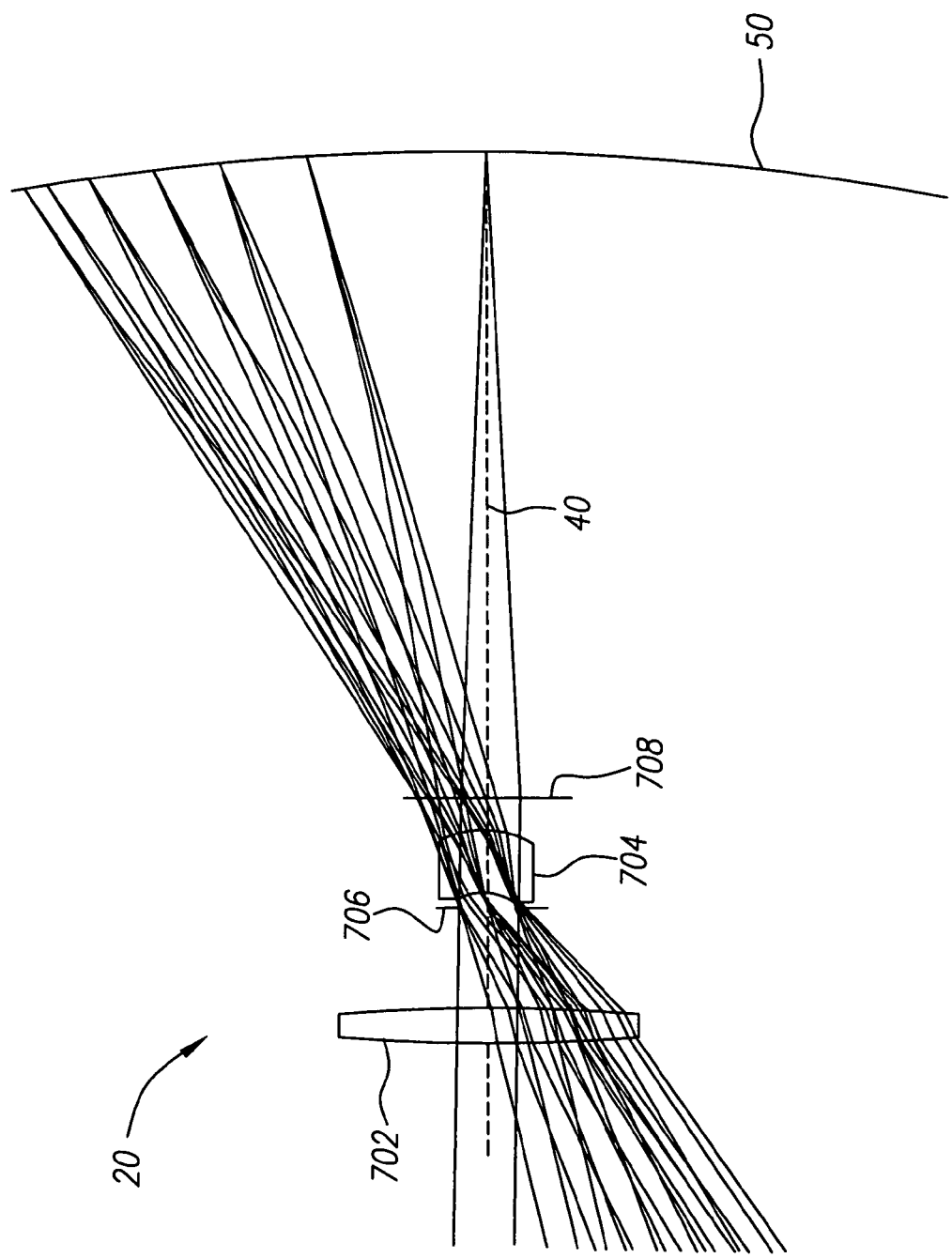
FIGS. 7A and 7B are cross sectional views of a seventh example embodiment made in accordance with the invention in wide angle and telephoto zoom positions, respectively.
Figure 7B:
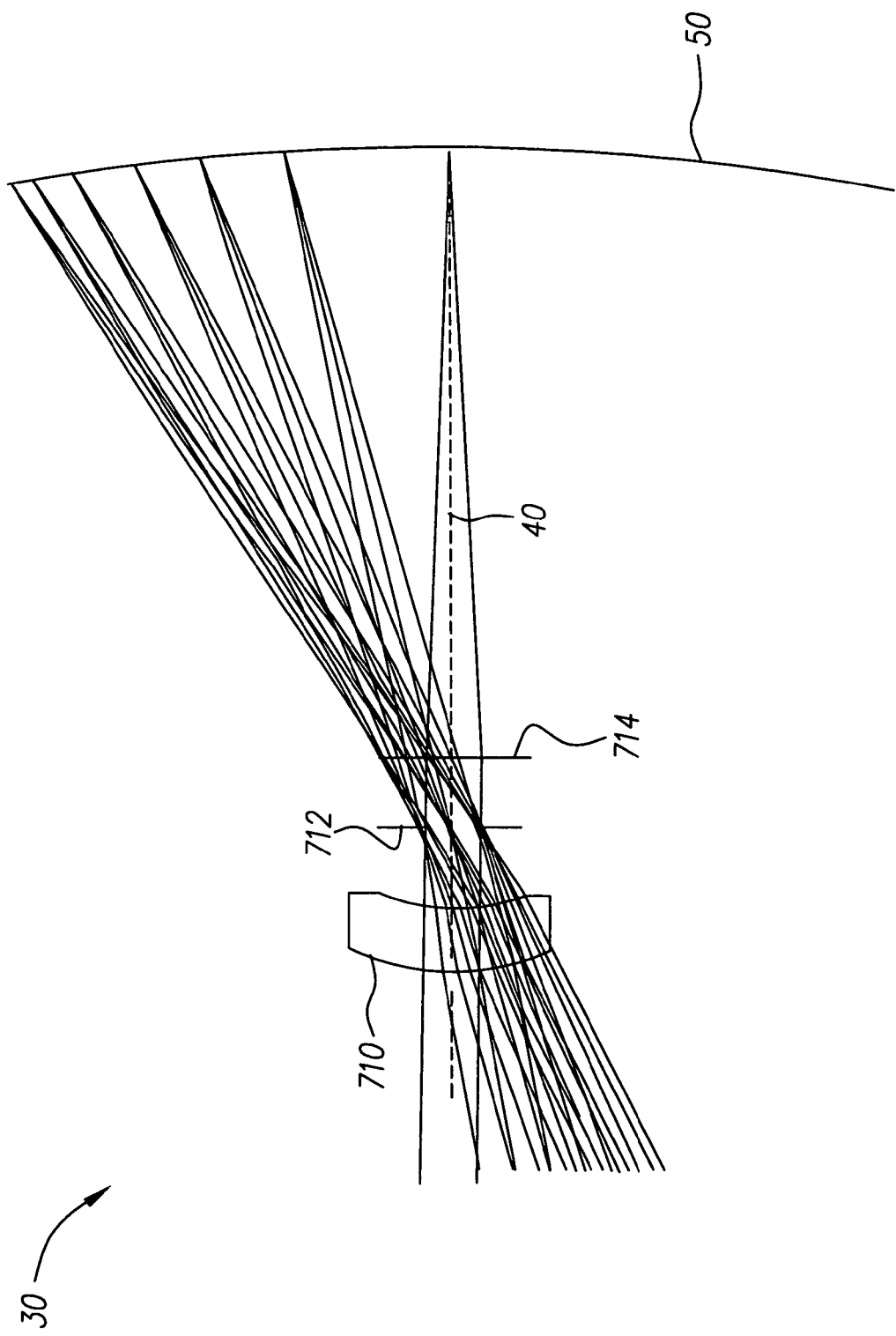

Referring to FIGS. 7A and 7B, cross sectional views of a seventh example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 702 and a rear lens element 704 as viewed from an object side. Front lens element 702 is biconvex. Rear lens element 704 is meniscus and convex toward image plane 50. Both lens elements 702 and 704 are made from acrylic plastic. An aperture stop 706 is located between lens elements 702 and 704 and a shutter 708 is located on an image side of lens element 704.

Second lens system 30 includes a positive power meniscus lens element 710 convex toward an object side. Lens element 710 has spherical surfaces and is made of acrylic plastic. An aperture stop 712 is located on an image side of lens element 710. A shutter 714 is located on an image side of aperture stop 712.

Tables 7A and 7B provide additional design characteristics for the example embodiment shown in FIGS. 7A and 7B. In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 7A first lens system 20

| SURF. | CLEAR APER. | RADIUS | THICKNESS | INDEX | V |
|---|---|---|---|---|---|
| 1 | 12.19 | 105.824 | 1.639 | 1.492 | 57.4 |
| 2 | 11.14 | −46.1229 | 3.877 | | |
| | 2.62 | DIAPHRAGM | 0.521 | | |
| 3 | 2.81 | −8.00000 | 3.751 | 1.492 | 57.4 |
| 4 | 5.31 | −6.86460 | 1.350 | | |
| | 6.79 | SHUTTER | | | |

LENS LENGTH: 9.788

BF: 31.92

FF: 21.43

BEST FOCUS: −0.519

TABLE 7B second lens system 30

| SURF. | CLEAR APER. | RADIUS | THICKNESS | INDEX | V |
|---|---|---|---|---|---|
| 1 | 10.37 | 9.28710 | 3.000 | 1.492 | 57.4 |
| 2 | 8.16 | 14.5761 | 4.480 | | |
| | 2.67 | DIAPHRAGM | 4.340 | | |
| | 6.79 | SHUTTER | | | |

LENS LENGTH: 3.00

BF: 38.99

FF: 46.62

BEST FOCUS: −0.441

Figure 7C:
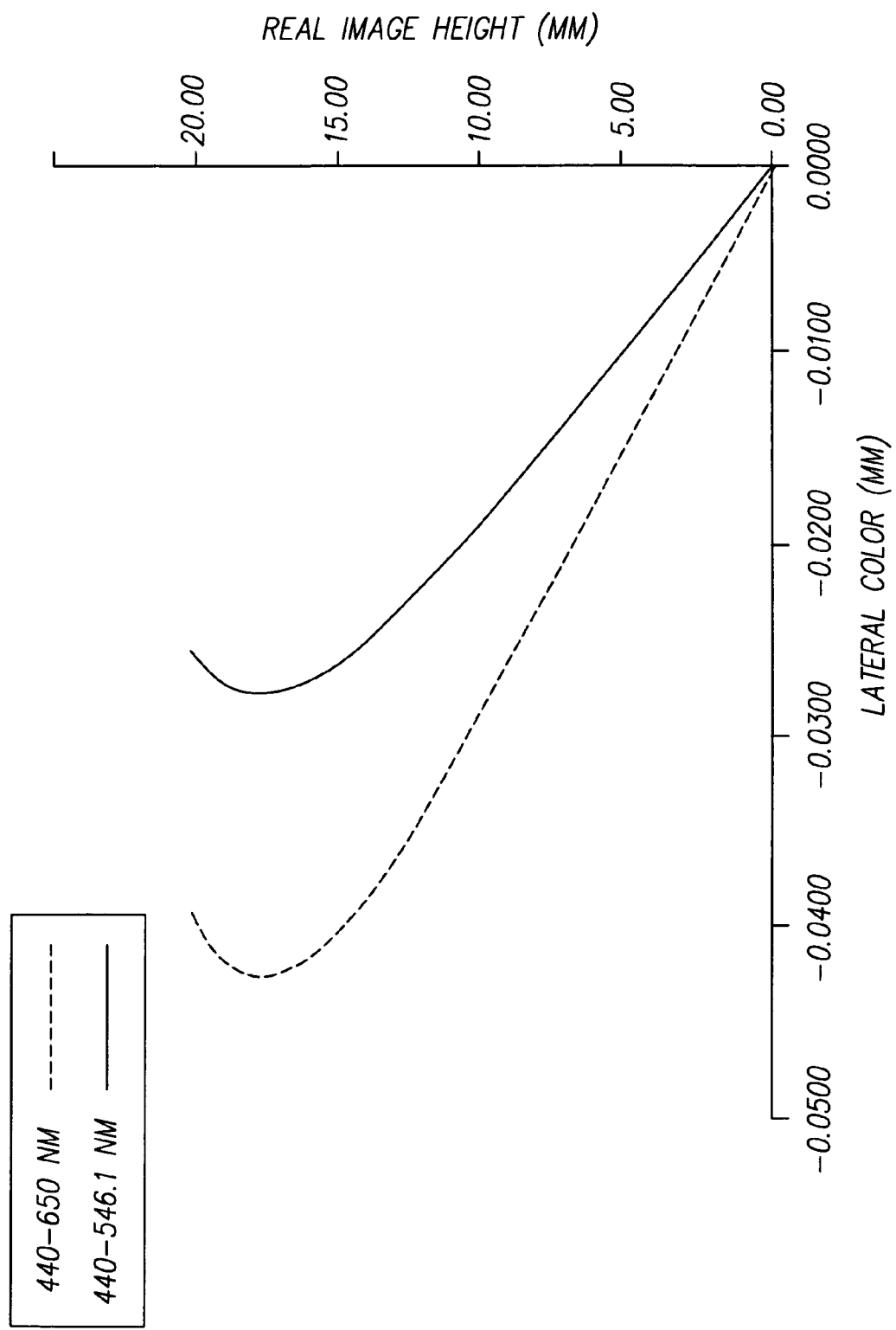
FIGS. 7C and 7D are aberration diagrams of the example embodiment shown in FIGS. 7A and 7B, respectively.
Figure 7D:
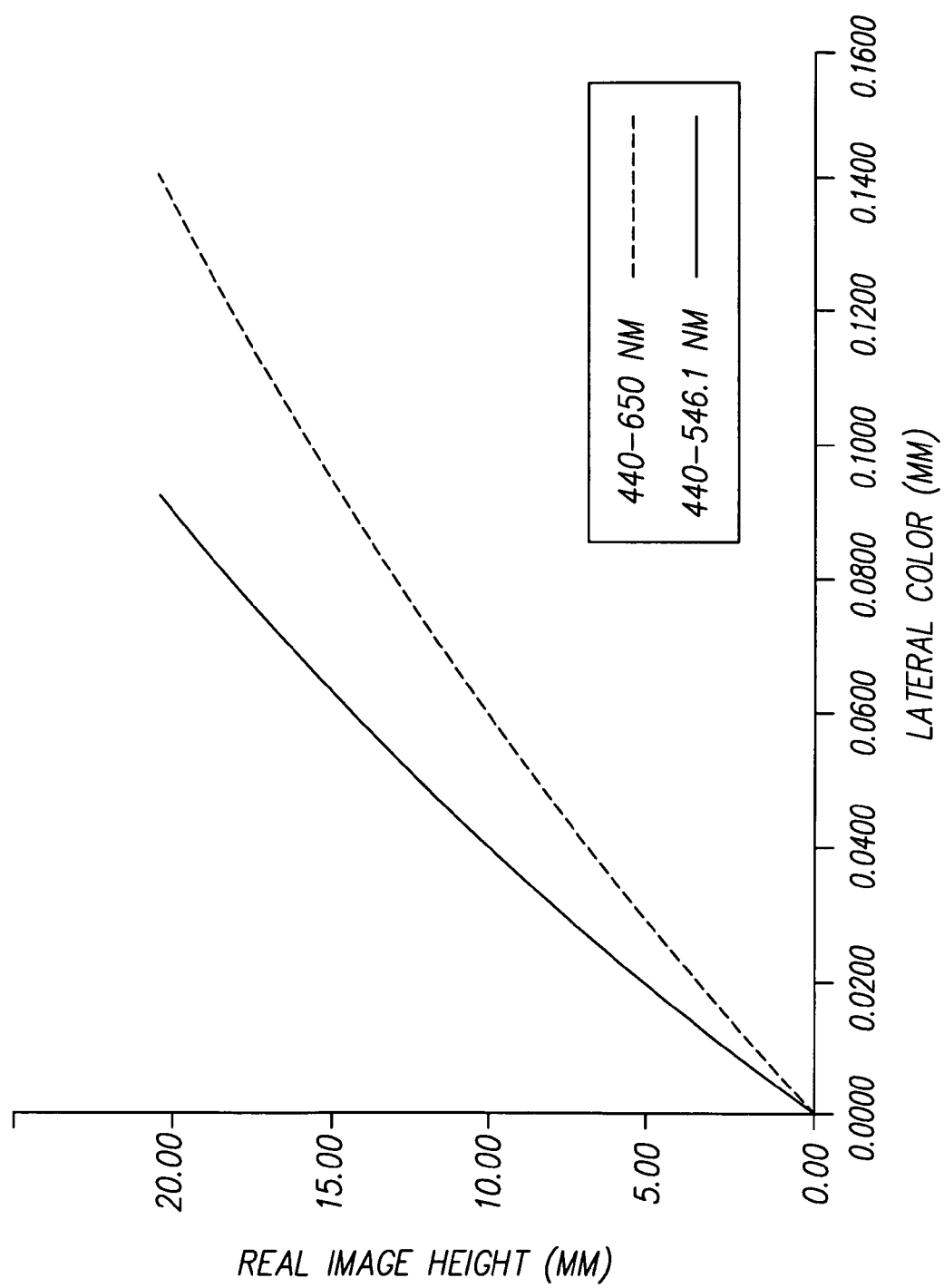

Referring to FIGS. 7C and 7D, lateral color diagrams of the example embodiment shown in FIGS. 7A and 7B, respectively, are shown. Lateral color was measured along the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus the height of the green (546.1 nm) image. Positive secondary lateral color in this situation means that the blue image is larger than the green image.

Figure 7E:
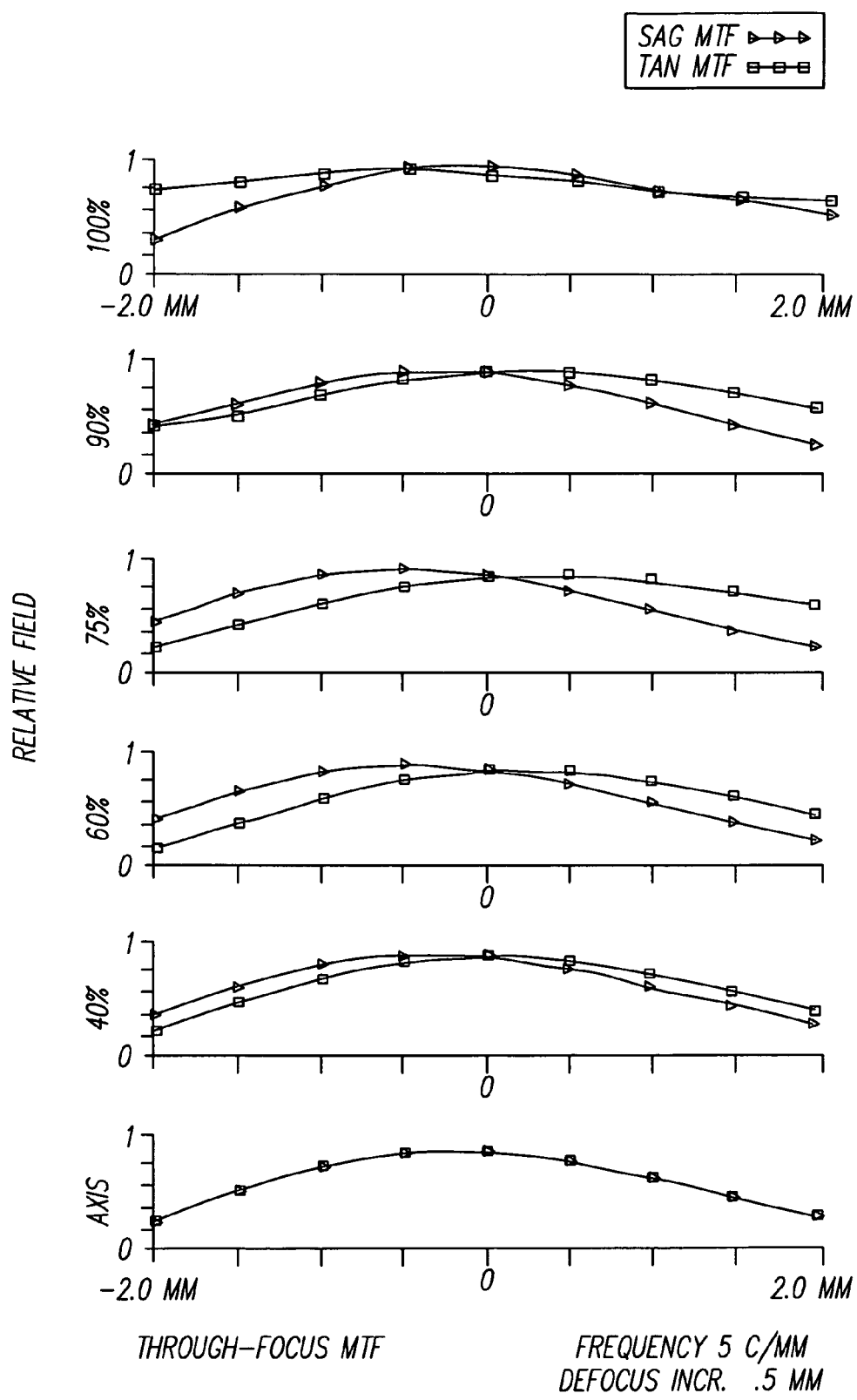
FIGS. 7E and 7F are through focus MTF plots for the example embodiment shown in FIGS. 7A and 7B, respectively.
Figure 7F:
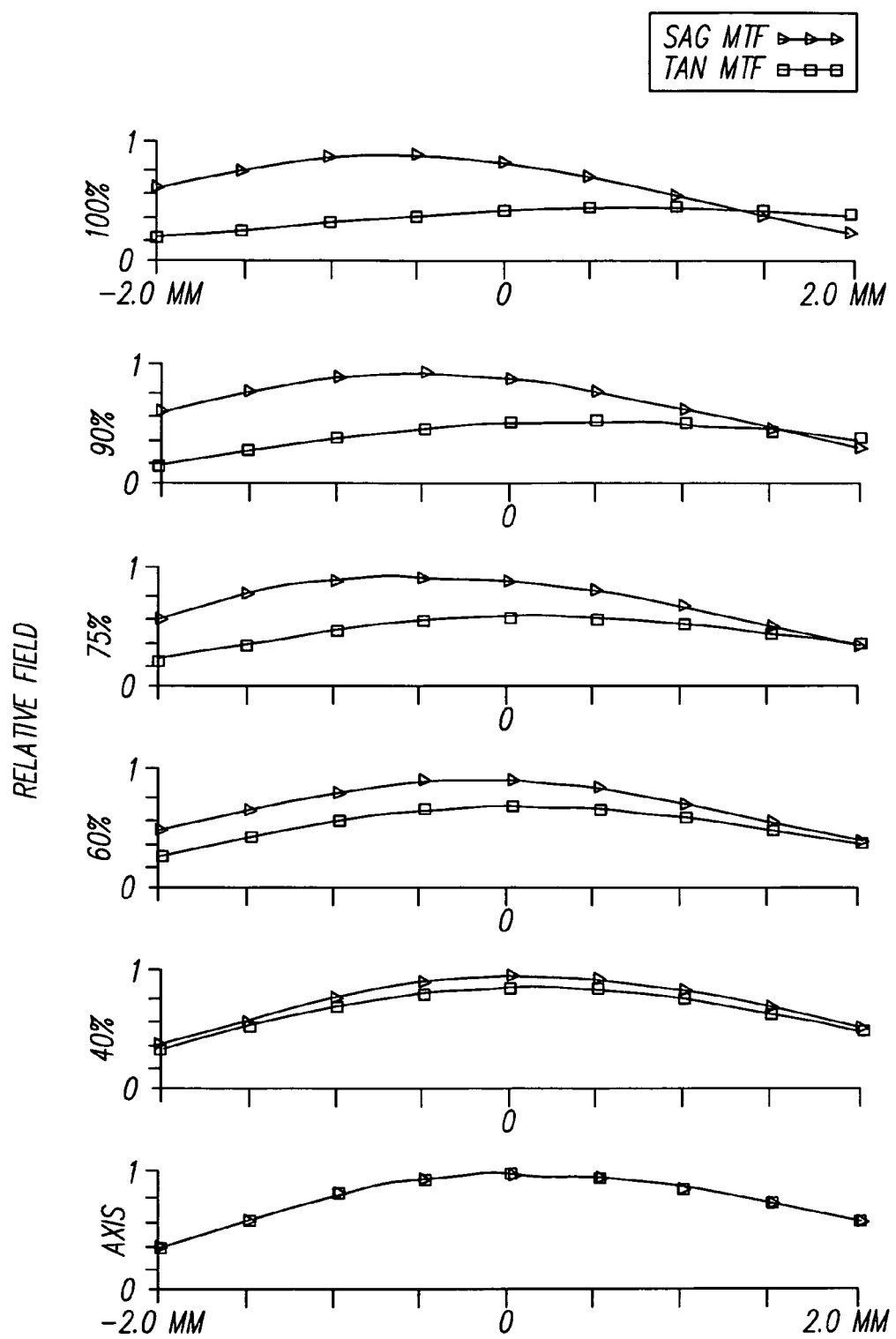

Referring to FIGS. 7E and 7F, through focus MTF performance plots for the example embodiment shown in FIGS. 7A and 7B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/15, 40%/26, 60%/33, 75%/18, 90%/8 and the wavelengths and weights described above.

Figure 8A:
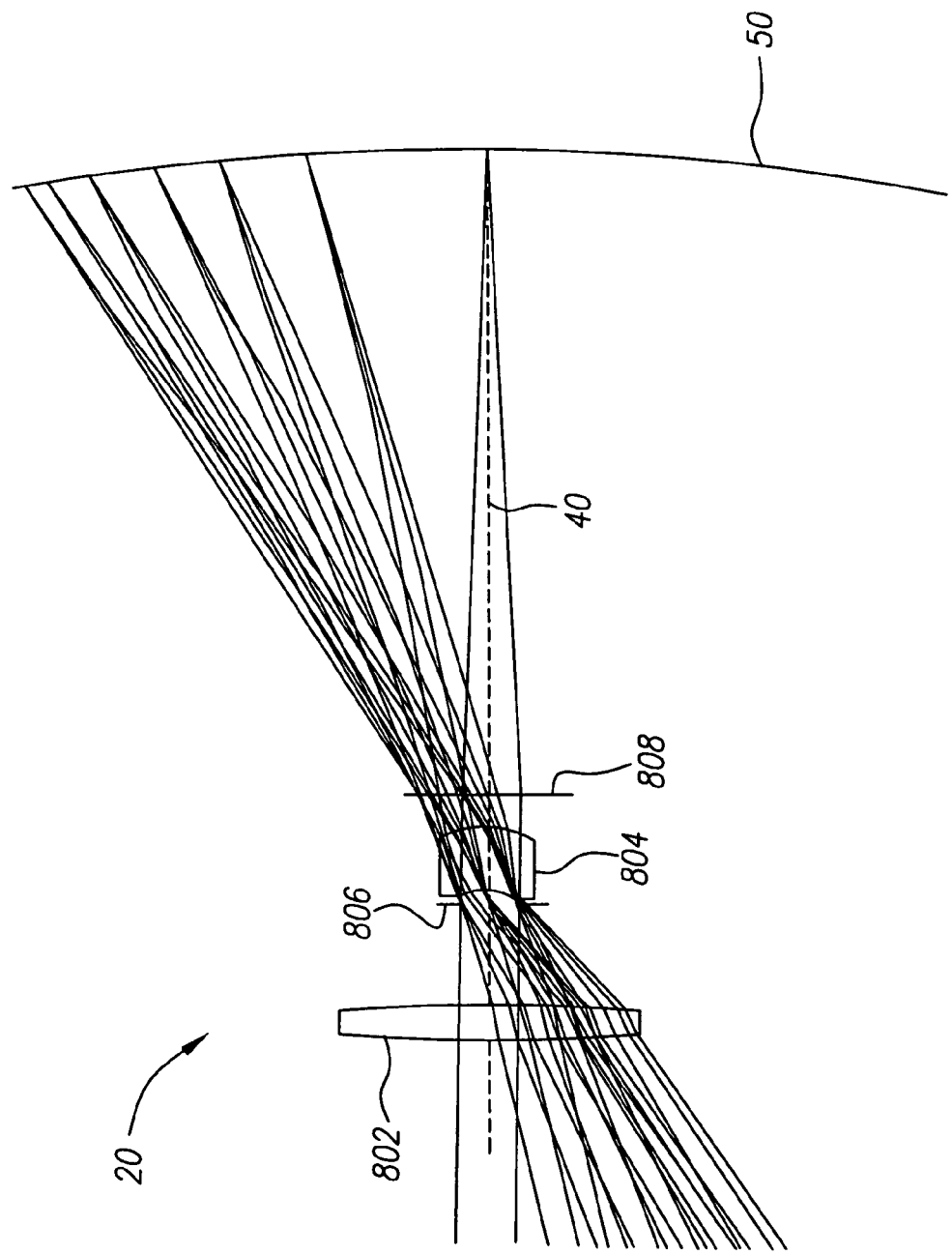
FIGS. 8A and 8B are cross sectional views of an eighth example embodiment made in accordance with the invention in wide angle and telephoto zoom positions, respectively.
Figure 8B:
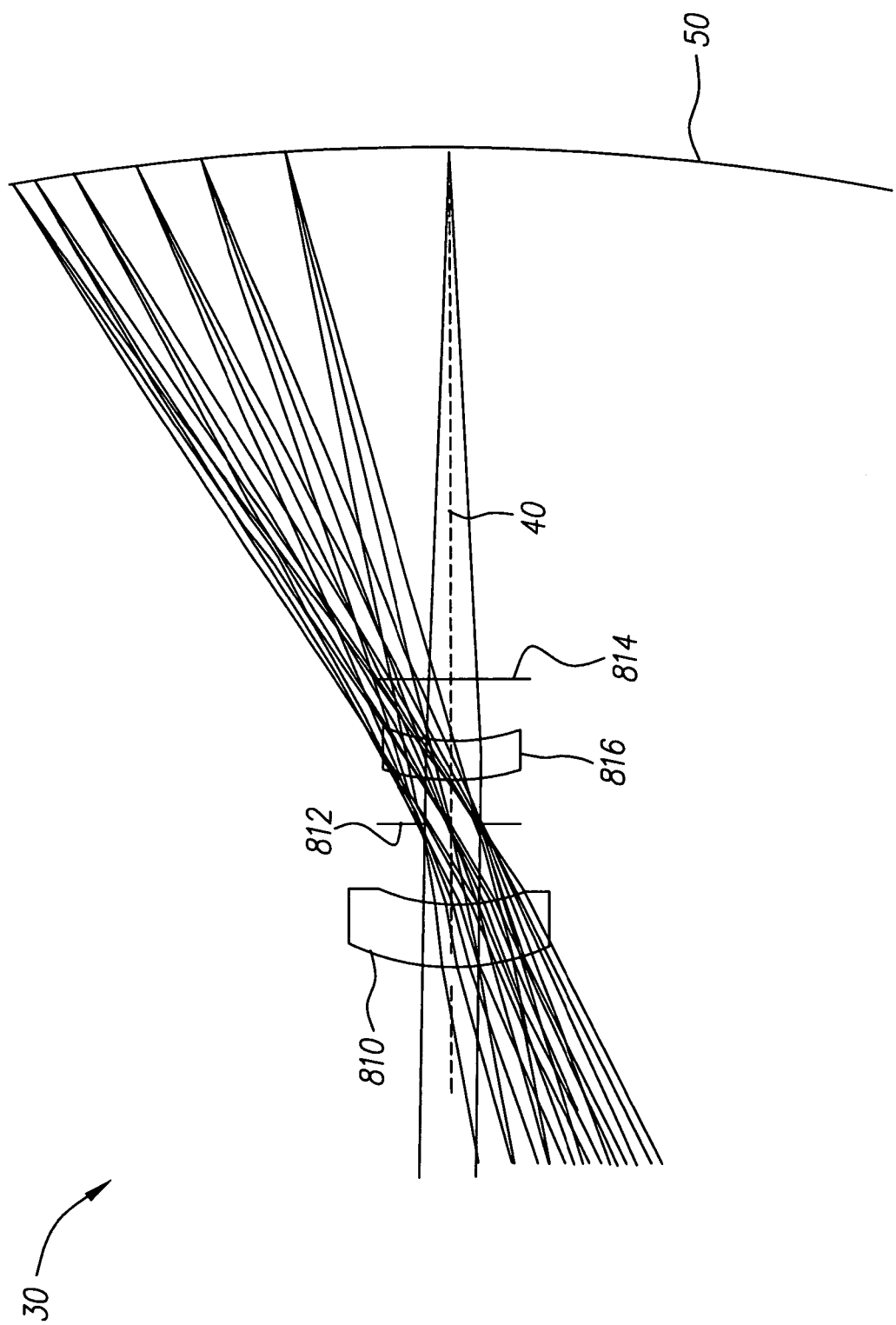

Referring to FIGS. 8A and 8B, cross sectional views of an eighth example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 802 and a rear lens element 804 as viewed from an object side. Front lens element 802 is biconvex. Rear lens element 804 is meniscus and convex toward image plane 50. Both lens elements 802 and 804 are made from acrylic plastic. An aperture stop 806 is located between lens elements 802 and 804 and a shutter 808 is located on an image side of lens element 804. Front lens element 802 includes aspheric surfaces on its object side and image side surfaces (biaspheric). Rear lens element 804 includes an aspheric surface located on its image side surface.

Second lens system 30 includes two lens elements, a front lens element 810 and a rear lens element 816 as viewed from an object side. Front lens element 810 and rear lens element 816 are meniscus and convex toward the object side. Both lens elements 810 and 816 are made from acrylic plastic. An aperture stop 812 is located between lens elements 810 and 816 and a shutter 814 is located on an image side of rear lens element 816. Rear lens element 816 includes aspheric surfaces on its object side and image side surfaces (biaspheric).

Tables 8A and 8B provide additional design characteristics for the example embodiment shown in FIGS. 8A and 8B.

In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 8A first lens system 20

| SURF. | CLEAR APER. | RADIUS | THICKNESS | INDEX | V |
|---|---|---|---|---|---|
| 1 | 12.42 | ASPHERE | 2.232 | 1.492 | 57.4 |
| 2 | 10.69 | ASPHERE | 4.027 | | |
| | 2.51 | DIAPHRAGM | 0.983 | | |
| 3 | 3.61 | −5.49365 | 2.500 | 1.492 | 57.4 |
| 4 | 5.94 | ASPHERE | 1.350 | | |
| | 8.72 | SHUTTER | | | |

LENS LENGTH: 9.742

BF: 30.47

FF: 18.69

BEST FOCUS: +0.900

ASPHERIC EQUATION:

$$X = \frac{CY^2}{1+\sqrt{1-(k+1)C^2Y^2}} + DY^4 + EY^6 + FY^8 + GY^{10} + HY^{12} + IY^{14}$$

TABLE 8B second lens system 30

| SURF. | CLEAR APER. | RADIUS | THICKNESS | INDEX | V |
|---|---|---|---|---|---|
| 1 | 10.16 | 9.28710 | 3.000 | 1.492 | 57.4 |
| 2 | 8.08 | 14.5761 | 4.847 | | |
| | 2.71 | DIAPHRAGM | 1.565 | | |
| 3 | 4.66 | ASPHERE | 1.347 | 1.492 | 57.4 |
| 4 | 5.43 | ASPHERE | 3.240 | | |
| | 8.91 | SHUTTER | | | |

LENS LENGTH: 10.759

BF: 33.72

FF: 56.15

BEST FOCUS: −0.900

ASPHERIC EQUATION:

$$X = \frac{CY^2}{1+\sqrt{1-(k+1)C^2Y^2}} + DY^4 + EY^6 + FY^8 + GY^{10} + HY^{12} + IY^{14}$$

SURF. 3:    C = 0.0915783    D = 0.    F = 0.    H = 0.
            k = −12.2711702    E = 0.    G = 0.    I = 0.
VERTEX RADIUS = 1/C = 10.9196145445

---

SURF. 1:    C = 0.0020000    D = 3.99734886552E−4    G = −9.93835415796E−10
            k = 3500.000    E = −9.79975631821E−6    H = 0.
                           F = 1.52460655566E−7    I = 0.
VERTEX RADIUS = (1/C) = 500.0000

---

SURF. 2:    C = −0.0227927    D = 0.    G = 0.
            k = −462.03856654    E = 0.    H = 0.
                              F = 0.    I = 0.
VERTEX RADIUS = (1/C) = −43.8737729753

---

SURF. 4:    C = −0.2043465    D = −0.0188601226631    G = 1.03481246067E−4
            k = −21.249032504    E = 0.00449273235856    H = −6.84328365961E−6
                              F = −8.58719072584E−4    I = 1.8782811385E−7
VERTEX RADIUS = (1/C) = −4.89364805421

SURF. 4:  C = 0.1049791   D = 0.1456182E-01   F = 0.1490086E-02   H = 0.1993857E-04
         k = -141.6509677  E = -0.5686506E-02  G = -0.2353026E-03  I = -0.6927936E-06
VERTEX RADIUS = 1/C = 9.5257023402

Figure 8C:
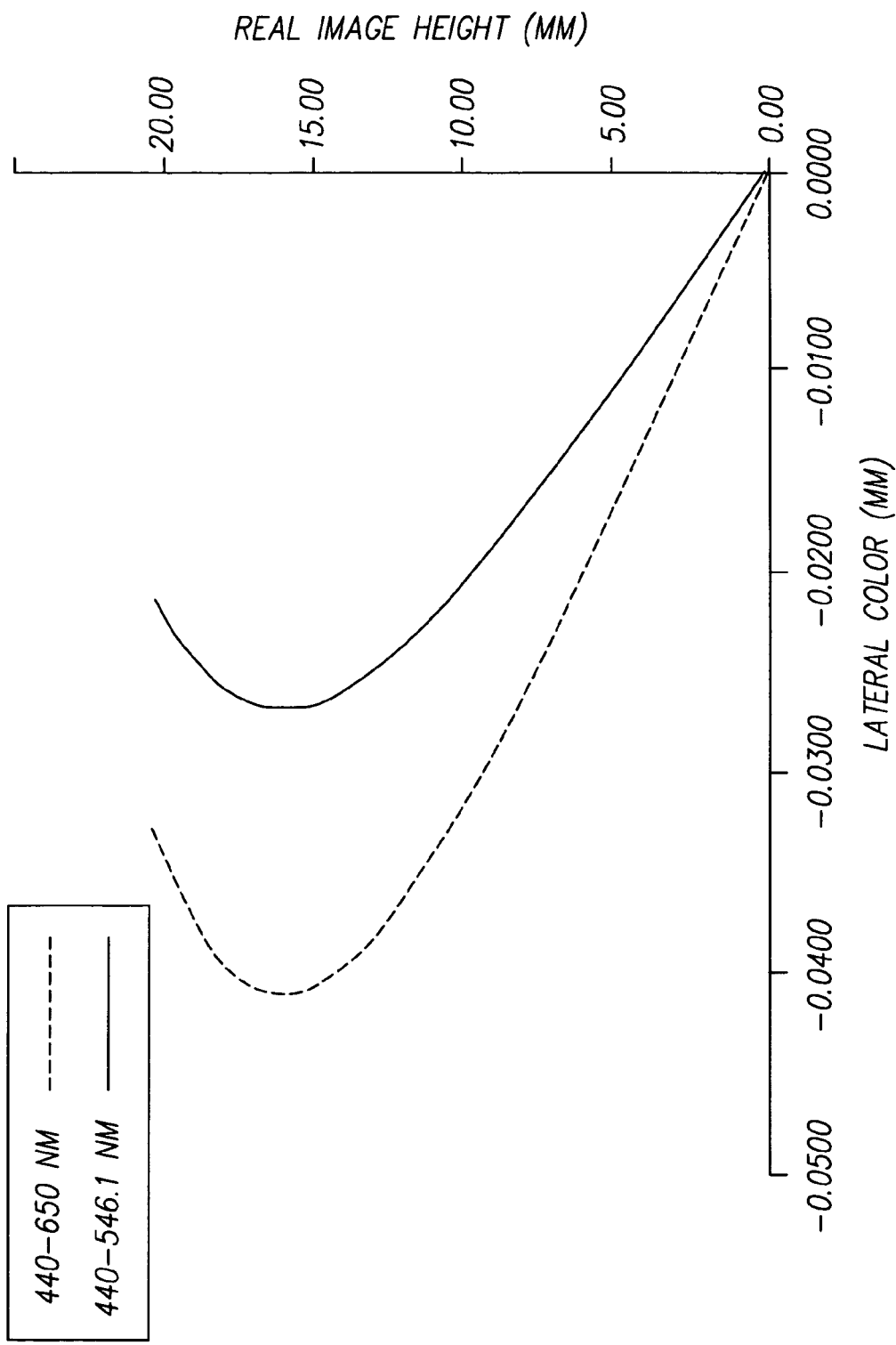
FIGS. 8C and 8D are aberration diagrams of the example embodiment shown in FIGS. 8A and 8B, respectively.
Figure 8D:
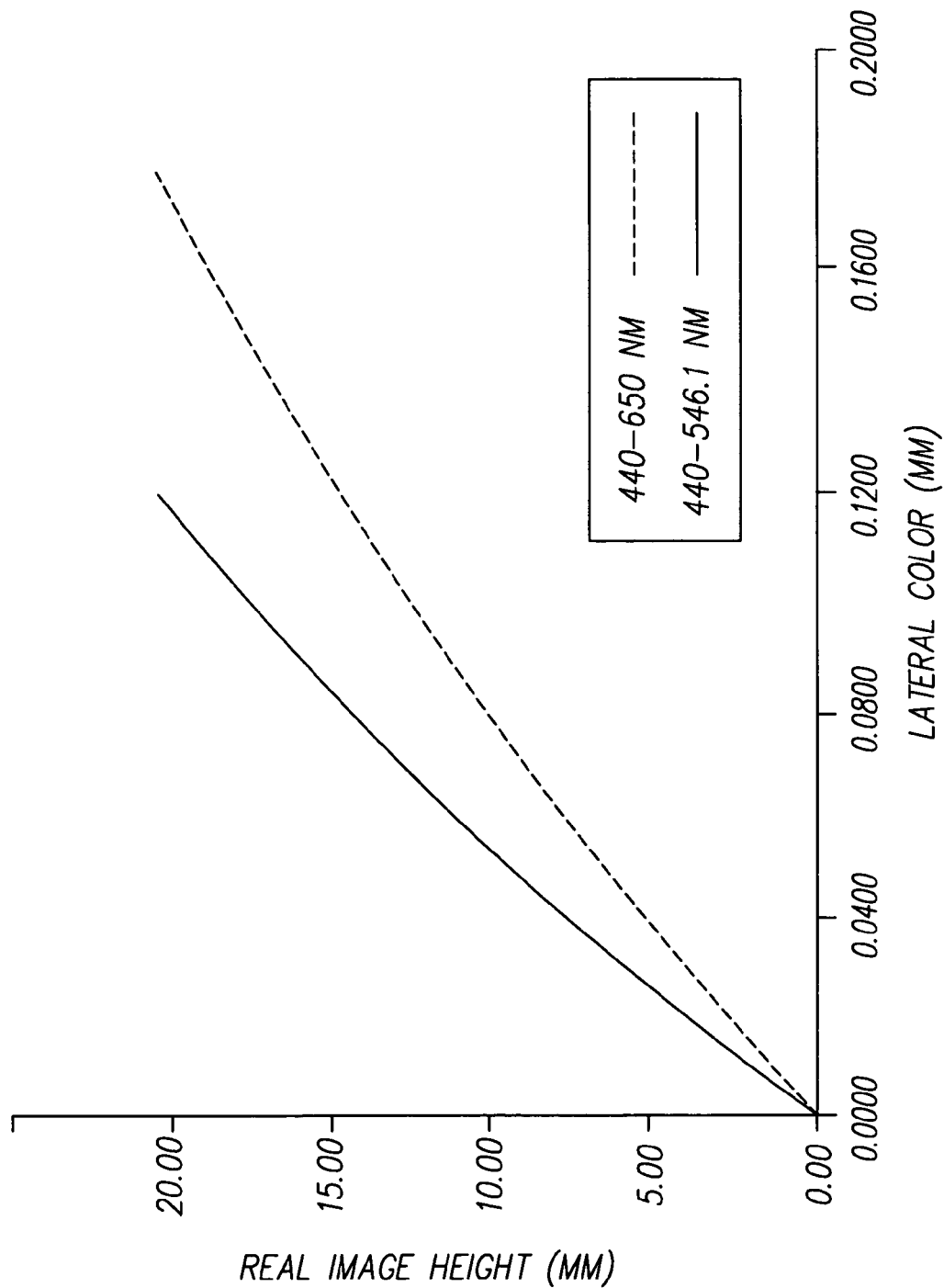

Referring to FIGS. 8C and 8D, lateral color diagrams of the example embodiment shown in FIGS. 8A and 8B, respectively, are shown. Lateral color was measured along the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus the height of the green (546.1 nm) image. Positive secondary lateral color in this situation means that the blue image is larger than the green image.

Figure 8E:
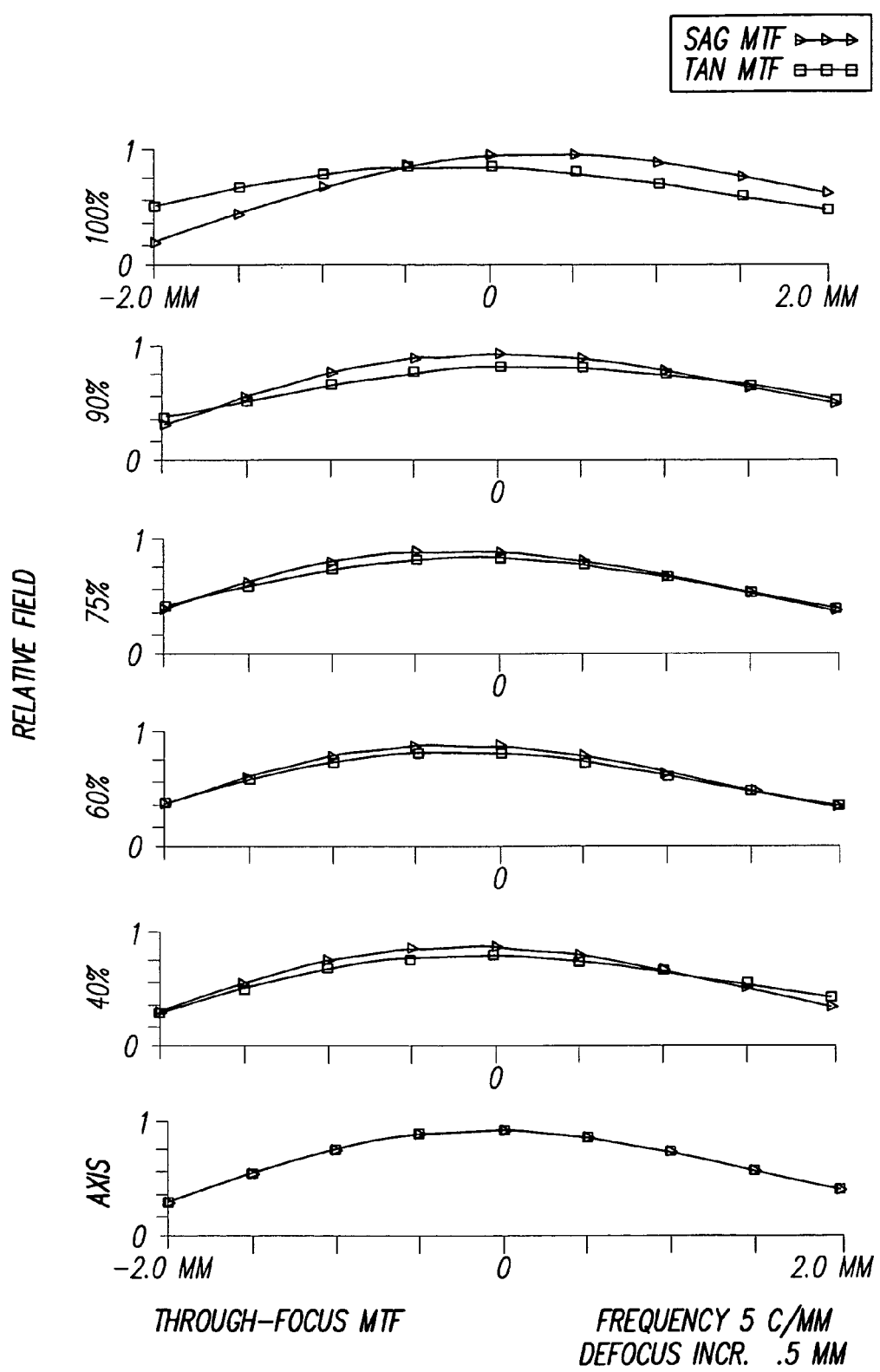
FIGS. 8E and 8F are through focus MTF plots for the example embodiment shown in FIGS. 8A and 8B, respectively.
Figure 8F:
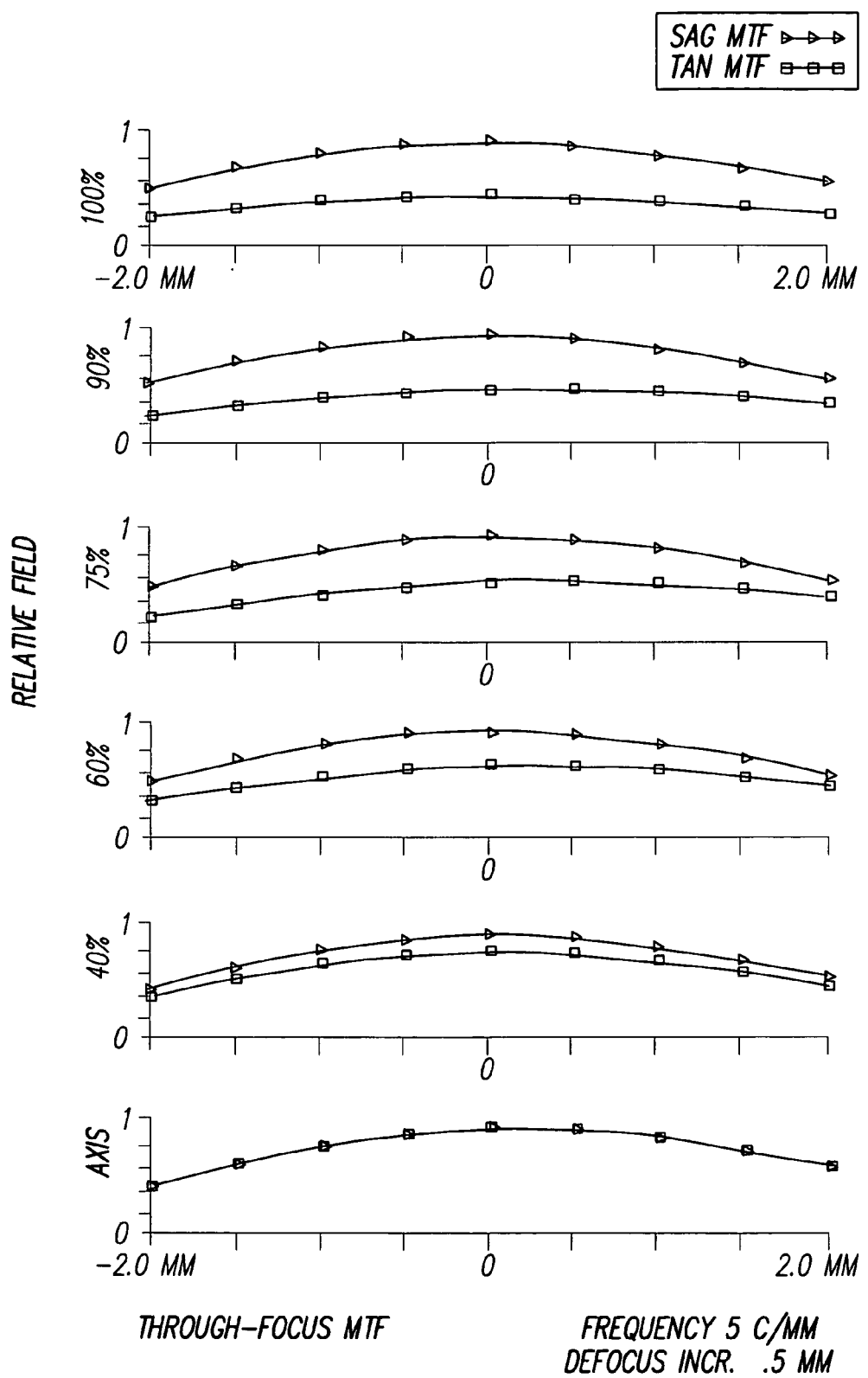

Referring to FIGS. 8E and 8F, through focus MTF performance plots for the example embodiment shown in FIGS. 8A and 8B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/15, 40%/26, 60%/33, 75%/18, 90%/8 and the wavelengths and weights described above.

Figure 9A:
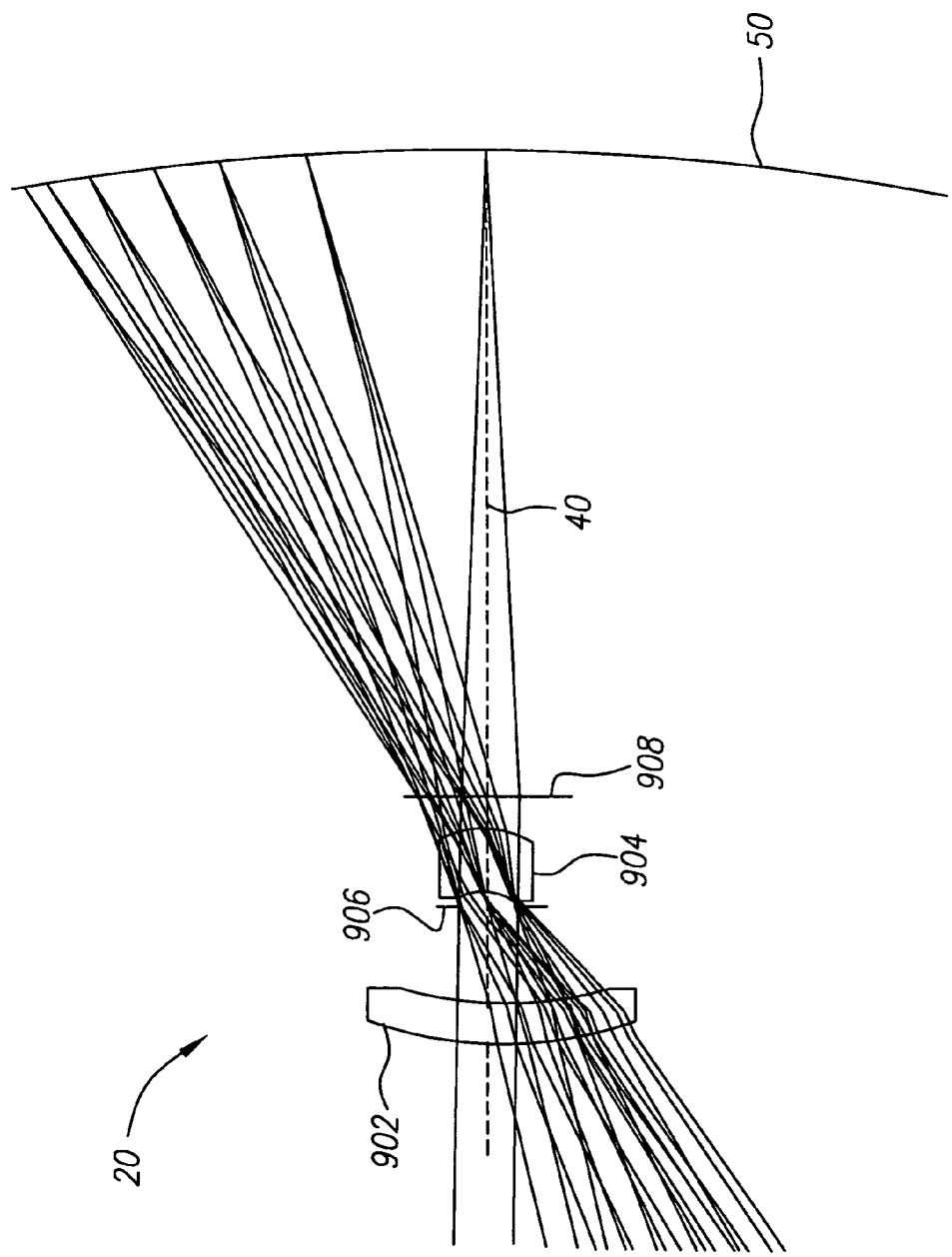
FIGS. 9A and 9B are cross sectional views of a ninth example embodiment made in accordance with the invention in wide angle and telephoto zoom positions, respectively.
Figure 9B:
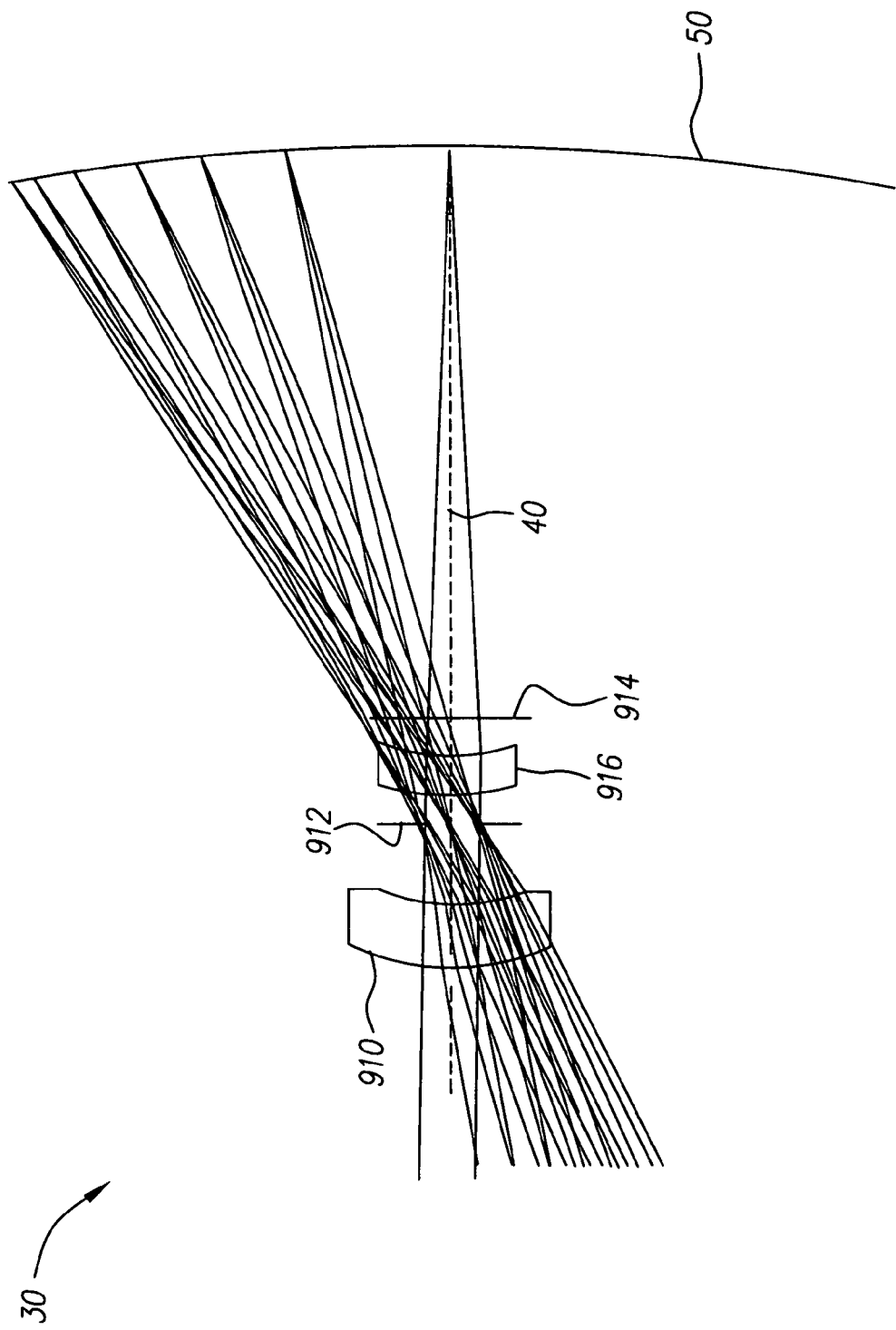

Referring to FIGS. 9A and 9B, cross sectional views of a ninth example embodiment made in accordance with the invention in wide angle and telephoto zoom positions, respectively, are shown. Light are shown going through first and second lens systems 20, 30 on axis, at 40%, 60%, 75%, 90%, 100% relative field (20.58 mm), and at 105% relative field (21.63 mm).

Lens system 10 includes a first lens system 20 and a second lens system 30. First and second lens systems 20, 30 are interchangeably positionable on optical axis 40. Second lens system 30 has a longer focal length than first lens system 20.

First lens system 20 includes two positive power lens elements, a front lens element 902 and a rear lens element 904 as viewed from an object side. Front lens element 902 is meniscus and convex toward the object side. Rear lens element 904 is meniscus and convex toward image plane 50. Front lens element 902 is made from styrene plastic and rear lens element 904 is made from acrylic plastic. An aperture stop 906 is located between lens elements 902 and 904 and a shutter 908 is located on an image side of lens element 904. Front lens element 902 includes aspheric surfaces on its object side and image side surfaces (biaspheric). Rear lens element 804 also includes aspheric surfaces on its object side and image side surfaces (biaspheric).

Second lens system 30 includes two lens elements, a front lens element 910 and a rear lens element 916 as viewed from an object side. Front lens element 910 and rear lens element 916 are meniscus and convex toward the object side. Both lens elements 910 and 916 are made from acrylic plastic. An aperture stop 912 is located between lens elements 910 and 916 and a shutter 914 is located on an image side of rear lens element 916. Rear lens element 916 includes aspheric surfaces on its object side and image side surfaces (biaspheric).

Tables 9A and 9B provide additional design characteristics for the example embodiment shown in FIGS. 9A and 9B. In both tables, surfaces are viewed from an object side toward an image side. As such, surfaces 1 and 2 refer to the object side surface and image side surface, respectively, of the lens element located closest to the object side of the lens system; surfaces 3 and 4 refer to the object side surface and image side surface of the next lens element; etc.

TABLE 9A

| | first lens system 20 | | | | |
|---|---|---|---|---|---|
| SURF. | CLEAR APER. | RADIUS | THICKNESS | INDEX | V |
| 1 | 14.40 | ASPHERE | 2.547 | 1.590 | 30.9 |
| 2 | 11.81 | ASPHERE | 4.432 | | |
| | 2.31 | DIAPHRAGM | 0.396 | | |
| 3 | 2.72 | ASPHERE | 3.212 | 1.492 | 57.4 |
| 4 | 5.86 | ASPHERE | 1.350 | | |
| | 8.73 | SHUTTER | | | |

LENS LENGTH: 10.587

BF: 30.24

FF: 13.54

BEST FOCUS: +1.250

ASPHERIC EQUATION:

$$X = \frac{CY^2}{1 + \sqrt{1 - (k+1)C^2 Y^2}} + DY^4 + EY^6 + FY^8 + GY^{10} + HY^{12} + IY^{14} + JY^{16} + KY^{18}$$

SURF.1:  C = 0.0043907  D = 0.7247961E-03  F = 0.5765921E-06  H = 0.1527704E-09   J = -0.1850309E-13
         k = 0.          E = -0.1845085E-04 G = -0.1321436E-07 I = 0.8976964E-13  K = 0.1219260E-15
VERTEX RADIUS = 1/C = 277.752157854

SURF. 2:  C = 0.0004259   D = 0.8903960E−03   F = 0.5547956E−06   H = −0.2815706E−10   J = 0.
          k = 0.           E = −0.2898818E−04   G = −0.4091017E−08   I = 0.50339403E−12    K = 0.
VERTEX RADIUS = 1/C = 2347.98191304

SURF. 3:  C = −0.1865951   D = 0.   F = 0.   H = 0.   J = 0.
          k = 1.3857597    E = 0.   G = 0.   I = 0.   K = 0.
VERTEX RADIUS = 1/C = −5.35919818597 the image format diagonal using a maximum field height of 20.58 mm. The dotted line shows primary lateral color, defined here as the height of the blue (440 nm) image minus the height of the red (650 nm) image. Positive lateral color in this situation means that the blue image is larger than the red image. The solid line shows secondary lateral color, defined here as the height of the blue (440 nm) image minus SURF. 4:  C = −0.2193030    D = −0.2022930E−01   F = −0.8839514E−03   H = −0.6975969E−05   J = 0.
          k = −18.3457766   E = −0.4655701E−02   G = 0.1057644E−03    I = 0.1911695E−06    K = 0.
VERTEX RADIUS = 1/C = −4.55990072211

TABLE 9B second lens system 30

| SURF. | CLEAR APER. | RADIUS | THICKNESS | INDEX | V |
|---|---|---|---|---|---|
| 1 | 10.16 | 9.28710 | 3.000 | 1.492 | 57.4 |
| 2 | 8.08 | 14.5761 | 4.847 | | |
|   | 2.71 | DIAPHRAGM | 1.565 | | |
| 3 | 4.66 | ASPHERE | 1.347 | 1.492 | 57.4 |
| 4 | 5.43 | ASPHERE | 3.240 | | |
|   | 8.91 | BAFFLE | | | |

LENS LENGTH: 10.759

BF: 33.72

FF: 56.15

BEST FOCUS: −0.900

ASPHERIC EQUATION:

$$X = \frac{CY^2}{1+\sqrt{1-(k+1)C^2Y^2}} + DY^4 + EY^6 + FY^8 + GY^{10} + HY^{12} + IY^{14}$$

the height of the green (546.1 nm) image. Positive secondary lateral color in this situation means that the blue image is larger than the green image.

Figure 9C:
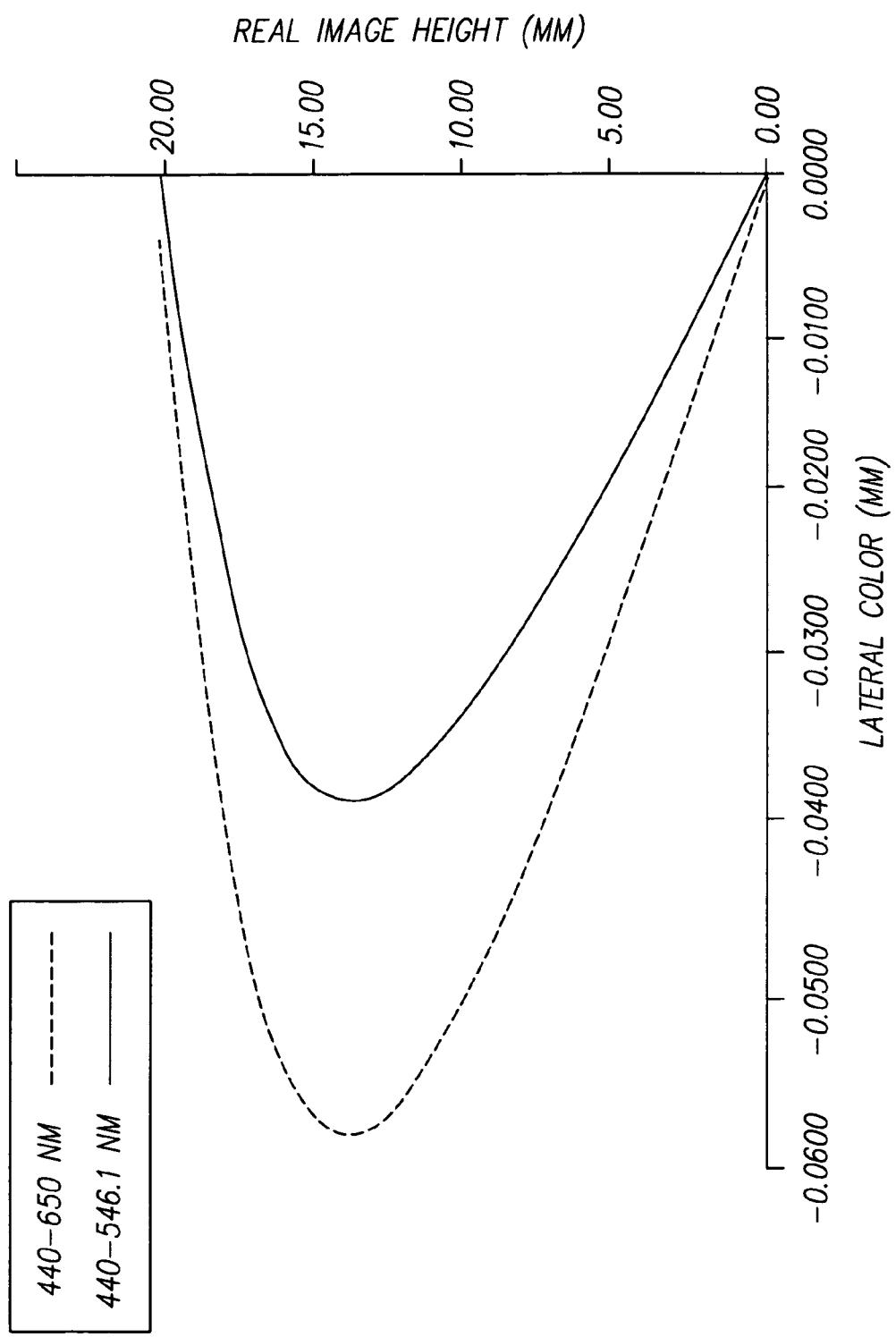
FIGS. 9C and 9D are aberration diagrams of the example embodiment shown in FIGS. 9A and 9B, respectively.
Figure 9D:
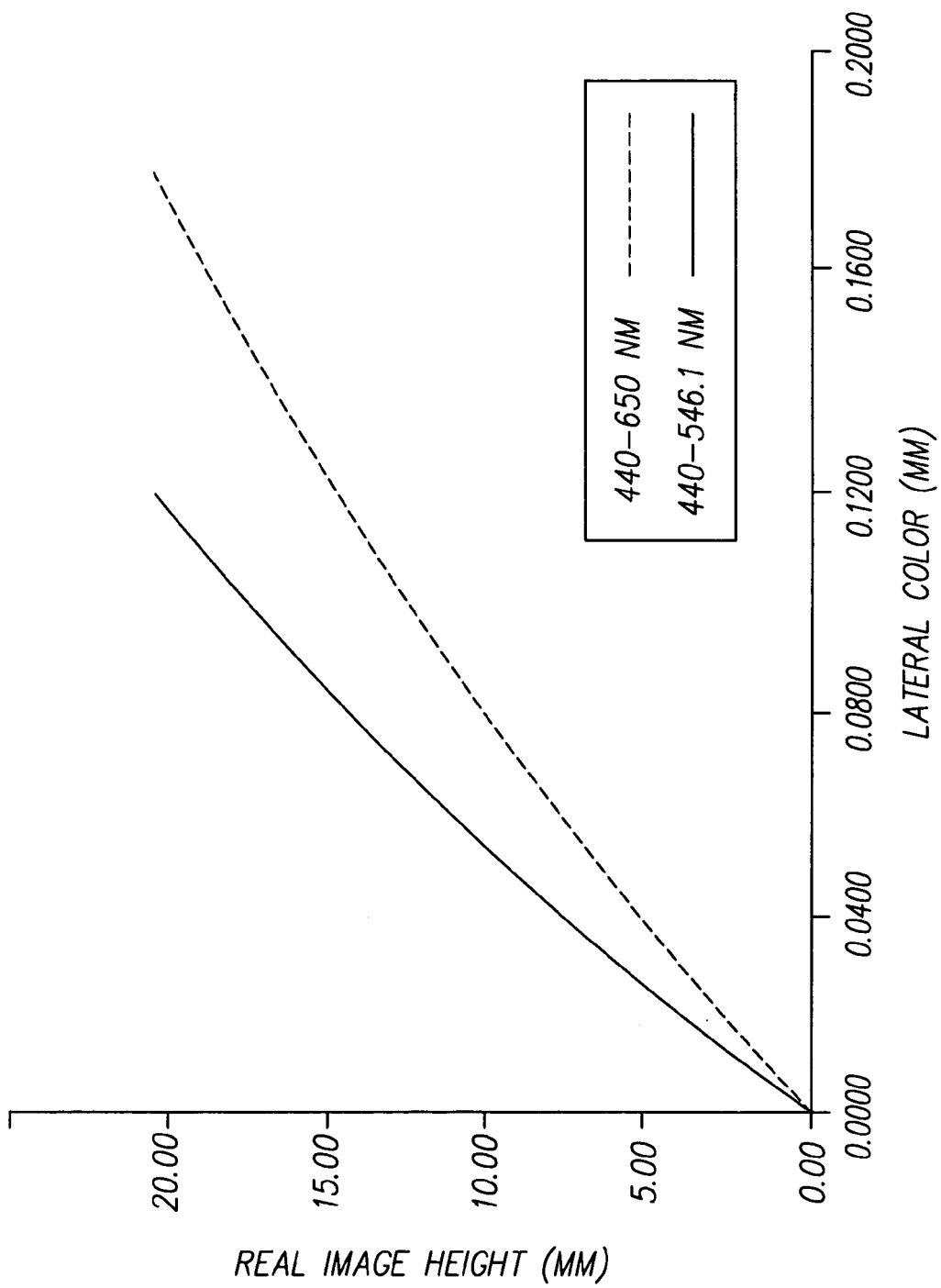
Figure 9E:
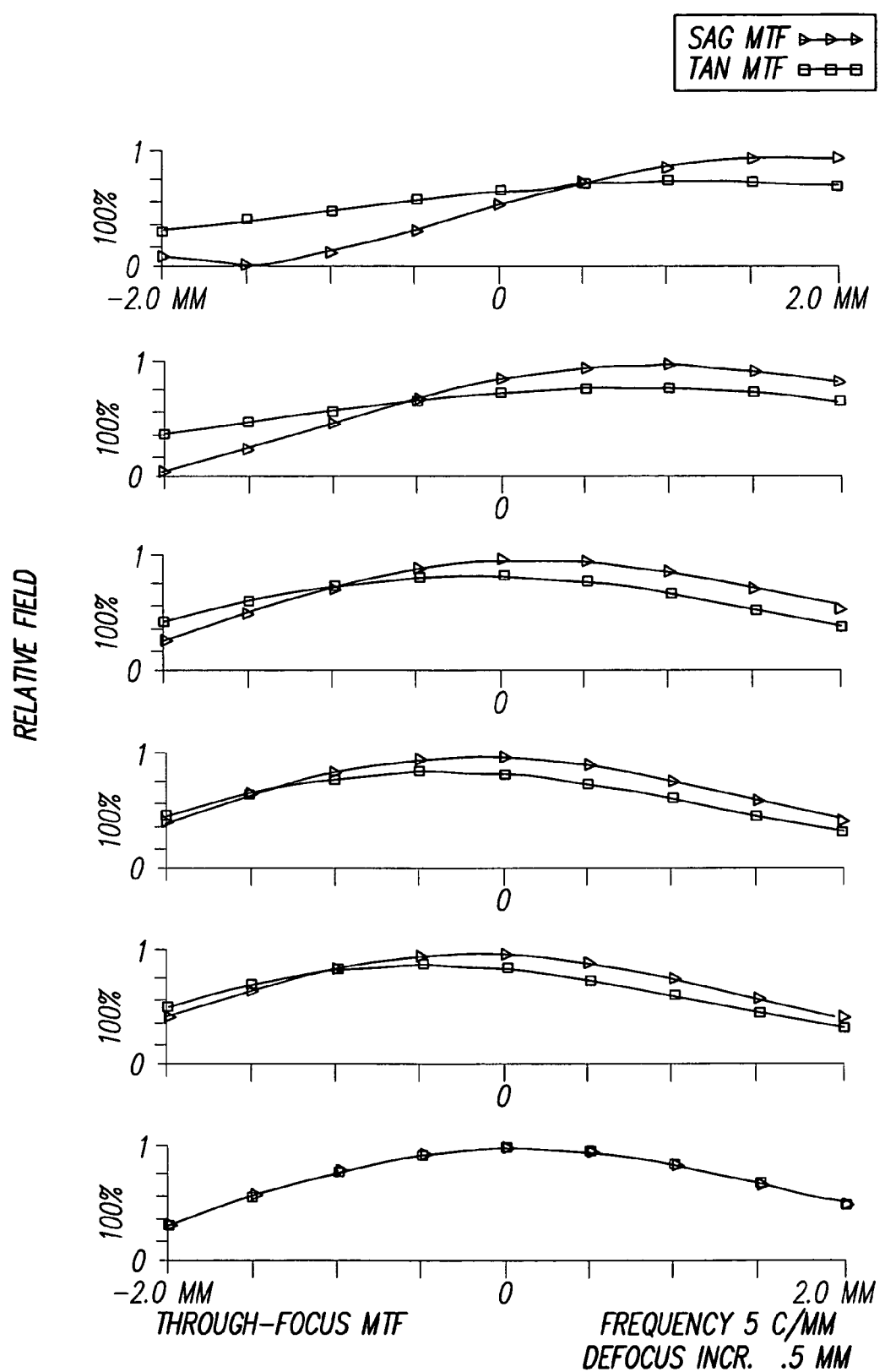
FIGS. 9E and 9F are through focus MTF plots for the example embodiment shown in FIGS. 9A and 9B, respectively.
Figure 9F:
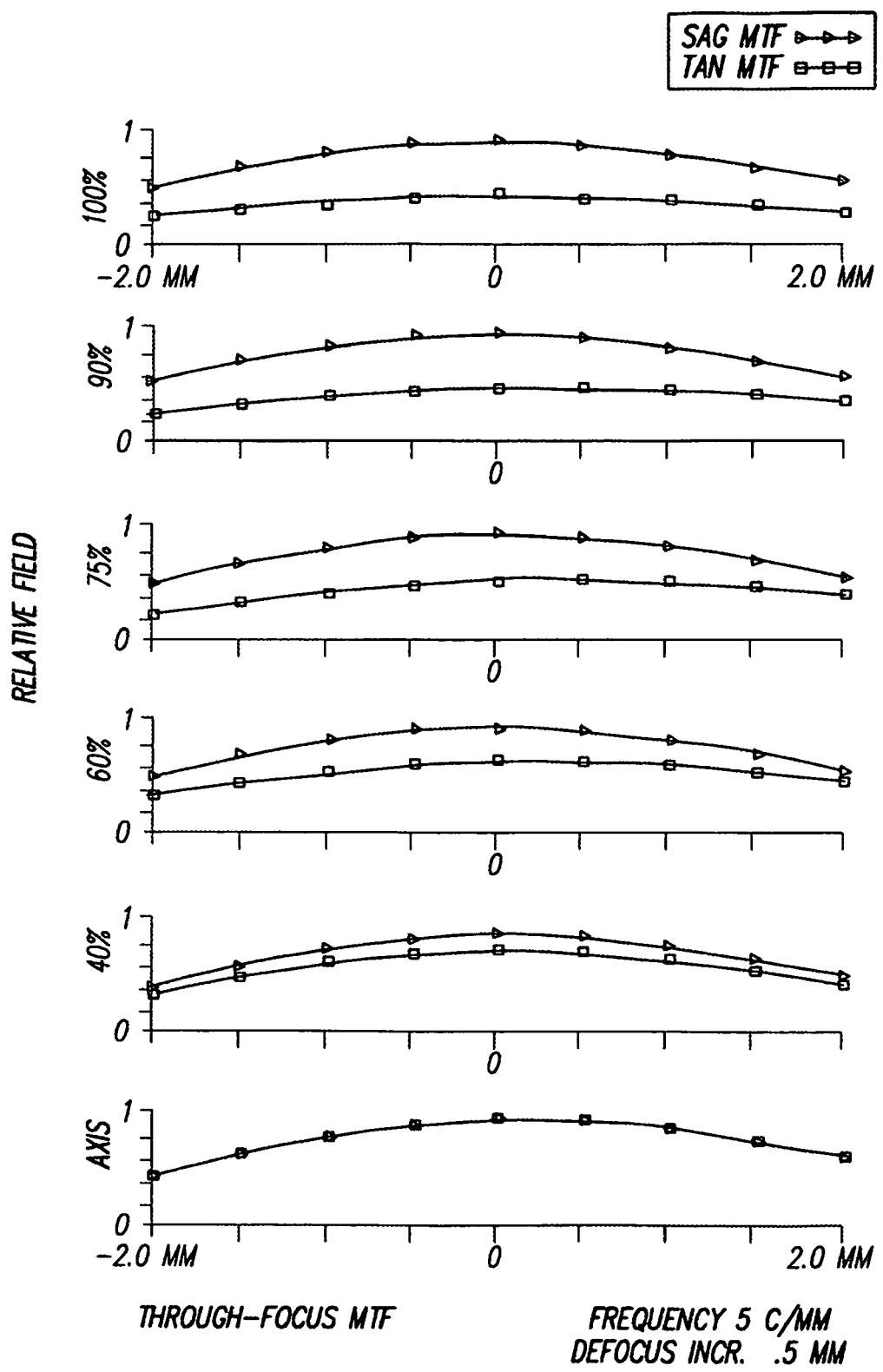

Referring to FIGS. 9E and 9F, through focus MTF performance plots for the example embodiment shown in FIGS. 9A and 9B, respectively, are shown. The MTF performance plots were measured at best focus using weighted wavelengths (440 nanometers at 15%, 546.1 nanometers at 50%, and 650 nm at 35%) at a frequency of 5.00 cycles per millimeter with a full field (100%) being 20.58 mm and centered along the image format diagonal. The area weighted average MTF numbers shown were calculated along the image format diagonal using obliquities/weights of axis/15, 40%/26, 60%/33, 75%/18, 90%/8 and the wavelengths and weights described above.

Tables 10 and 11 provide additional design characteristics for the example embodiments shown in FIGS. 1A through 9F.

In example embodiments 8 and 9, lens system 30 includes two lens elements. In a preferred implementation, front lens element 810, 910 as viewed from the object side of the lens system is lens element 610 of example embodiment 6. As such, the shape of rear lens element 816, 916 is provided in TABLE 11. Rear lens element 816, 916 has negative power, meniscus in shape, and concave toward the image side of the lens system.

In TABLES 10 and 11, units are in millimeters where applicable. Surface types and materials are listed from object side to image side of the lens system. Surface types having an "S" are spherical, while surface types having an "A" are aspheric. "PMMA" is an acrylic plastic (polymethyl-methacrylate) and "PS" is a styrene plastic.

SURF. 3:  C = 0.0915783    D = 0.   F = 0.   H = 0.
          k = −12.2711702   E = 0.   G = 0.   I = 0.
VERTEX RADIUS = 1/C = 10.9196145445

SURF. 4:  C = 0.1049791     D = 0.1456182E−01   F = 0.1490086E−02   H = 0.1993857E−04
          k = −141.6509677  E = −0.5686506E−02  G = −0.2353026E−03  I = −0.6927936E−06
VERTEX RADIUS = 1/C = 9.5257023402

Referring to FIGS. 9C and 9D, lateral color diagrams of the example embodiment shown in FIGS. 9A and 9B, respectively, are shown. Lateral color was measured along "% LINEBOW, HOR/VERT" is the horizontal and vertical linebow distortion over the top and side of the full image format (24 mm×36 mm in example embodiments 1 through 9). A negative linebow distortion is often referred to as "barrel" distortion in which the corners of the image are bowed in. A positive linebow distortion is often referred to as "pincushion" distortion in which the corners of the image are bowed out.

The values for area weighted average MTF (AWA MTF) (heterochromatic) are taken along the image format diagonal with wavelength/weights of 650 nm/35; 546.1 nm/50; 440 nm/15; and obliquities/weights of axis/15; 40%/26; 60%/33; 75%/18; 90%/8. The values are shown at 5 c/mm and 10 c/mm at the image. A 100% field is an image height of 20.58 mm. "FVFD" is a front vertex to film distance or dimension where film is placed at a best image position using the object distance design criteria for each lens. Image distances shown are from the rear lens vertex for the associated object distance and include the best focus shifts of each lens system.

TABLE 10

| | EFL | EFF. FNO. | SHUTTER TO FILM | FVFD | MATERIALS | SURFACE TYPES | AWA MTF 5/10 | % LINEBOW HOR/VERT |
|---|---|---|---|---|---|---|---|---|
| EX. 1 | | | | | | | | |
| LENS 20 | 31.03 | F/11.11 | 30.507 | 42.364 | PMMA/PMMA | SSAS | 90/74 | −1.47/.60 |
| LENS 30 | 43.03 | F/12.17 | 30.507 | 41.228 | PMMA | SS | 82/63 | −.31/.39 |
| EX. 2 | | | | | | | | |
| LENS 20 | 29.99 | F/11.01 | 28.691 | 37.438 | PMMA/PMMA | ASAS | 92/79 | −1.80/.26 |
| LENS 30 | 41.24 | F/12.02 | 28.691 | 39.206 | PMMA | SS | 81/63 | −.31/1.47 |
| EX. 3 | | | | | | | | |
| LENS 20 | 30.90 | F/11.11 | 30.363 | 41.501 | PMMA/PMMA | SSSS | 88/70 | −1.73/.41 |
| LENS 30 | 43.65 | F/12.17 | 30.363 | 41.843 | PMMA | SS | 81/62 | −.38/1.32 |
| EX. 4 | | | | | | | | |
| LENS 20 | 30.90 | F/11.21 | 30.360 | 41.600 | PMMA/PMMA | SASS | 89/72 | −1.56/.70 |
| LENS 30 | 43.65 | F/13.19 | 30.363 | 42.183 | PMMA | SS | 81/63 | −.38/1.29 |
| EX. 5 | | | | | | | | |
| LENS 20 | 30.90 | F/11.13 | 30.360 | 41.500 | PMMA/PMMA | ASSS | 89/72 | −1.65/.49 |
| LENS 30 | 43.65 | F/13.19 | 30.363 | 42.183 | PMMA | SS | 81/63 | −.38/1.29 |
| EX. 6 | | | | | | | | |
| LENS 20 | 32.90 | F/11.22 | 30.360 | 41.50 | PMMA/PMMA | SASA | 92/79 | −.31/1.70 |
| LENS 30 | 43.65 | F/13.19 | 30.363 | 42.183 | PMMA | SS | 81/63 | −.38/1.29 |
| EX. 7 | | | | | | | | |
| LENS 20 | 30.90 | F/11.11 | 30.363 | 41.501 | PMMA/PMMA | SSSS | 88/70 | −1.73/.41 |
| LENS 30 | 43.65 | F/13.19 | 30.363 | 42.183 | PMMA | SS | 81/63 | −.38/1.29 |
| EX. 8 | | | | | | | | |
| LENS 20 | 28.81 | F/11.02 | 30.363 | 41.455 | PMMA/PMMA | AASA | 86/66 | −.48/1.51 |
| LENS 30 | 48.50 | F/14.32 | 30.363 | 44.362 | PMMA/PMMA | SSAA | 79/61 | .10/1.69 |
| EX. 9 | | | | | | | | |
| LENS 20 | 25.75 | F/11.02 | 30.363 | 42.300 | PS/PMMA | AAAA | 85/66 | −.48/1.64 |
| LENS 30 | 48.50 | F/14.32 | 30.363 | 44.362 | PMMA/PMMA | SSAA | 79/61 | .10/1.69 |
| ADDITIONAL EXAMPLES USING ALTERNATIVE MATERIALS | | | | | | | | |
| LENS | | | | | | | | |
| A | 43.70 | F/13.16 | 30.363 | 42.183 | ZEONOR1600R | SS | 81/63 | −.35/1.32 |
| B | 43.70 | F/13.16 | 30.363 | 42.183 | TOPAS6017 | SS | 81/64 | −.35/1.32 |
| C | 43.65 | F/12.17 | 30.363 | 41.843 | K10 (Glass) | SS | 81/62 | −.36/1.33 |

TABLE 11

| | EFL | DESIGNED OBJECT DISTANCE | IMAGE DISTANCE | COMPONENT EFL'S | FRONT ELEMENT SHAPE | CENTER SPACE AS A % OF EFL | IMAGE DIST/EFT |
|---|---|---|---|---|---|---|---|
| EX. 1 | | | | | | | |
| LENS 20 | 31.03 | −3048 | 32.327 | 76.79/43.71 | BICONVEX ( ) | 5.48/31.03 = 17.7% | 1.04 |
| LENS 30 | 43.03 | −3048 | 38.028 | (SINGLET) | MENISCUS (( | (SINGLET) | .88 |
| EX. 2 | | | | | | | |
| LENS 20 | 29.99 | −3048 | 30.511 | 43.33/71.29 | BICONVEX ( ) | 2.572/29.99 = 8.6% | 1.02 |
| LENS 30 | 41.24 | −3048 | 36.206 | (SINGLET) | MENISCUS (( | (SINGLET) | .88 |

TABLE 11-continued

| | EFL | DESIGNED OBJECT DISTANCE | IMAGE DISTANCE | COMPONENT EFL'S | FRONT ELEMENT SHAPE | CENTER SPACE AS A % OF EFL | IMAGE DIST/EFT |
|---|---|---|---|---|---|---|---|
| EX. 3 | | | | | | | |
| LENS 20 | 30.90 | −3048 | 31.713 | 65.29/46.82 | BICONVEX ( ) | 4.398/30.90 = 14.2% | 1.03 |
| LENS 30 | 43.65 | −3048 | 38.843 | (SINGLET) | MENISCUS (( | (SINGLET) | .89 |
| EX. 4 | | | | | | | |
| LENS 20 | 30.90 | −3048 | 31.710 | 65.97/46.82 | MENISCUS )) | 4.510/30.90 = 14.6% | 1.03 |
| LENS 30 | 43.65 | −3048 | 39.183 | (SINGLET) | MENISCUS (( | (SINGLET) | .90 |
| EX. 5 | | | | | | | |
| LENS 20 | 30.90 | −3048 | 31.710 | 65.05/46.82 | BICONVEX ( ) | 4.429/30.90 = 14.3% | 1.03 |
| LENS 30 | 43.65 | −3048 | 39.183 | (SINGLET) | MENISCUS (( | (SINGLET) | .90 |
| EX. 6 | | | | | | | |
| LENS 20 | 32.90 | −3048 | 31.710 | 50.00/69.47 | BICONVEX ( ) | 5.741/32.90 = 17.4% | .96 |
| LENS 30 | 43.65 | −3048 | 39.183 | (SINGLET) | MENISCUS (( | (SINGLET) | .90 |
| EX. 7 | | | | | | | |
| LENS 20 | 30.90 | −3048 | 31.713 | 65.29/46.82 | BICONVEX ( ) | 4.398/30.90 = 14.2% | 1.03 |
| LENS 30 | 43.65 | −3048 | 39.183 | (SINGLET) | MENISCUS (( | (SINGLET) | .90 |
| EX. 8 | | | | | | | |
| LENS 20 | 28.81 | −2438.4 | 31.713 | 81.80/38.17 | BICONVEX ( ) | 5.010/28.81 = 17.4% | 1.01 |
| LENS 30 | 48.50 | −3048 | 33.603 | 43.65/−222.07 | MENISCUS (( | 6.412/48.50 = 13.2% | .69 |
| EX. 9 | | | | | | | |
| LENS 20 | 25.75 | −3048 | 31.713 | 423.74/26.59 | MENISCUS (( | 4.828/25.75 = 18.7% | 1.23 |
| LENS 30 | 48.50 | −3048 | 33.603 | 43.65/−222.07 | MENISCUS (( | 6.412/48.50 = 13.2% | .69 |
| ADDITIONAL EXAMPLES USING ALTERNATIVE MATERIALS: | | | | | | | |
| LENS | | | | | | | |
| A | 43.70 | −3048 | 39.183 | (SINGLET) | MENISCUS (( | (SINGLET) | .90 |
| B | 43.70 | −3048 | 39.183 | (SINGLET) | MENISCUS (( | (SINGLET) | .90 |
| C | 43.65 | −3048 | 38.843 | (SINGLET) | MENISCUS (( | (SINGLET) | .89 |

In TABLES 10 and 11, example lens made from materials other than PMMA and PS plastics are shown. Lens A is made from ZEONOR brand plastic. Lens B is made from TOPAS brand plastic. Lens C is made from "K-10" glass. ZEONOR (cyclo-olefin polymers) and TOPAS (cyclic olefin copolymers) are brand names of "special" plastics having lower water absorbing characteristics than other types of plastics, for example, PMMA or PS plastics. "K-10" is a commercially available type of glass, taken from the Schott glass catalog (2000). Using lens elements made from "special" plastics and/or glass instead of or in addition to lens elements made from PMMA and/or PS plastics can help to improve environmental stability. For example, lens elements made from "special" plastics and/or glass can help to reduce the thermal and/or humidity effects associated with environmental changes on lens elements made from PMMA and/or PS plastics.

A lens or lenses made from any of these materials can be substituted for any of the lens elements described above with reference to example embodiments 1 through 9 in order to improve environmental stability of lens system 10. For example, any one of lenses A, B, or C can be directly substituted for meniscus lens element 610 of second lens system 30 in example embodiment 6 described above. However, depending on the specific application contemplated, it may be desirable to make additional minor design changes, for example, changes in lens element thickness, spacing, radius of curvature, surface type, etc., in order to improve the overall performance of lens system 10 when these types of materials are used.

Tables A, B, and C provide additional design characteristics for the alternative material example embodiments described above. In each table, surfaces are viewed from an object side toward an image side. As such, surfaces 1 and 2 refer to the object side surface and image side surface, respectively, of the lens element located closest to the object side of the lens system.

TABLE A

| | lens A | | | | |
|---|---|---|---|---|---|
| SURF. | CLEAR APER. | RADIUS | THICKNESS | INDEX | V |
| 1 | 10.42 | 9.64047 | 3.000 | 1.535 | 55.8 |
| 2 | 8.18 | 14.5761 | 4.480 | | |
| | 2.67 | DIAPHRAGM | 4.340 | | |
| | 6.79 | SHUTTER | | | |

LENS LENGTH: 3.000

BF: 38.95

FF: 46.84

BEST FOCUS: −0.400

TABLE B lens B

| SURF. | CLEAR APER. | RADIUS | THICKNESS | INDEX | V |
|---|---|---|---|---|---|
| 1 | 10.42 | 9.62661 | 3.000 | 1.533 | 56.7 |
| 2 | 8.18 | 14.5761 | 4.480 | | |
| | 2.67 | DIAPHRAGM | 4.340 | | |
| | 6.79 | SHUTTER | | | |

LENS LENGTH: 3.000

BF: 38.95

FF: 46.83

BEST FOCUS: −0.400

TABLE C lens C

| SURF. | CLEAR APER. | RADIUS | THICKNESS | INDEX | V |
|---|---|---|---|---|---|
| 1 | 10.57 | 9.40858 | 3.000 | 1.501 | 56.4 |
| 2 | 8.38 | 14.6949 | 4.480 | | |
| | 2.89 | DIAPHRAGM | 4.000 | | |
| | 6.79 | SHUTTER | | | |

LENS LENGTH: 3.000

BF: 38.99

FF: 46.63

BEST FOCUS: −0.781

Referring back to FIGS. 1A–9F, each lens system 20 includes an aperture stop positioned between the front and rear lens elements with a shutter located on an image side of the second lens element as viewed from an object side of the lens system. Positioning the aperture stop between the front and rear elements helps to improve the ability to correct or control aberrations, for example, lateral color, occurring in the upper and lower portions of the off-axis (away from the optical axis) light ray bundles when compared to other aperture stop locations (for example, on an object side of the front lens element or on an image side of the rear lens element).

The front and rear lens elements of each lens system 20 described with reference to FIGS. 1A–9F are quasi-symmetrical. This also helps to improve the ability to correct or control aberrations, for example, lateral color, occurring in the upper and lower portions of the off-axis light ray bundles when compared to non-symmetrical lens elements. The term quasi-symmetrical is broadly defined to mean that a degree of symmetry exists between the front and rear lens elements that helps to reduce at least some off-axis aberrations. This degree of symmetry can vary as is described in more detail in the numerical design characteristics of example embodiments 1 through 9. As used herein, the term quasi-symmetrical is defined to mean that at least three lens surfaces out of the four lens surfaces of the first lens system 20 have a center of curvature in a direction toward the aperture stop such that lens surfaces on the object side of the aperture stop (left of the aperture stop in FIGS. 1A–10B) have a positive curvature (vertex radius) and lens surfaces on the image side of the aperture stop (right of the aperture stop in FIGS. 1A–10B) have a negative curvature (vertex radius).

Again referring back to FIGS. 1A–9F, lens system 20 includes two lens elements which provides a longer image distance when compared to single element designs. The longer image distance of each lens system 20 allows lens system 20 and lens system 30 to have a common shutter location which simplifies manufacturing of cameras incorporating lens system 10.

There are two types of linebow distortion—horizontal and vertical. When present, horizontal linebow distortion can be seen throughout the entire image, whereas vertical linebow is present only at the edges of the image. As such, and again referring back to FIGS. 1A–9F, in preferred implementations of example embodiments 1 through 9, lens system 20 has an absolute value of % horizontal linebow distortion of less than 0.50, and more preferably, less than 0.35 while the absolute value of % vertical linebow distortion is less than 1.75, and more preferably, less than 1.65.

In preferred implementations of example embodiments 1 through 9, lens system 30 has an absolute value of % horizontal linebow distortion of less than 0.40, and more preferably, less than 0.15 while the absolute value of % vertical linebow distortion of less than 1.70, and more preferably, less than 1.30.

The invention has been described in detail with particular reference to certain preferred embodiments thereof, but it will be understood that variations and modifications can be effected within the spirit and scope of the invention.

The invention claimed is:

1. A lens system comprising:
   a first lens system moveable between a first position removed from an optical axis and a second position on the optical axis, the first lens system comprising a first lens element, an aperture stop, and a second lens element in order from an object side to an image side of the lens system, the first lens system having a first focal length; and
   a second lens system moveable between a first position on the optical axis and a second position removed from the optical axis, the second lens system having a second focal length, wherein the second focal length is greater than the first focal length such that a magnification ratio change results from interchanging the first lens system and the second system on the optical axis.

2. The lens system according to claim 1, wherein the lens system satisfies the following condition: $0.75 \leq |D_{tele}/D_{tele}| \leq 1.25$, where $D_{tele}$ is a front vertex to film plane distance for the second lens system and $D_{wa}$ is a front vertex to film plane distance for the first lens system.

3. The lens system according to claim 1, wherein the lens system satisfies the following condition: $|D_{tele}/D_{wa}| \cong 1$, where $D_{tele}$ is a front vertex to film plane distance for the second lens system and $D_{wa}$ is a front vertex to film plane distance for the first lens system.

4. The lens system according to claim 1, further comprising:
   a shutter fixedly positioned on the optical axis on an image side of the first lens system and the second lens system.

5. The lens system according to claim 1, wherein the first and second lens elements of the first lens system have positive power.

6. The lens system according to claim 1, wherein the second lens element of the first lens system is meniscus and has a concave side toward the object plane.

7. The lens system according to claim 1, wherein the first lens element of the first lens system has a convex side toward the image plane.

8. The lens system according to claim 1, the first lens element and the second lens element of the first lens system being spaced apart by a distance X and the first lens system having a focal length, wherein X≧13% of the focal length of the first lens system.

9. The lens system according to claim 1, wherein the second lens system comprises a meniscus lens element and has a convex side toward the object plane.

10. The lens system according to claim 9, wherein the second lens system further comprises an aperture stop positioned on an image side of the meniscus lens element.

11. The lens system according to claim 10, wherein the second lens system further comprises a negative lens element positioned on an image side of the aperture stop.

12. The lens system according to claim 1, wherein the first lens system has less than |0.50%| horizontal linebow distortion.

13. The lens system according to claim 12, wherein the first lens system has less than |1.75%| vertical linebow distortion.

14. The lens system according to claim 1, wherein the second lens system has less than |0.40%| horizontal linebow distortion.

15. The lens system according to claim 14, wherein the second lens system has less than |1.70%| vertical linebow distortion.

16. The lens system according to claim 1, wherein the first lens element and the second lens element are quasi-symmetrical.

* * * * *